US008478659B2

(12) United States Patent
Behmoiras et al.

(10) Patent No.: US 8,478,659 B2
(45) Date of Patent: Jul. 2, 2013

(54) METHOD AND SYSTEM FOR VENDOR MANAGEMENT

(75) Inventors: Ralph J. Behmoiras, Boca Raton, FL (US); William C. Erbey, Palm Beach, FL (US); Arthur J. Castner, Wellington, FL (US); Christopher Kennedy, Lake Worth, FL (US); Keith S. Reno, West Palm Beach, FL (US)

(73) Assignee: Altisource Solutions S.à r.l., Luxembourg (LU)

( * ) Notice: Subject to any disclaimer, the term of this patent is extended or adjusted under 35 U.S.C. 154(b) by 369 days.

(21) Appl. No.: 12/723,358

(22) Filed: Mar. 12, 2010
(Under 37 CFR 1.47)

(65) Prior Publication Data
US 2010/0268558 A1 Oct. 21, 2010

Related U.S. Application Data

(62) Division of application No. 10/937,879, filed on Sep. 10, 2004, now Pat. No. 7,707,055.

(60) Provisional application No. 60/502,273, filed on Sep. 12, 2003.

(51) Int. Cl.
*G06Q 30/06* (2012.01)

(52) U.S. Cl.
USPC .................. 705/26.35; 705/26.1; 705/29

(58) Field of Classification Search
USPC ................................... 705/26.1, 26.3, 295
See application file for complete search history.

(56) References Cited

U.S. PATENT DOCUMENTS

| 4,799,156 | A | | 1/1989 | Shavit et al. |
| 5,592,375 | A | * | 1/1997 | Salmon et al. ............... 705/321 |
| 5,734,890 | A | * | 3/1998 | Case et al. ......................... 1/1 |
| 5,758,328 | A | * | 5/1998 | Giovannoli ................ 705/26.4 |
| 5,799,289 | A | | 8/1998 | Fukushima et al. |
| 5,940,812 | A | | 8/1999 | Tengel et al. |
| 5,995,947 | A | | 11/1999 | Fraser et al. |
| 6,513,019 | B2 | | 1/2003 | Lewis |

(Continued)

FOREIGN PATENT DOCUMENTS

WO 0115047 A1 3/2001

OTHER PUBLICATIONS

Final Office Action, dated Jan. 8, 2010, from corresponding U.S. Appl. No. 11/802,306.

(Continued)

*Primary Examiner* — Jagdish Patel
(74) *Attorney, Agent, or Firm* — Shaun B. Sethna

(57) ABSTRACT

A method and system for managing business transactions, such as mortgages or other financial transactions. A business transaction between an end user and a financial institution includes sub-transactions between the end user and a vendor. A software system performs functions to complete the business transaction. Automated ordering allows an end user to quickly and easily order a sub-transaction without input from the financial institution or the vendor, and also automatically orders sub-transactions upon satisfaction of a trigger event. Vendor management functionality allows a financial institution to manage the transactions of a vendor. Qualitative performance analysis functionality allows an end user to monitor and evaluate a vendor's price, turn-around time, quality score, and overall score. Vendor distribution functionality distributes sub-transactions among vendors. Vendor management company functionality allows a vendor management company—a vendor that outsources some or all of its sub-transactions to independent service providers—to effectively use the system.

19 Claims, 60 Drawing Sheets

U.S. PATENT DOCUMENTS

| | | | |
|---|---|---|---|
| 6,594,633 | B1 | 7/2003 | Broerman |
| 6,606,606 | B2 | 8/2003 | Starr |
| 6,647,374 | B2* | 11/2003 | Kansal ............ 705/37 |
| 6,711,554 | B1 | 3/2004 | Salzmann et al. |
| 6,985,886 | B1 | 1/2006 | Broadbent et al. |
| 7,072,857 | B1* | 7/2006 | Calonge ............ 705/26.4 |
| 7,089,503 | B1 | 8/2006 | Bloomquist et al. |
| 7,349,868 | B2 | 3/2008 | Tenorio |
| 7,389,242 | B2 | 6/2008 | Frost |
| 7,392,216 | B1 | 6/2008 | Palmgren et al. |
| 7,444,302 | B2 | 10/2008 | Hu et al. |
| 7,451,106 | B1 | 11/2008 | Gindlesperger |
| 7,555,459 | B2 | 6/2009 | Dhar et al. |
| 7,707,071 | B2* | 4/2010 | Rigole ............ 705/26.1 |
| 7,707,153 | B1 | 4/2010 | Petito et al. |
| 2002/0023046 | A1 | 2/2002 | Callahan et al. |
| 2002/0040339 | A1 | 4/2002 | Dhar et al. |
| 2002/0052835 | A1 | 5/2002 | Toscano |
| 2002/0138413 | A1 | 9/2002 | Creamer et al. |
| 2002/0188483 | A1 | 12/2002 | Fisher |
| 2003/0004854 | A1* | 1/2003 | Greene et al. ............ 705/37 |
| 2003/0018558 | A1 | 1/2003 | Heffner et al. |
| 2003/0018575 | A1 | 1/2003 | Beggins et al. |
| 2003/0033587 | A1 | 2/2003 | Ferguson et al. |
| 2003/0101085 | A1 | 5/2003 | Butler et al. |
| 2003/0233316 | A1 | 12/2003 | Hu et al. |
| 2004/0019528 | A1 | 1/2004 | Broussard et al. |
| 2004/0083119 | A1 | 4/2004 | Schunder et al. |
| 2004/0083148 | A1 | 4/2004 | Chadrow |
| 2004/0088411 | A1 | 5/2004 | Jakubowski et al. |
| 2004/0111346 | A1 | 6/2004 | Macbeath et al. |
| 2004/0249705 | A1 | 12/2004 | Spencer et al. |
| 2004/0249914 | A1 | 12/2004 | Flocken et al. |
| 2005/0010423 | A1 | 1/2005 | Bagbey et al. |
| 2006/0190394 | A1 | 8/2006 | Fraser et al. |

OTHER PUBLICATIONS

Final Office Action, dated Nov. 30, 2010, from corresponding U.S. Appl. No. 11/802,308.
Final Office Action, dated Oct. 21, 2010, from corresponding U.S. Appl. No. 11/301,247.
Final Office Action, dated Oct. 28, 2009, from corresponding U.S. Appl. No. 11/301,247.
Final Office Action, dated Sep. 16, 2008, from corresponding U.S. Appl. No. 11/301,247.
Notice of Allowance, dated Oct. 21, 2011, from corresponding U.S. Appl. No. 12/335,196.
Notice of Allowance, dated May 16, 2011, from corresponding U.S. Appl. No. 11/802,306.
Office Action, dated Apr. 21, 2011, from corresponding U.S. Appl. No. 12/335,196.
Office Action, dated Aug. 24, 2010, from corresponding U.S. Appl. No. 11/802,306.
Office Action, dated Dec. 1, 2011, from corresponding U.S. Appl. No. 13/232,010.
Office Action, dated Jun. 16, 2009, from corresponding U.S. Appl. No. 11/802,306.
Office Action, dated Mar. 18, 2010, from corresponding U.S. Appl. No. 11/802,308.
Office Action, dated Mar. 24, 2008, from corresponding U.S. Appl. No. 11/301,247.
Office Action, dated Mar. 24, 2009, from corresponding U.S. Appl. No. 11/301,247.
Office Action, dated Mar. 3, 2010, from corresponding U.S. Appl. No. 11/301,247.
Related Case—U.S. Appl. No. 11/802,306, entitled "Method and System for Loan Closing," now U.S. Patent No. 8,024,261 issued Sep. 20, 2011.
Related Case—U.S. Appl. No. 11/301,247, filed Dec. 13, 2005, entitled "Product Optimizer," now Publication No. 20060155640.
Related Case—U.S. Appl. No. 11/802,308, entitled "Method and System for Mortgage Exchange," filed May 22, 2007, now abandoned.
Related Case—U.S. Appl. No. 12/335,196, filed Dec. 15, 2008, entitled "Methods and Systems for Vendor Assurance," now Publication No. 20090240596.
Related Case—U.S. Appl. No. 13/076,044, filed Mar. 30, 2011, entitled "Method and System for Mortgage Exchange."
Related Case—U.S. Appl. No. 13/232,010, filed Sep. 14, 2011, entitled "Method and System for Loan Closing."
"Ocwen Unveils Enhanced Vendor Management Tool for Mortgage", www.press.arrivenet.com <http://www.press.arrivenet.com>, Mar. 24, 2005, pp. 1-2.
"Vendor Management Subsidiary Strategic Benefits", www.atmprof.com<http://www.atmprof.com>, Mar. 31, 2005, pp. 1-2.
"The Growth of Internailized Vendor Management Subsidiaries", www.atmprof.com <http://www.atmprof.com>, Mar. 31, 2005, pp. 1-2.
"MindBox", ARTEnterprise, 2005, 8 pages.
American Land Title Association, "ALTA Technology New", pp. 2, Jul. 10, 2007, http://www.alta.org/technology/news.cfm?newsID=5187.
Dorado White Paper, "The Dorado Advantage—Networked Origination for the Agile Enterprise", 12 pages, 2006.
Metavante Lending Solutions, "Loan Origination Studio: Metavante Lending Solutions", 2007, 10 pages, http://www.ghrsystems.com/ProductsServices/mortgage.sub.—solutions/ghr.s- ub.—los.html.
Mortgage Cadence Enterprise Lending Solutions, "Mortgage Cadence Orchestrator (Business Components)", 2007, 4 pages, http://www.mortgagecadence.com/productsOrchestrator.asp.
Scott Kersnar, "Putting All The Pieces Together", SourceMedia Inc. and Mortgage Technology, vol. 13, No. 6, Jul. 2006.
Office Action, dated Jan. 25, 2012, from corresponding U.S. Appl. No. 12/335,196.
Office Action, dated Jul. 17, 2012, from corresponding U.S. Appl. No. 13/232,010.
Notice of Allowance, dated May 24, 2012, from corresponding U.S. Appl. No. 13/076,044.

* cited by examiner

Service Score Cards (Score Cards are used to grade a vendors timeliness. You need to apply a Score Card to the product you wish to score.)

If you would like to create a new Score Card, click on the "Create New Score Card" button.)

| Product | Description | Options | |
|---|---|---|---|
| Preliminary Title Report | Turn Time Score for Title | Edit | Delete |
| Exterior Fannie Mae 2055 DU Quantitative Analysis Appraisal | Turn Time Score of Appraisals | Edit | Delete |

Create New Score Card

Score Cards
Quality Score
Service Score
Cumulative Score
Automated Scoring

WORKSTATION | REPORTS | ADMIN | VENDOR ADMIN | HELPFUL INFO | LOGOFF

Options
Products Offered
Products Ordered

REALTrans.com

REALTrans.com™

WORKSTATION | REPORTS | ADMIN | VENDOR ADMIN | HELPFUL INFO | LOGOFF

Options
Create New File
Order Search
Bid Management
Pending Attachments

Enter File #:

Work Queue    Refresh    Select View

FILES | ORDERS | TASKS
All Files | Open Orders | Late Orders | Due Today
New Messages | New/Unconfirmed | Due Today | Late Tasks
New Documents | New Documents | New Forms | High Priority

*Forward This Order*

Forward Order Detail

◉ Please forward to new vendor allowing read-only access for me
○ Please create duplicate order for new vendor. All information between new vendors and requestors will pass through me.

Vendor Selection
(Please Select a Vendor for each product.)

*Interior Fannie Mae 2055 Drl Quantitative Analysis Appraisal*

○ Vendors that service the property's zip-code
○ Vendors located in the property state
○ All vendors that offer this product AVS Profile Name: BPO
Distribution ID: 232

| Company | Branch | City | State | Vendor Type | National DB | SLA Price | Profile Orders (if Applicable) | Vendor Rating | Capacity | Auto-Select Flag | Capacity Exceeded | Outstanding Limit Exceeded |
|---|---|---|---|---|---|---|---|---|---|---|---|---|
| ABC Company | John Smith | Carlsbad | CA | Appraiser | X | $350.00 | | 3.40 | 10 | X | | |
| ABC Company | John Smith | Carlsbad | CA | Appraiser | X | $350.00 | | 3.70 | 10 | X | | |
| ABC Company | John Smith | Carlsbad | CA | Appraiser | X | $350.00 | | 3.20 | 10 | X | | |
| ABC Company | John Smith | Carlsbad | CA | Appraiser | X | $350.00 | | 3.70 | 10 | X | | |
| ABC Company | John Smith | Carlsbad | CA | Appraiser | X | $350.00 | | 3.34 | 10 | X | | |
| ABC Company | John Smith | Carlsbad | CA | Appraiser | X | $350.00 | | 3.10 | 10 | X | | |
| ABC Company | John Smith | Carlsbad | CA | Appraiser | X | $350.00 | | 3.10 | 10 | X | | |

Submit  Cancel

WorkQueue Setup

| Available Documents | Document Type | Description | Sent By | File Date | File Size |
|---|---|---|---|---|---|
| 123546464.txt | Sale 1 Photo | Drive By Photo | Keith Reno | 06/05/2003 5:45:00PM | 11526 |

Links

- Download Adobe Acrobat
- Download a FREE Tiff File Viewer
- Download a FREE ACI Rapid Viewer™

(The ACI Rapid Viewer is a free, downloadable appraisal viewer for viewing and printing appraisal reports completed using the ACI Collection for Windows™)

Close

FIG. 52 Conditions

FIG. 53 Business Process

Process Parameters

Please define the following parameters.

* Product Category [                    ▼]
* Product [                    ▼]

[Submit] [Close]

FIG. 56

Process Parameters

Please define the following parameters.

* Cancel Reason [                    ]
* Due Date [                    ▼]

[Submit] [Close]

FIG. 57

FIG. 60 Branded Customer Portal yourmortgage.com

Apply now | Customer service | Careers | Contact us | Tools | Advice | Glossary | Search Privacy | Citi.com | CitiMortgage.com | Site map Everything Possible℠

Buy
- Prequalify for a loan
- Get preapproved
- CitiMortgage rates

Learn More | Apply

Refinance
- Should you refinance
- Cost to refinance

Learn More | Apply

Home Equity
- Home equity vs refinance
- Home equity products

Learn More | Apply

Current Rates
July 12, 2002

| Rate | Points | APR |
|---|---|---|
| 30 yr fixed | | |
| 6.500 | 0.000 | 6.649 |
| 6.250 | 1.125 | 6.405 |
| 5/1 ARM | | |
| 5.750 | 0.000 | 5.321 |

More rates | Assumptions

Find a Home
City [ ]
State [ ] GO

Your Home
- My home loan account
- Customer service
- Home Value Estimates

Learn More

Tools | Advice
Glossary | Search

Current Highlights

Home Equity Offer - Apply for a home equity loan or line of credit on or before July 31, 2002 and receive a $100 check after you close!

Find an agent - Gain direct access to more than 45,000 real estate agents with HomeGain's agent finder.

Check the status of your loan:
Last Name: [Lawrence]
SSN: [555-55-5555] GO

Buy A Home

Refinance

Application Status

Home Equity

My Home Loan Account

Your Home

How much can you afford?
Monthly Income: $ [ ]
Monthly Debt: $ [ ]
Down Payment: $ [ ]
Submit Rule of thumb: You can afford a house that costs between 2 and 3 times your annual salary.
More calculators FIG. 61 Branded Customer Portal

METHOD AND SYSTEM FOR VENDOR MANAGEMENT

This application is a Divisional application of U.S. application Ser. No. 10/937,879 filed Sep. 10, 2004, which claims priority to U.S. Provisional Application No. 60/502,273 filed Sep. 12, 2003. The entirety of each of these patent applications is incorporated herein by reference.

BACKGROUND OF THE INVENTION

1. Field of the Invention

The present invention relates to a method and system for managing business transactions that require goods or services from multiple vendors, and in particular to a method and system for providing a banking transaction to an individual while managing sub-transactions with one or more vendors.

2. Background of the Technology

There exist in the art paper-based methods and systems for completing financial transactions, such as providing mortgages, but these systems are typically slow and costly. Computer-implemented systems to manage financial transactions are also known, but these systems typically do not contain functionality to manage each step in the lifespan of a financial transaction. In particular, they do not provide functionality to initiate or track sub-transactions that are necessary for the completion of a financial transaction.

There is an unmet need in the art for methods and systems for the management of financial transactions, that include functionality to manage sub-transactions. A sub-transaction, also interchangeably referred to herein as an order or a product, relates to goods or services being provided during the life of the transaction, and sub-transactions help to define parameters of the transaction or otherwise bring the transaction to completion. For example, a financial institution or other company (also interchangeably referred to herein as a customer), such as a mortgage company, wishes to make a transaction with an end user. For example, the transaction may be providing a mortgage, and the end user may be an individual or business. The transaction may require the completion of one or more sub-transactions. One example of such a sub-transaction is a home inspection. Sub-transactions include transactions between the end user and a vendor, such as an inspection company, which has a service agreement with the financial institution. Sub-transactions also include, for example, transactions between the end user and the financial institution, between the financial institution and a vendor, or between a vendor and another party, such as an independent service provider.

There is an unmet need in the art for automated vendor distribution functionality that enables a financial institution or another requesting party to automate the distribution of sub-transactions to select vendors. There is a further need to provide order tracking and order management functionality. There is also a need to create a system that is tailored to the needs of a vendor management company. A vendor management company, also interchangeably referred to herein as a network vendor, is a vendor which itself outsources some or all sub-transactions to local independent contractors or service providers.

SUMMARY OF THE INVENTION

The present invention provides a structure and platform that embodies an effective method and system for managing business transactions between an end user and a financial institution, where the business transactions include one or more sub-transactions between a vendor and the end user or financial institution. For example, when an end user obtains a loan from a financial institution or enters into another financial transaction, goods and services are ordered in conjunction with the loan or other financial transaction. These goods and services, or sub-transactions, include, for example, a flood order, an inspection, a business process outsourcing (BPO), an appraisal, an automated valuation model (AVM), a mortgage insurance (MI) policy, or other sub-transactions associated with the loan or other financial transaction. In one embodiment, the present invention includes systems and methods for ordering these sub-transactions from vendors. The sub-transactions may be ordered by the end user, by the financial institution, by a member of an outsourced labor force, by a real estate agent or other agent for the end user, or by another party. In one embodiment, the present invention includes systems and methods for selecting a vendor for a sub-transaction.

In addition, in one embodiment, the present invention is branded and customized to a particular financial institution or other company. Furthermore, the present invention allows outsourcing of non-automated transaction management operations, such that, for example, the human labor force required for transaction management is outsourced to a third party or other entity that is, for example, unrelated to the financial institution.

The present invention streamlines business processes, such as providing mortgages or performing other financial transactions, by, among other things, automating many traditionally manual steps. This eliminates manual errors and reduces cost, and also does not require a company to hire additional employees. The present invention is capable of being integrated into existing business infrastructure, and is capable of interfacing with other software applications.

The present invention enables mortgage lenders and others to reengineer their mortgage origination and servicing processes. This reduces operating costs and allows for a process that is fully electronic.

One embodiment of the present invention provides automated ordering functionality. In one embodiment, automated ordering apprises an end user that a particular sub-transaction is required or optional, and allows an end user to quickly and easily order a sub-transaction, without input from the financial institution or the vendor. In one embodiment, automated ordering functionality also automatically orders sub-transactions upon the ordering of a transaction or is otherwise automatically triggered. Automated ordering may thereby reduce cost and may reduce erroneous ordering.

One embodiment of the invention includes vendor management processing and set-up functionality. This functionality allows a financial institution to manage the transactions of a vendor, including real-time calculation of vendor capacity, threshold, and late-order ratios.

One embodiment of the invention includes qualitative performance analysis functionality. This functionality allows an end user or other requesting party to monitor and evaluate a vendor's price for a given sub-transaction, as specified in the service contract between the vendor and the financial institution. This functionality also allows an end user or other requesting party to monitor and evaluate such measures as a vendor's turn-around time and quality score. The qualitative performance analysis functionality further calculates an overall score for the vendor, such as by combining and weighting the turn-around and quality scores and providing a score via a scoring mechanism for evaluating a vendor's turn-around time performance.

One embodiment of the invention includes vendor distribution functionality. This functionality distributes sub-transactions among vendors, taking into account criteria such as a vendor's price, turn-around time, quality score, capacity, threshold, late order ratios, outstanding late order volume, outstanding new order volume, and the like. Vendor distribution functionality also includes functionality to withhold order distribution to a specified vendor for a specified period of time.

One embodiment of the invention includes vendor management company functionality. This functionality allows a vendor management company—e.g., a vendor that outsources some or all of its sub-transactions to independent service providers or the like—to effectively use the system. This functionality provides a vendor management company with many of the same tools available to the financial institution, such as automated distribution of orders to independent service providers and qualitative analysis of the independent service providers.

One embodiment of the invention provides a customizable system that can be tailored for a particular financial institution or other company. Customizing the system includes branding the system, or altering the look, feel, and user interaction with the system. Customizing the system further includes tailoring the capabilities of the system in accordance with vendor rules and policies concerning the requirements for transactions and sub-transactions. In one embodiment, customizing the system also includes adding automated support for the day-to-day operations of a particular financial institution or other company.

One embodiment of the invention provides a method and system that allow outsourcing of the human labor force that performs non-automated transaction management tasks. Outsourcing allows the system to be implemented in such a way that the financial institution or the vendors have little or no interaction with the system.

In one implementation, each type of transaction has a unique profile. The profile specifies, for example, the relationship between an end user and the financial institution. For example, the profile may specify the terms of a home loan. To select a transaction for a particular end user, in one embodiment, parameters matching the end user's requirements are input, and a transaction with a profile matching the input parameters is selected. Furthermore, the profile for a given transaction specifies, for example, which sub-transactions are required or are optional for the transaction. This assists in triggering automatic ordering of sub-transactions.

Additional advantages and novel features of the invention will be set forth in part in the description that follows, and in part will become more apparent to those skilled in the art upon examination of the following or upon learning by practice of the invention.

BRIEF DESCRIPTION OF THE FIGURES

In the drawings:

FIGS. 7-57 show sample Graphical User Interface (GUI) screens presented to a user in conjunction with an embodiment of the present invention;

FIGS. 60-61 illustrate a branded customer portal in conjunction with an embodiment of the present invention.

DETAILED DESCRIPTION

Figure 1:
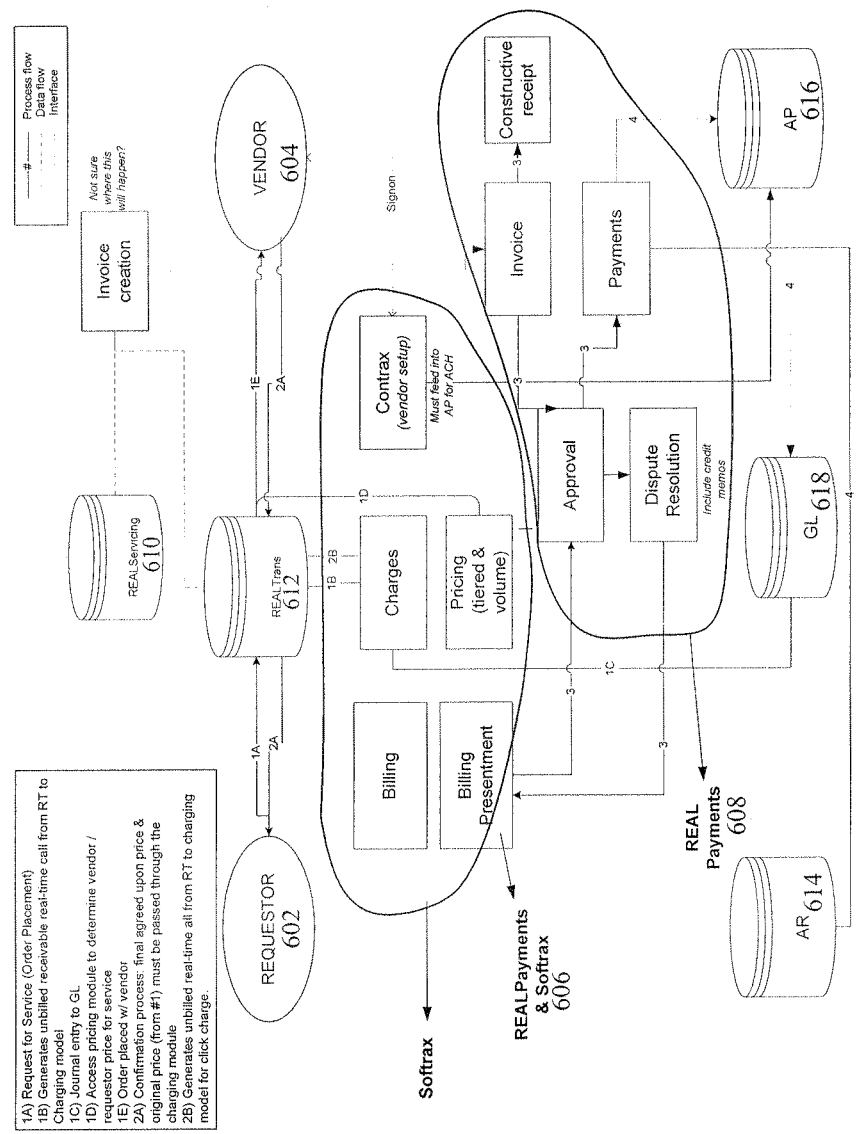
FIG. 1 shows various features of an example computer system for use in conjunction with an embodiment of the present invention.

Among other advantages, the present invention maximizes process efficiencies and reduces customer costs by automating additional processes in the transaction management lifecycle. For example, when an end user obtains a loan from a financial institution or enters into another financial transaction, goods and services are ordered in conjunction with the loan or other financial transaction. These goods and services, or sub-transactions, include, for example, a flood order, an inspection, a business process outsourcing (BPO), an appraisal, an automated valuation model (AVM), a mortgage insurance (MI) policy, or other sub-transactions associated with the loan or other financial transaction. In one embodiment, the present invention includes systems and methods for ordering these sub-transactions from vendors. The sub-transactions may be ordered by the end user, by the financial institution, by a member of an outsourced labor force, by a real estate agent or other agent for the end user, or by another party. In one embodiment, the present invention includes systems and methods for selecting a vendor for a sub-transaction.

Advantages of the present invention include the following: 1) providing customers with superior vendor management tools to automate the vendor management process; 2) creating a competitive advantage in the vendor management and transaction management market space; and 3) providing sufficient tools and features to eliminate the need to maintain another order tracking system.

The present invention works in conjunction with features designed to provide foundational vendor management functionality, as well as automated vendor distribution tools. Automated vendor distribution functionality provides requesting parties with the ability to automate the distribution of orders to select service providers based upon various loan file criteria, as well as such factors as geographic location, vendor capacity, and threshold limits. The present invention provides additional vendor management functionality to a suite of management tools.

The present invention also provides features to satisfy the order tracking and management needs of the system manager. These additional features reduce operational costs as well as expand the functionality to encompass the needs of the vendor management company, also herein interchangeably referred to as a Network Service Provider (service provider who outsources a majority of the products and services to local independent service providers).

The present invention contains features that address the following areas, among others: 1) automated ordering; 2)

vendor management processing/set-up; 3) enhanced qualitative analysis; 4) vendor distribution enhancements; 5) vendor management company accommodations; and 6) financial institution operational needs.

Automated Ordering

The Automated Ordering functionality offers full end-to-end order placement automation, optionally without the need for user intervention. This feature reduces customer costs due to the reduction in manual processes, and also reduces erroneous product ordering (e.g., ordering the wrong set of products for a specified loan).

The Automated Ordering feature allows users to utilize File and Order data to determine which products to order and when to order them. For example, a customer is able to automatically order a BPO for loans with a loan type of "refinance," and to order a full appraisal for loans with a loan type of "purchase." The functionality is designed to also combine comparison logic to automate the order placement process. For instance, a customer may want loans with a loan-to-value ratio (LTV) greater than 95%, and with a loan product of "home equity line of credit" (HELOC), handled differently than loans with a loan-to-value ratio (LTV) less than 95% and loan product of "conforming." Essentially, the Automated Ordering features handle the typical decision making scenarios that customers face on a daily basis.

To maximize the effectiveness of Automated Ordering functionality, one embodiment of the present invention offers automated product selection and order placement capabilities for various scenarios, such as file creation and order fulfillment.

The file creation scenario enables customers to trigger the automated product selection and order placement at the time a file is created. Under this scenario, file level data is utilized to determine the appropriate products to order for the specified file. The file level data includes typical order placement data, such as Premium Type, Rate Type and Renewal Type for the Mortgage Insurance product.

The order fulfillment scenario enables automatic product selection and order placement based upon order fulfillment data. Under this scenario, order fulfillment data is utilized to determine the appropriate products to order for the specified file. An example would be when a customer orders an AVM product and would like a BPO ordered if the AVM fulfillment Property Value is 10% less or greater than the Estimated Property Value.

In one embodiment, automated product selection enables requestors to create custom decision rules to automatically place orders for required products. The decision rules are based, for example, on "If, Then" logic and can include any data element from the following: loan data (pre-fulfillment data), indicating the type of loan or other transaction; fulfillment data, indicating which orders have been completed; and file/order status data, indicating the status of outstanding orders.

Loan data (pre-fulfillment data) indicates the type of loan or other transaction. In one embodiment, loan data also includes data indicating which products to order for the transaction. Loan data triggers, for example, the automatic ordering of necessary products based on file data or other transaction data. Automated ordering based on loan data eliminates the product ordering decision process and provides tool to ensure that Vendor Order Allocation requirements are satisfied.

Fulfillment data indicates which orders have been completed. Fulfillment data triggers, for example, the ordering of subsequent products based on the result of fulfillment data. For example, when an AVM value is delivered and it is greater than 20% of the original appraised value, a BPO is automatically ordered. Automated ordering based on fulfillment data eliminates the manual processing that occurs when products are fulfilled. For example, if the product is rejected, the order is automatically placed with a different vendor. As another example, if the fulfillment data does not meet the acceptance rules, an alternative product is automatically ordered.

File/order status data indicates the status of outstanding orders. File/order status data triggers, for example, automatic ordering of alternative or supplemental products based on the result of specified status changes. For example, when a mortgage loan is funded, an MI policy can automatically be activated and a flood zone determination can be automatically upgraded from a one-time to a life-of-loan. Automated ordering based on file/order status data eliminates the manual processing that occurs when the status of a file or order changes.

Vendor Management Processing

The Vendor Management Processing features enable real-time calculation of vendor capacity, threshold and late order ratios; enhanced acknowledgement file capabilities; and enhancements to vendor management distribution processing trigger, including pre-order placement.

The present invention also provides functionality to aid vendors and Vendor Management Companies (VMCs). One embodiment of the present invention includes functionality to automate the selection of an independent service provider for an order. Vendor Management Processing features also provide functionality to score independent service providers.

One embodiment of the present invention uses a parent-child infrastructure to describe corporations, such as vendors. Thus, a corporation may be described as a hierarchy. For example, a corporation is described as a parent, subsidiaries are described as children of the corporation, and offices are described as children of subsidiaries. Users are described as children of offices. The present invention may include additional parent-child infrastructure describing some users as children of others. Additionally, work groups may be defined, which include users from one or more offices. This is simply one example of a parent-child hierarchy for a corporation. Many others are possible.

The parent-child infrastructure (PCI) enables support of companies with multiple levels in their corporate hierarchy. PCI provides the ability to track orders and generate reports at any level in the hierarchy.

PCI features enable vendors or others to: customize corporate level labels, add offices at each level, add users to each office, view the corporate hierarchy, add users to multiple workgroups, assign orders to workgroups, search files by corporate level and office, generate reports by corporate level and office, view the administrative history log, provide certain privileges (e.g., menu options, products to order, order assignment) for normal users, access enhanced setup for products to order, bulk assign orders to workgroups, assign files to users or workgroups, bulk assign files to a project, or display file assignment in the order manager.

Qualitative Analysis

The Qualitative Analysis segment provides qualitative performance analysis tools for customers. Features enable the requesting party to monitor and evaluate a service provider's Service Level Agreement price, turn-around time, and quality score. Qualitative analysis functionality also generates a unique score for each customer's service provider by supporting the ability to combine and weight the qualitative and timeline performance scores. Embodiments of the invention also include a scoring mechanism for evaluating a service provider's turn-around-time performance. These Qualitative Analysis functionalities allow for greater support of multiple vendor selection methodologies.

In one embodiment, a cumulative vendor score is based on a customized ratio. The cumulative vendor score is calculated, for example, by summing a weighted vendor quality score and a weighted vendor service score. The vendor quality score may incorporate factors such as customer satisfaction and price, and the vendor service score may take into account such factors as late orders and turnaround time.

Vendor Distribution

The present invention provides functionality to automatically distribute work to vendors based on a set of criteria. These criteria include the features of the Qualitative Analysis segment, as well as additional distribution criteria and logic. The present invention provides the ability to manage the distribution levels based upon a service provider's outstanding late order volume and new order volume, as well as withholding order distribution to a specified vendor for a specified period of time.

Vendor Management Company Accommodations

The present invention provides additional functionality for Vendor Management Companies (VMCs). VMCs maintain and manage large groups of independent service providers. An example would be a company that receives nationwide orders for appraisal services and in turn distributes those orders to smaller independent service providers across the nation. The independent service provider then submits the product fulfillments back to the VMC. The VMC then reviews the work product for quality and transfers the fulfillment to the original ordering party. The present invention provides the VMC with the same vendor management tools available to the Requestor. The present invention allows a VMC to automate the distribution of orders to their down-line service providers, or perform qualitative analysis of the down-line service provider's performance.

Financial Institution Operational Needs

The present invention provides a set of operational tools to support the day-to-day operational and management needs of the financial institution. The tools are fully integrated with applications and may even reside with the present invention. By providing operational tools for the customer, the customer can eliminate the need to maintain and manage a separate order tracking system.

In one embodiment of the present invention, an outsourced labor force assists in non-automated transaction management operations. In one embodiment, the labor force-assisted operations include, for example: mortgage origination transactions, such as processing, decisioning, and closing; accounting services, such as cashiering, accounts payable, corporate accounting functions, and investor reporting; call center services, such as early stage collection, inbound customer service calls, skip tracing, and late stage unsecured collections; title insurance services, such as assignments and lien releases; mortgage servicing, such as customer research/services, escrow, payoffs and loan satisfactions, and loan setup/imaging; default services, such as loan resolution/bankruptcy and foreclosure/REO/claims; real estate analytics, such as reality advisors, commercial servicing, and mortgage analytics/capital markets; and data entry services.

Example embodiments will now be described in conjunction with the following figures.

FIG. 1 shows various features of an example computer system 600 for use in conjunction with an embodiment of the present invention. As shown in FIG. 1, the computer system is used by a requestor 602 or a representative of the requestor 602 to order goods or services from a vendor 604. The system includes a REALPayments and Softrax module 606 that includes functionality for billing, billing presentment, charges, pricing, and vendor setup. The system also includes a REALPayments module 608 that includes functionality for approval, dispute resolution, invoice, payments, and constructive receipts. The system 600 also includes functionality for invoice creation. The system 600 also includes or otherwise has access to one or more databases, such as, for example, a REALServicing database 610, a REALTrans database 612, an accounts receivable (AR) database 614, an accounts payable (AP) database 616, and a general ledger (GL) database 618. Features of the REALPayments and Softrax module 606, the REALPayments module 608, and the REALServicing, REALTrans, AR, AP, and GL databases 610, 612, 614, 616, and 618 are described in copending U.S. patent application Ser. No. 09/512,845 titled "Method for Workflow Processing Through Computer Network," filed Feb. 25, 2000; copending U.S. patent application Ser. No. 10/102,104 titled "Management and Reporting System and Process for Use with Multiple Disparate Data Base," filed Mar. 19, 2002; copending U.S. patent application Ser. No. 10/408,079 titled "Method and Apparatus for Providing Selective Access to Information," filed Apr. 4, 2003; copending U.S. Provisional Application Ser. No. 60/495,103 titled "Electronic Ordering, Invoice Presentment, and Payment System and Method," filed Aug. 15, 2003; copending U.S. patent application Ser. No. 10/729,019 titled "Expense Tracking, Electronic Ordering, Invoice Presentment, and Payment System and Method," filed Dec. 8, 2003. The entirety of each of those patent applications is incorporated herein by reference.

Figure 2:
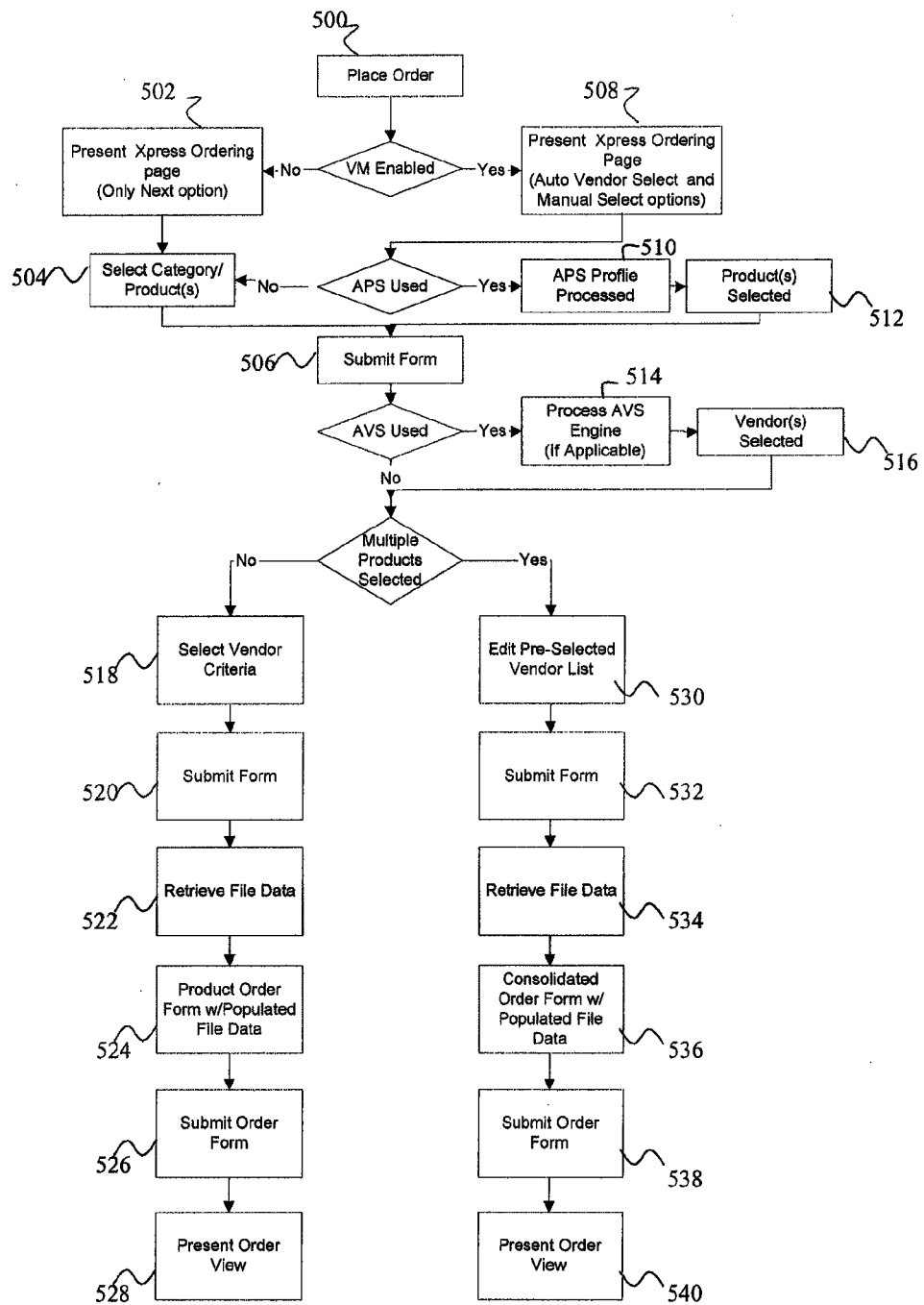
FIG. 2 presents an example flow diagram of functions performed in accordance with an embodiment of the present invention.

FIG. 2 presents an example flow diagram showing the pages a user might encounter, in accordance with an embodiment of the present invention. A user first places an order 500. If Vendor Management (VM) is not enabled, an Xpress ordering Graphical User Interface (GUI) screen is displayed 502. The user then, for example, selects one or more sub-transactions (also referred to as orders or products) 504, and submits the order 506.

If VM is enabled, a VM Xpress ordering GUI page is displayed 508. If Automated Product Selection (APS) is used, the APS profile is processed 510 and the sub-transaction or product(s) is selected 512. If APS is not used, the user then selects products 504. The order is then submitted 506.

If AVS is used, the AVS engine processes order and vendor parameters 514 and selects a vendor(s) 516.

If only one sub-transaction, product, or order has been triggered, a vendor criteria GUI screen is displayed 518 and vendor criteria are selected. The vendor criteria are then submitted 520. The file data for the transaction are retrieved 522. Some fields in the order or sub-transaction are populated with data from the transaction 524, and a product order form GUI screen is displayed. A user edits the product order form, and the order form is then submitted 526. Information about the order or sub-transaction is displayed 528, for example, automatically or at a request from a user.

If more than one product, order, or sub-transaction have been triggered, a vendor selection GUI screen is displayed 530, and the user edits a pre-selected vendor list. The edited vendor list is then submitted 532. The file data for the transaction are retrieved 534 and fields in the sub-transactions are populated with data from the transaction. A consolidated order form GUI screen is displayed 536. The order form is submitted 538 and the information about the orders or sub-transactions is displayed 540.

In one embodiment, the invention includes machine-executable instructions stored in a computer-readable medium. These machine-executable instructions include software functions that perform specific actions. A list of the software functions of this embodiment is shown in Table 1.

Figure 3:
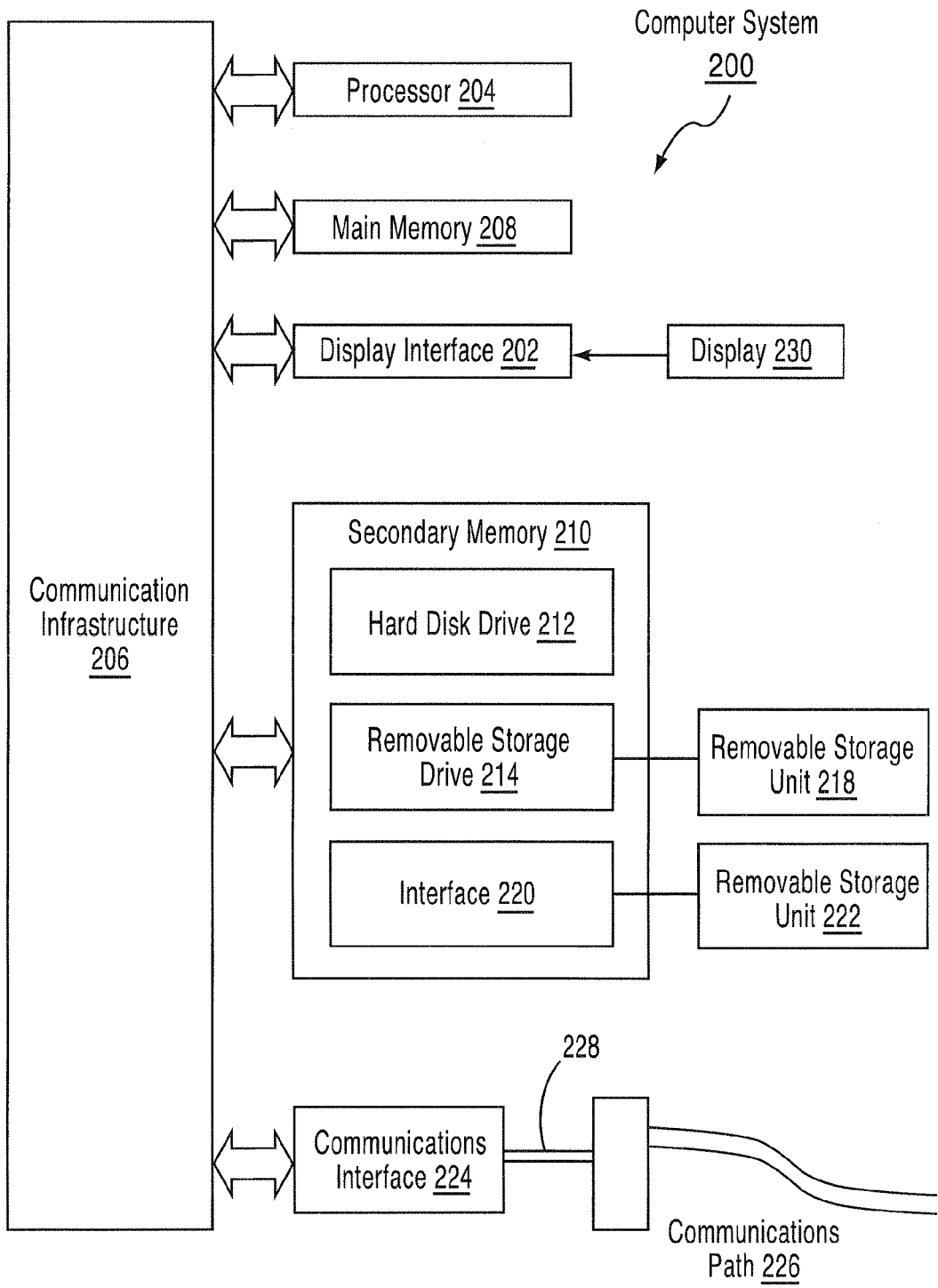
FIG. 3 presents an exemplary system diagram of various hardware components and other features, in accordance with an embodiment of the present invention.

The present invention may be implemented using hardware, software or a combination thereof and may be implemented in one or more computer systems or other processing systems. In one embodiment, the invention is directed toward one or more computer systems capable of carrying out the functionality described herein. An example of such a computer system 200 is shown in FIG. 3.

Computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 4:
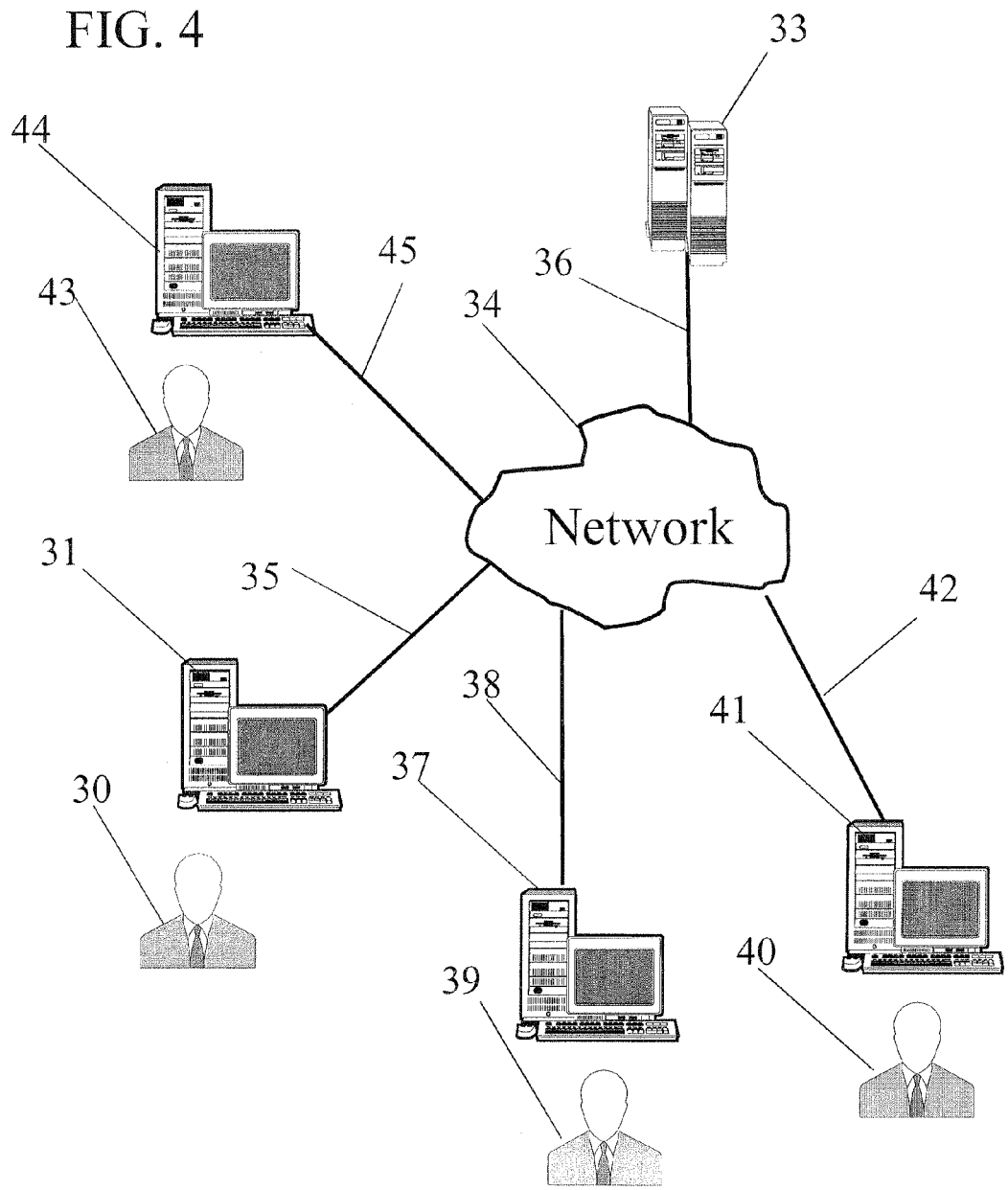
FIG. 4 is a block diagram of various system components, in accordance with an embodiment of the present invention.

FIG. 4 presents an exemplary system diagram of various hardware components and other features in accordance with an embodiment of the present invention. As shown in FIG. 4, in an embodiment of the present invention, data and other information and services for use in the system is, for example, input by an end user 30 via a terminal 31. The terminal 31 is coupled to a server 33 via a network 34, such as the Internet, via couplings 35, 36. In one embodiment, a vendor 39 also inputs information/data via a terminal 37 coupled 38 to the network 34. Furthermore in one embodiment, a member of an outsourced workforce 40 inputs information/data via a terminal 41 coupled 42 to the network 34, and in another embodiment, a member of a financial institution workforce 43 inputs information/data via a terminal 44 coupled 45 to the network 34.

Each of the terminals 31, 37, 41, 44 is, for example, a personal computer (PC), minicomputer, mainframe computer, microcomputer, telephone device, personal digital assistant (PDA), or other device having a processor and input capability. The terminal 31 is coupled to a server 33, such as a PC, minicomputer, mainframe computer, microcomputer, or other device having a processor and a repository for data or connection to a repository for maintained data.

In operation, in an embodiment of the present invention, via the network 34, vendor data, transactional data, sub-transactional data, order data and/or other information is communicated with the server 33. The server 33 receives and resolves the transaction including triggering and resolving sub-transactions, stores data regarding the transaction, vendor, and sub-transaction, and documents the transaction (e.g., electronically).

In one embodiment, the present invention uses active server page (ASP) technology to deliver information and services to a user. This may include one or more ASPs stored on the server 33. This reduces the maintenance expense and hardware expense, results in limited implementation/integration costs, limited support expense, and low total cost of ownership.

In one embodiment of the present invention, information relating to a transaction, such as a loan, is stored electronically. This information is referred to interchangeably as a virtual loan file. Among other things, the virtual loan file enables data mining, reduces post closing quality reviews, facilitates secondary market due diligence, streamlines loan servicing functions, reduces data archive costs, reduces processing costs, automates routine and decision based processes, and reduces data entry errors.

In one embodiment, the present invention includes a branded customer portal, which enables a customer, such as a mortgage company, to tailor the look and feel of a software system, as well as the information and services provided by the software system, to the company's particular needs.

Figure 5:
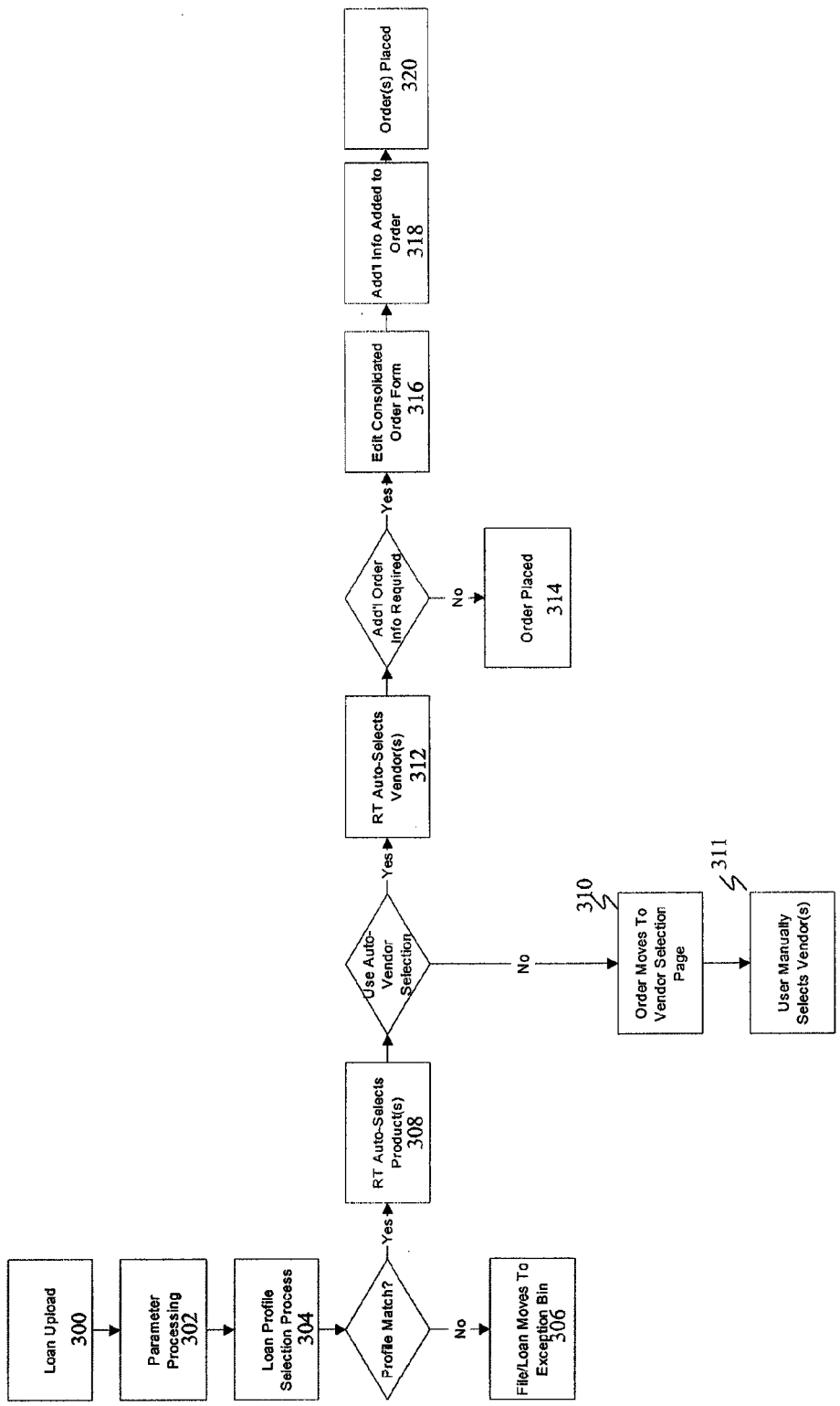
FIG. 5 presents an example flow diagram of functions performed in accordance with an embodiment of the present invention.

FIG. 5 shows an example flow diagram of a process for providing automatic ordering for a sub-transaction associated with a particular transaction, in accordance with an embodiment of the present invention. This flow diagram demonstrates automatic ordering of a sub-transaction, triggered by the input of a transaction. As shown in FIG. 5, specific parameters for a particular transaction, such as a loan, are input into the system 300. In one implementation, this action is performed, for example, by a member of an outsourced labor force. Alternatively, the parameters are input by an end user, such as an individual wishing to obtain a mortgage. The parameters input into the system are then processed 302. A transaction matching the input parameters is then selected 304. For example, a particular type of home loan may be selected that matches the parameters. If there is no transaction with a profile matching the parameters, the file or transaction is moved to an exception bin 306.

In one embodiment, if a transaction matching the input parameters is selected, one or more sub-transactions or orders, such as providing products or services, are automatically selected 308. The sub-transactions automatically selected 308 are, for example, sub-transactions that are required for the selected transaction. If the auto-vendor selection function is not present or is not selected, the sub-transactions, also referred to as orders, move to the vendor selection page 310, and vendor(s) for the sub-transaction(s) are manually selected 311. The vendor(s) are manually selected 311, for example, by an end user, by an employee of the financial institution, or by a member of a third-party outsourced labor force.

If the auto-vendor selection function is present and is enabled, a vendor is automatically selected 312. If no additional information for the sub-transaction or order is required, the order is placed 314. If additional information for the sub-transaction or order is required, an order form corresponding to the order is edited 316, for example, by an end user, by an employee of the financial institution, or by a member of a third-party outsourced labor force. In one embodiment, additional information is input 318, by such users as, for example, the end user, the employee of the financial institution, or the member of a third-party outsourced labor force. The order is then placed 320.

Figure 6:
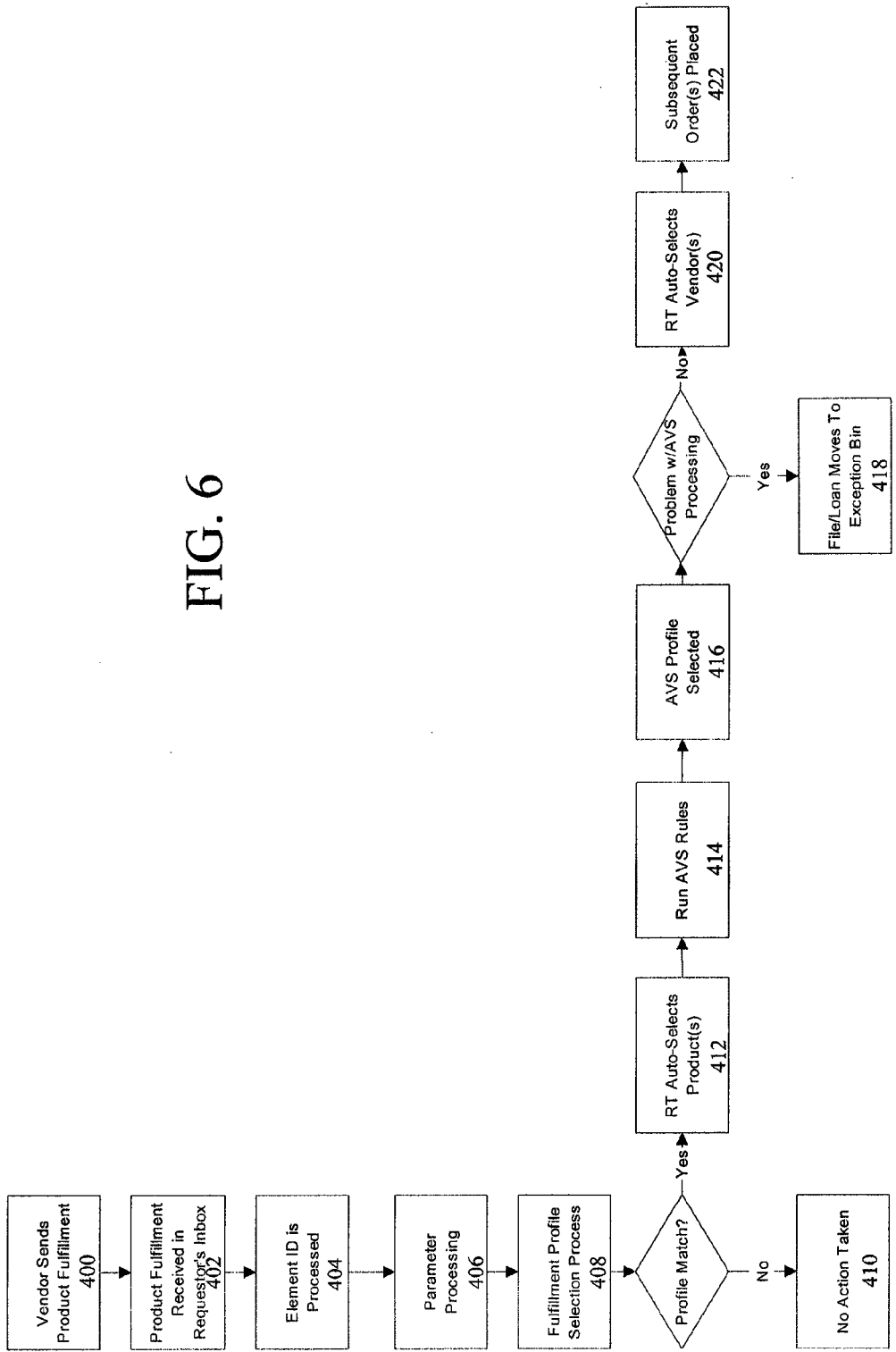
FIG. 6 presents an example flow diagram of functions performed in accordance with an embodiment of the present invention.

FIG. 6 shows an example flow diagram of a process for providing automatic ordering for a sub-transaction associated with a particular transaction, in accordance with an embodiment of the present invention. This flow diagram demonstrates automatic ordering of a second sub-transaction, triggered by the completion of a first sub-transaction. This type of triggering may be useful, for example, in situations in which two or more sub-transactions must occur in a particular sequence. The sequence of the sub-transactions is be specified, for example, in the profile for a particular transaction.

The automatic ordering process begins, for example, when a vendor sends a product fulfillment indication 400, signifying that the vendor has completed a first sub-transaction. The sub-transaction is associated with a particular instance of a particular transaction, such as a particular type of home loan for a particular end user. The product fulfillment is then received 402. In one embodiment, a particular identification code is examined or processed 404 to identify the instance of the transaction. The parameters of the instance of the transaction are processed or updated 406.

Fulfillment profile selection 408 is then performed. This includes, for example, examining the profile for the transaction to determine if the fulfillment of the first sub-transaction triggers a second sub-transaction. If the profile does not indicate that a second sub-transaction should be triggered, no action is taken 410. If the profile indicates that one or more second sub-transactions should be triggered, the subsequent sub-transaction(s) are selected 412 (e.g., automatically). The following actions are then optionally performed for each of the subsequent sub-transaction(s). Automatic Vendor Selection (AVS) rules are examined and run 414, and an AVS profile is selected 416. If there is a problem with one of the AVS processing functions, the file or loan is moved to an exception bin 418. Otherwise, a vendor is selected 420 (e.g., automatically) for the subsequent sub-transaction and an order is placed 422 for the subsequent sub-transaction.

Figure 7:
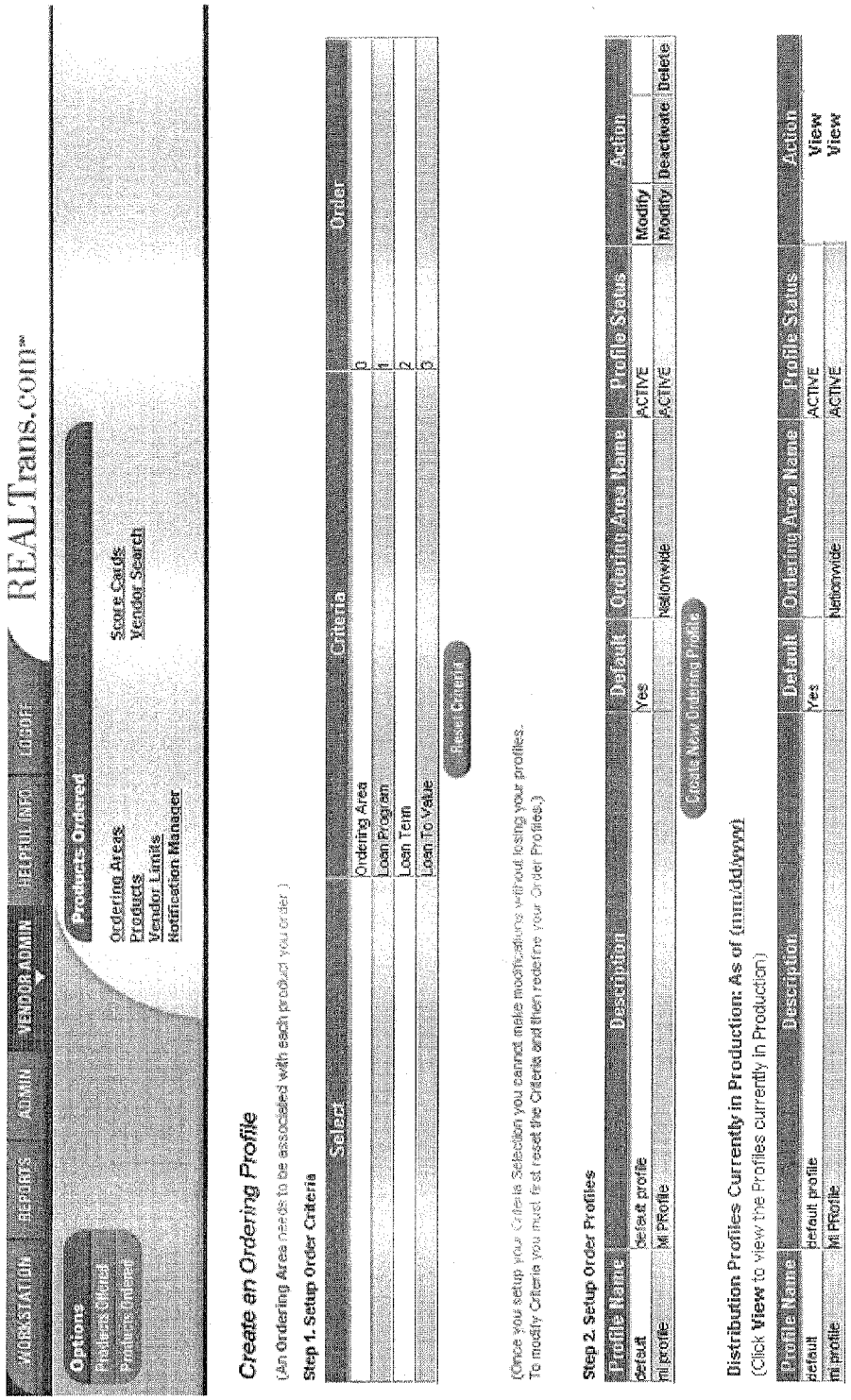
Figure 8:
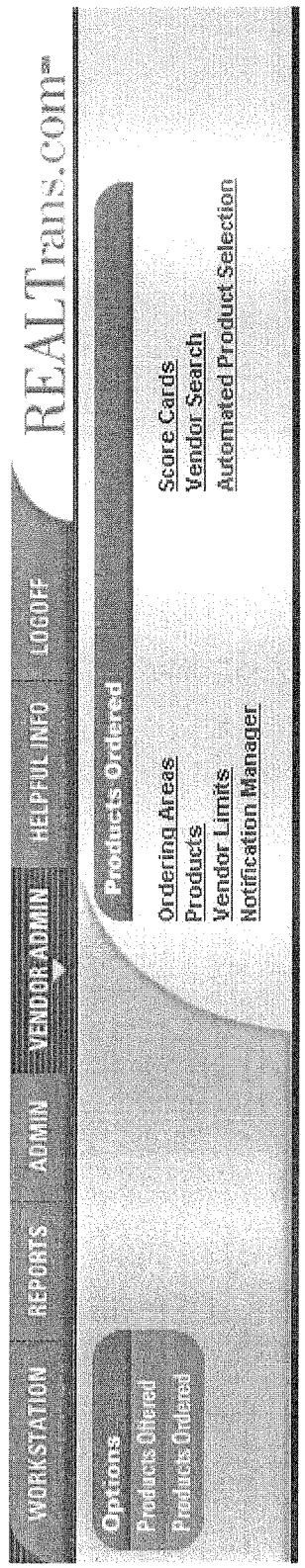

FIGS. 7-56 illustrate example GUI screens presented to a user ordering goods and services, in accordance with an embodiment of the present invention. After logging in or otherwise entering the system, a user is presented with the GUI screen of FIG. 7. The user selects "Vendor Admin" and is presented with the GUI screen of FIG. 8. The user selects "Score Cards" and is presented with the GUI screen of FIG. 9. The user selects "Cumulative Score" and is presented with the GUI screen of FIG. 10. The GUI screen presents the user with all the cumulative score cards the user has previously created, and presents the user with an option to create a new cumulative score card.

Figure 11:
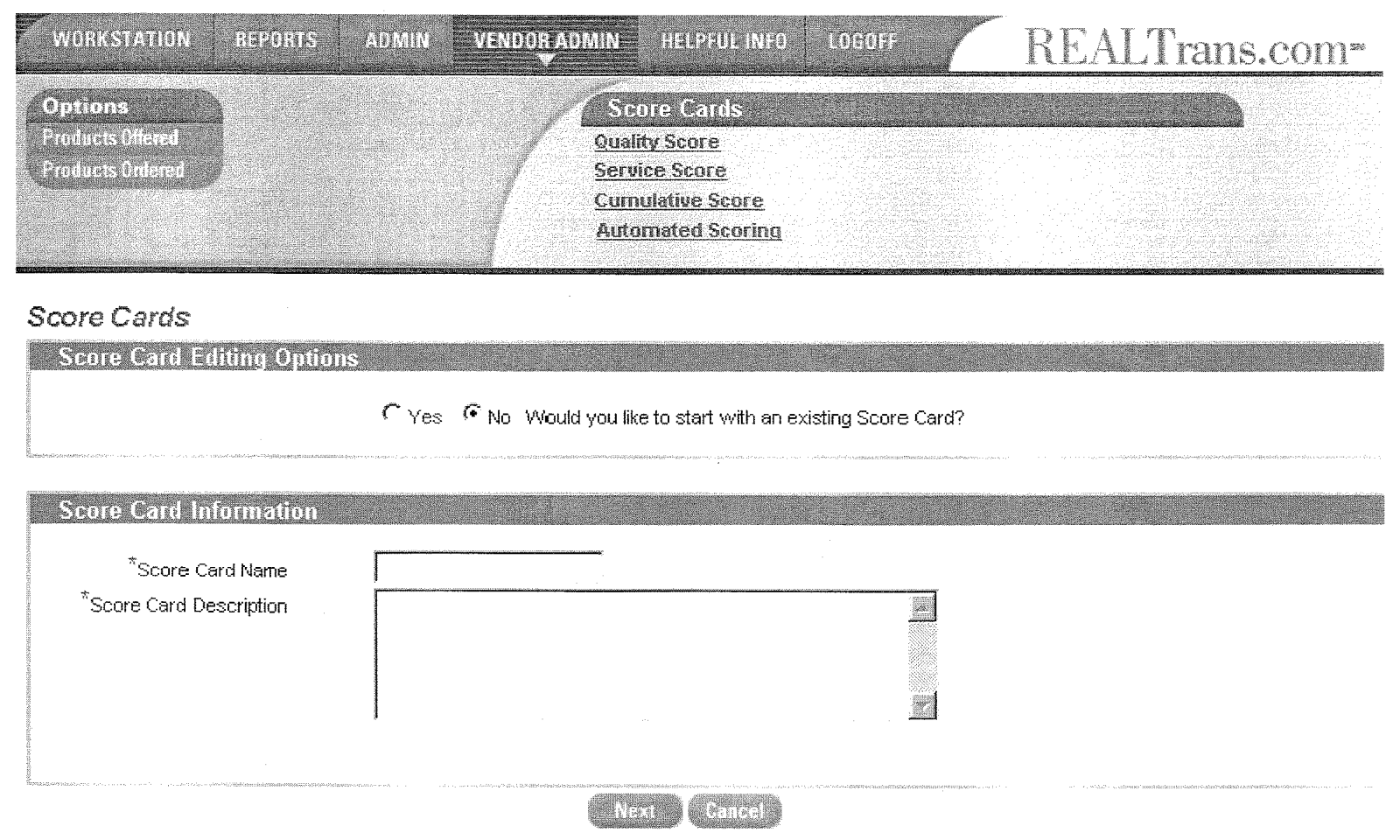

The user selects "Create new score card" and is presented with the GUI screen of FIG. 11. The user enters information pertaining to the items and vendors to be scored in FIGS. 11-12, and selects "Save" to create a new score card.

Figure 9:
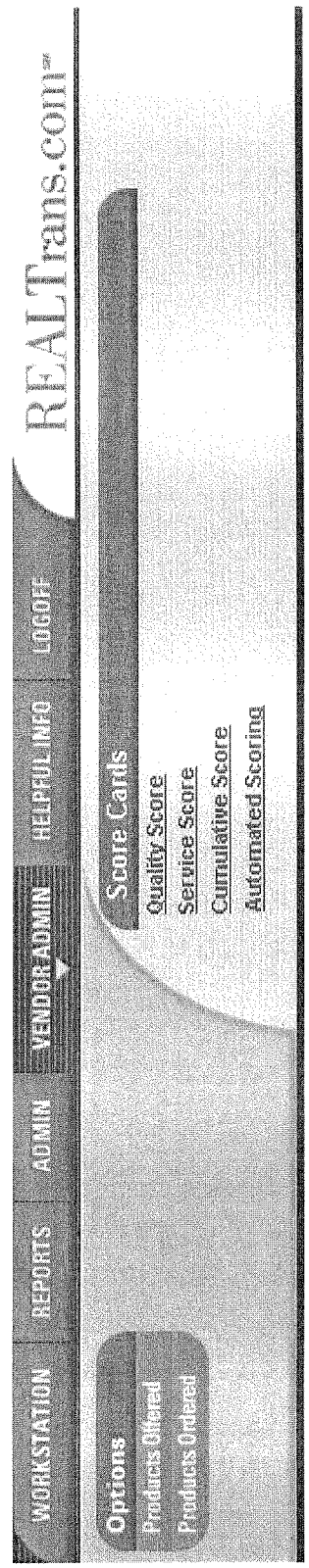
Figure 10:
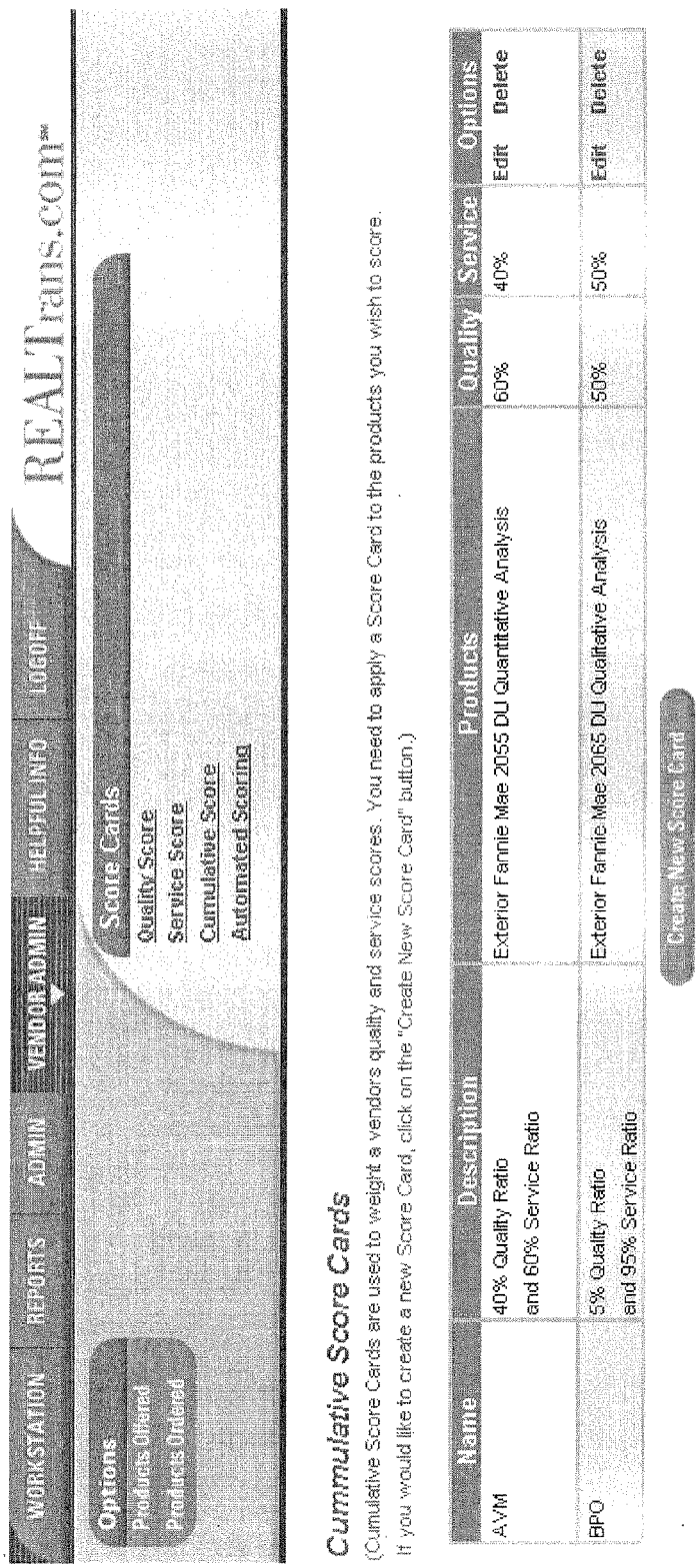
Figure 12:
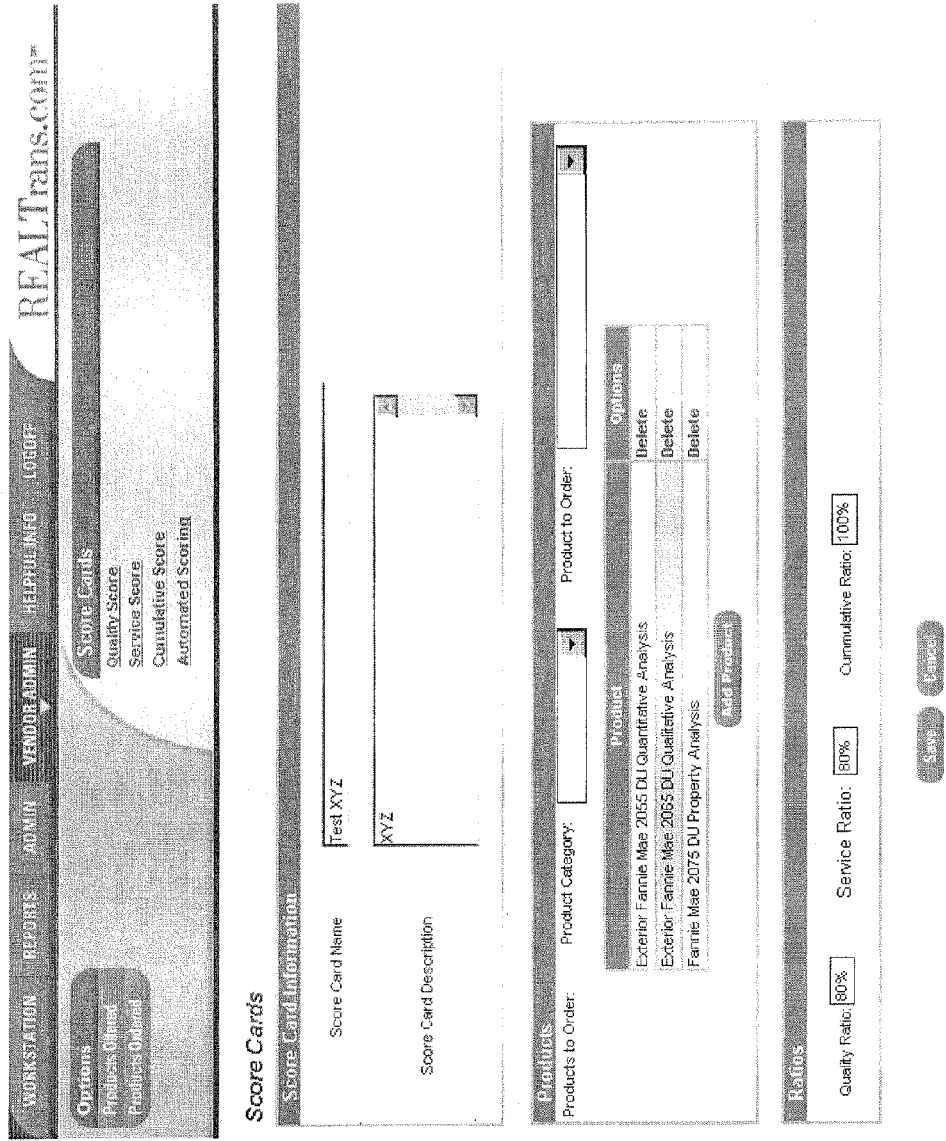
Figure 14:
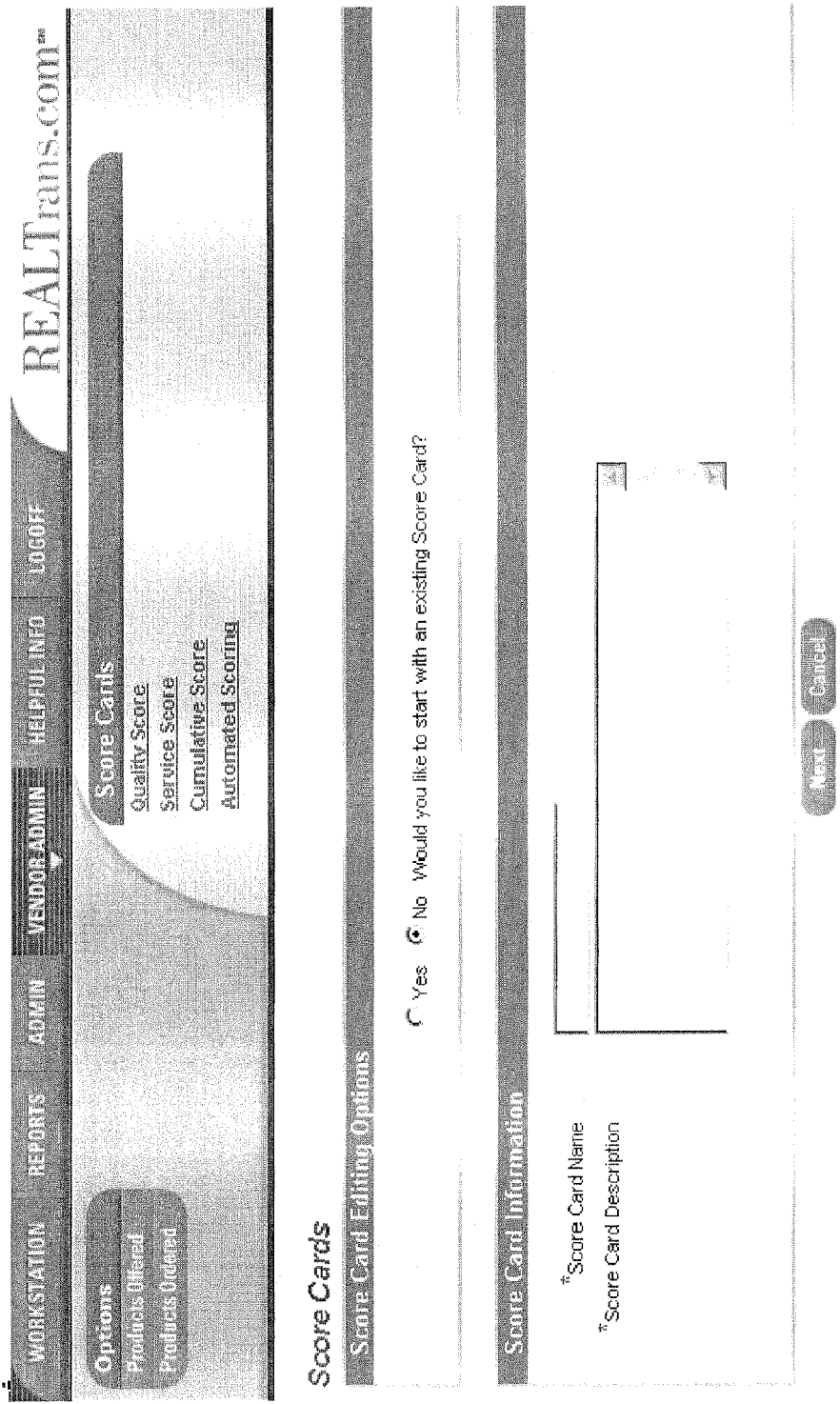
Figure 15:
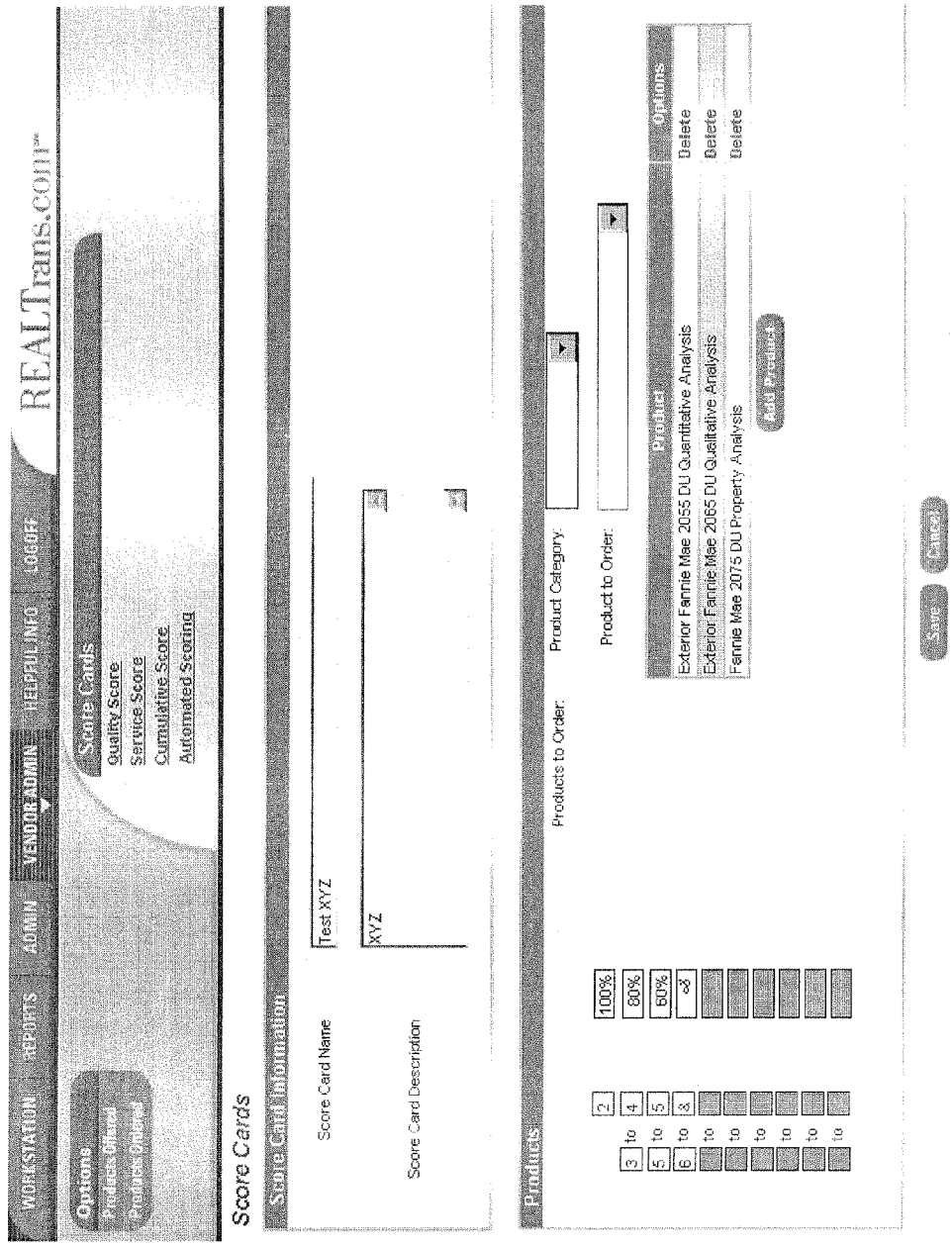

If the user selects "Service Score" from the GUI screen of FIG. 9, the GUI screen of FIG. 13 is presented. This screen displays all the service score cards, each card including a timeliness score or service score. The user has the option to create a new service score card by entering information into the GUI screens of FIGS. 14-15.

Figure 16:
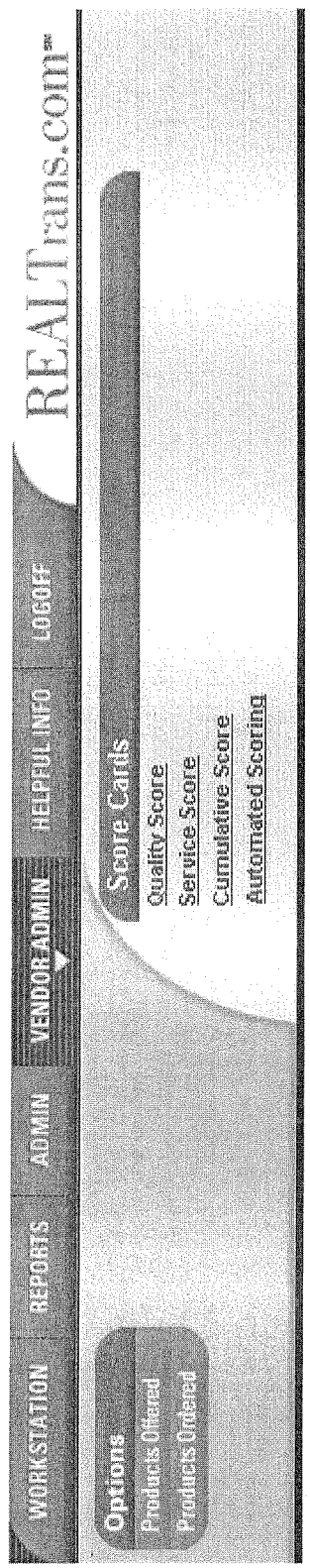
Figure 17:
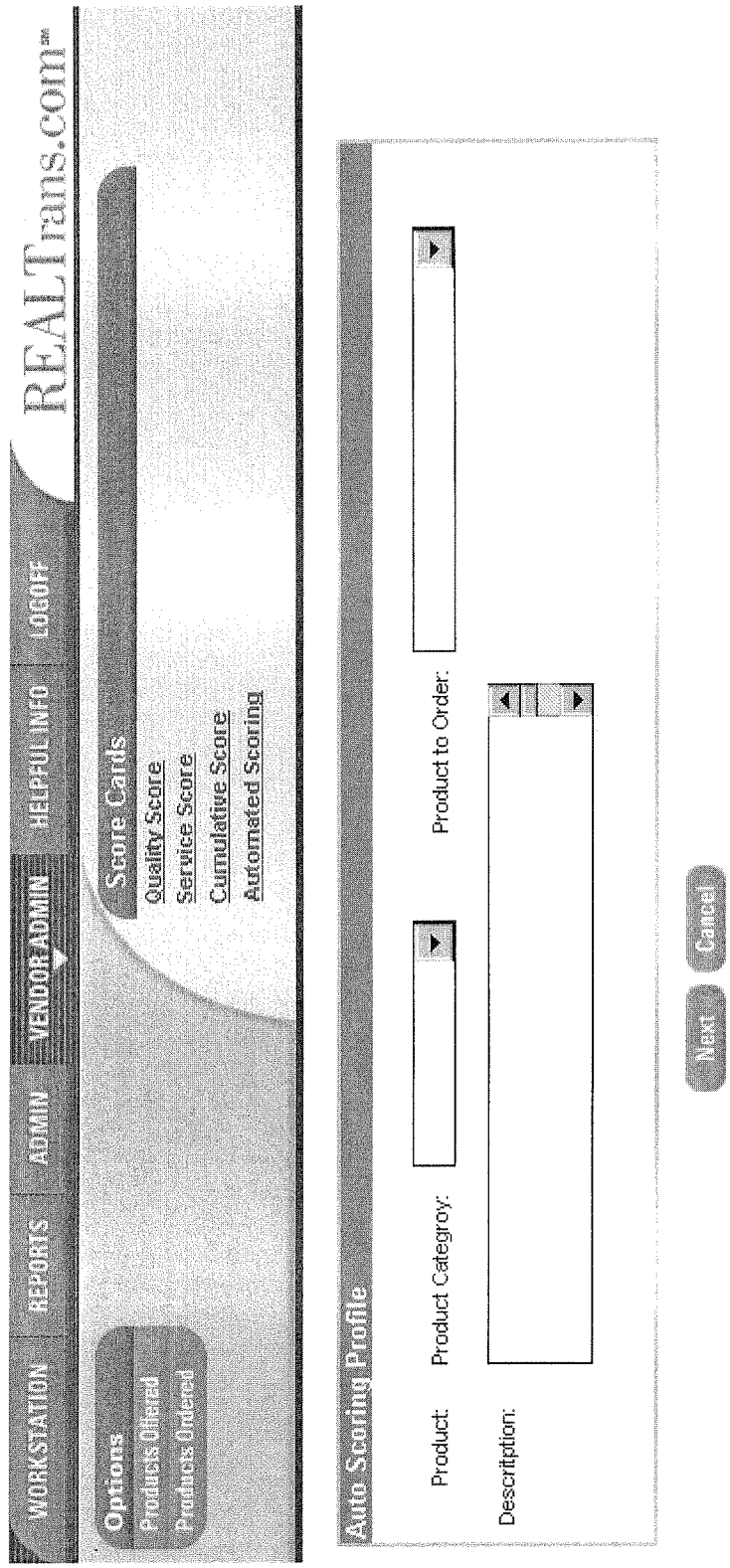
Figure 18:
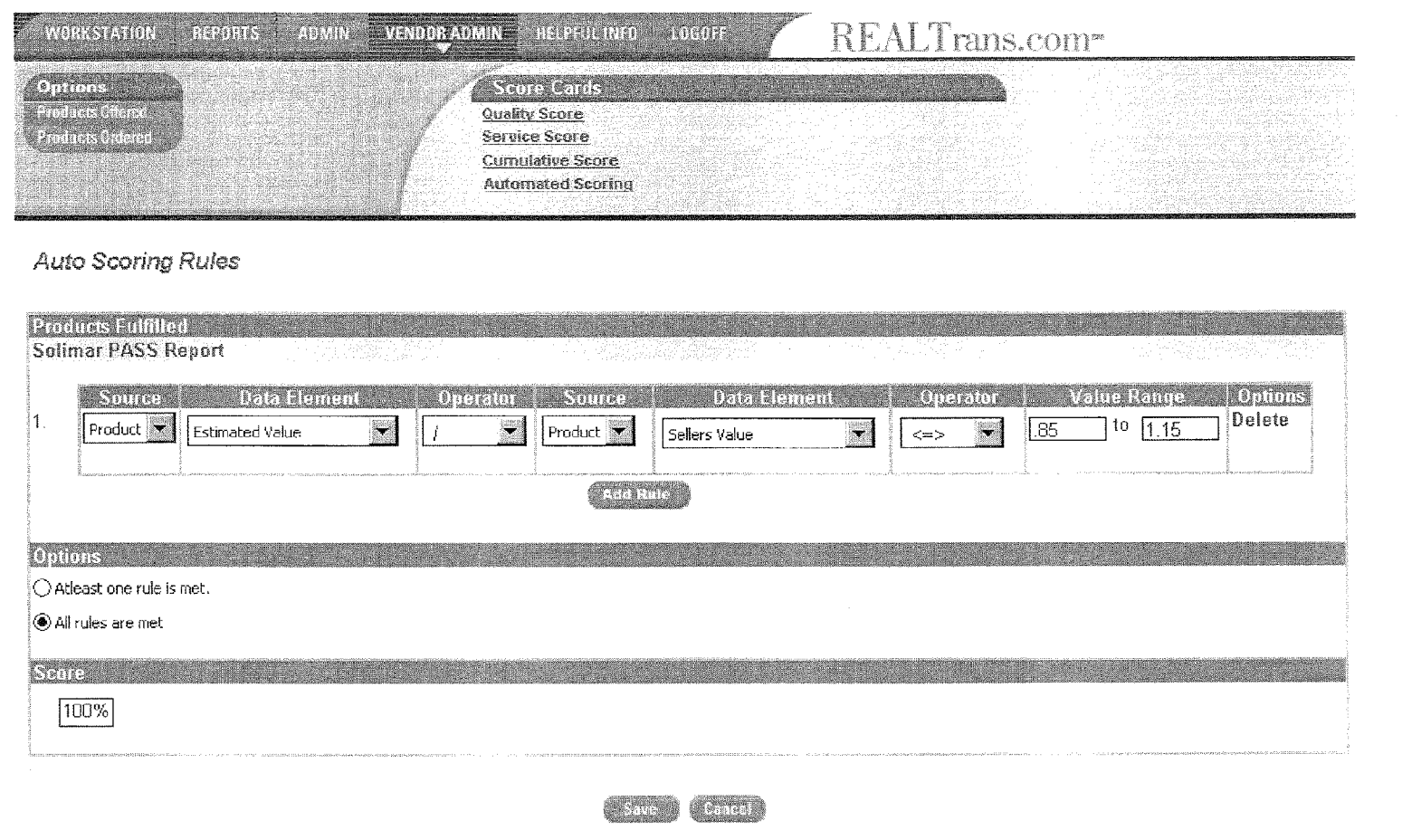

If the user selects "Automated Scoring" from the GUI screen of FIG. 9, the GUI screen of FIG. 16 is presented. This screen displays all the automated score cards. The user has the option to create a new automated score card by entering information into the GUI screens of FIGS. 17-18.

Figure 19:
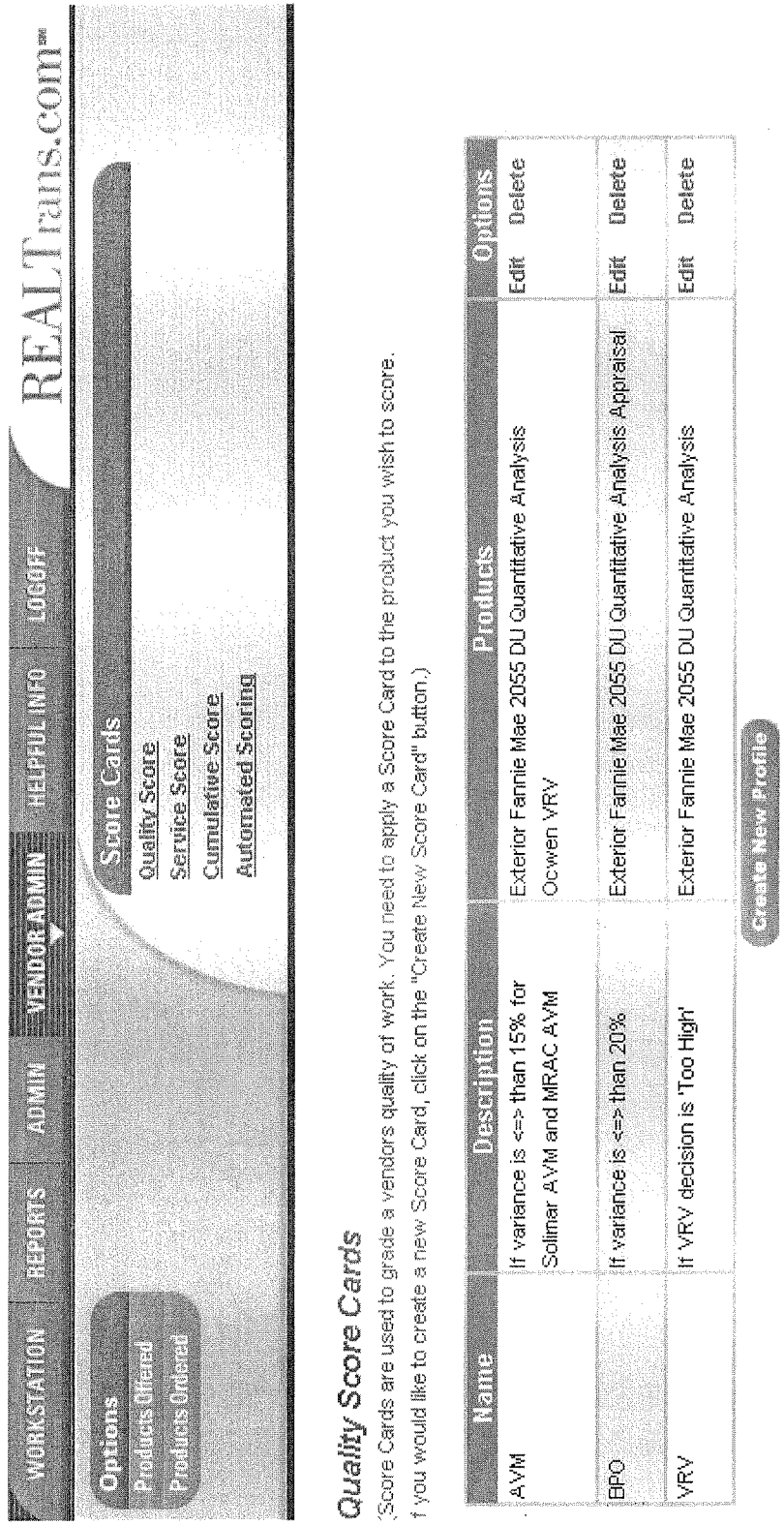
Figure 20:
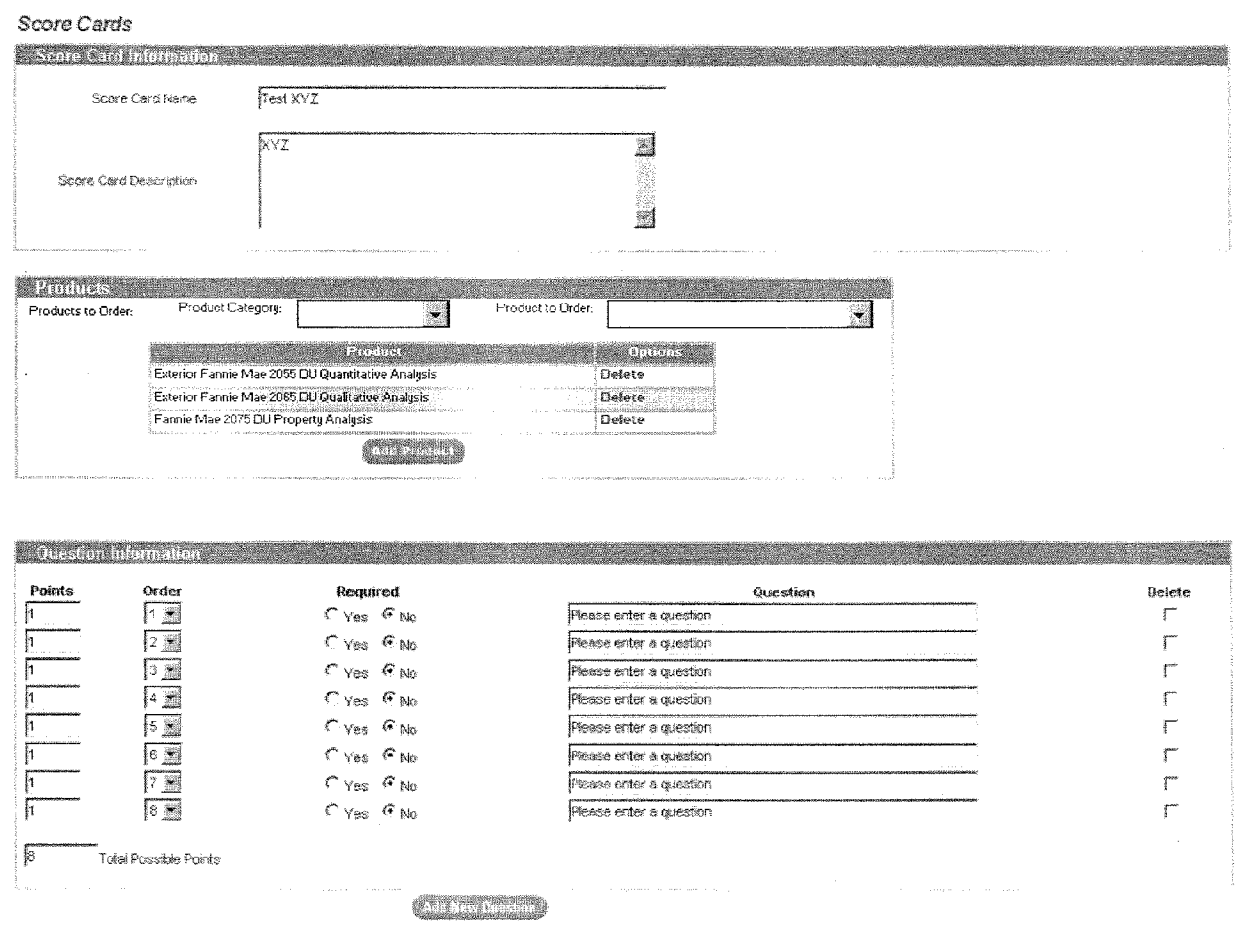

If the user selects "Quality score" from the GUI screen of FIG. 9, the GUI screen of FIG. 19 is presented. This screen displays all the quality score cards, which score the quality of work. The user has the option to create a new quality score card by entering information into the GUI screen of FIG. 20.

Figure 22:
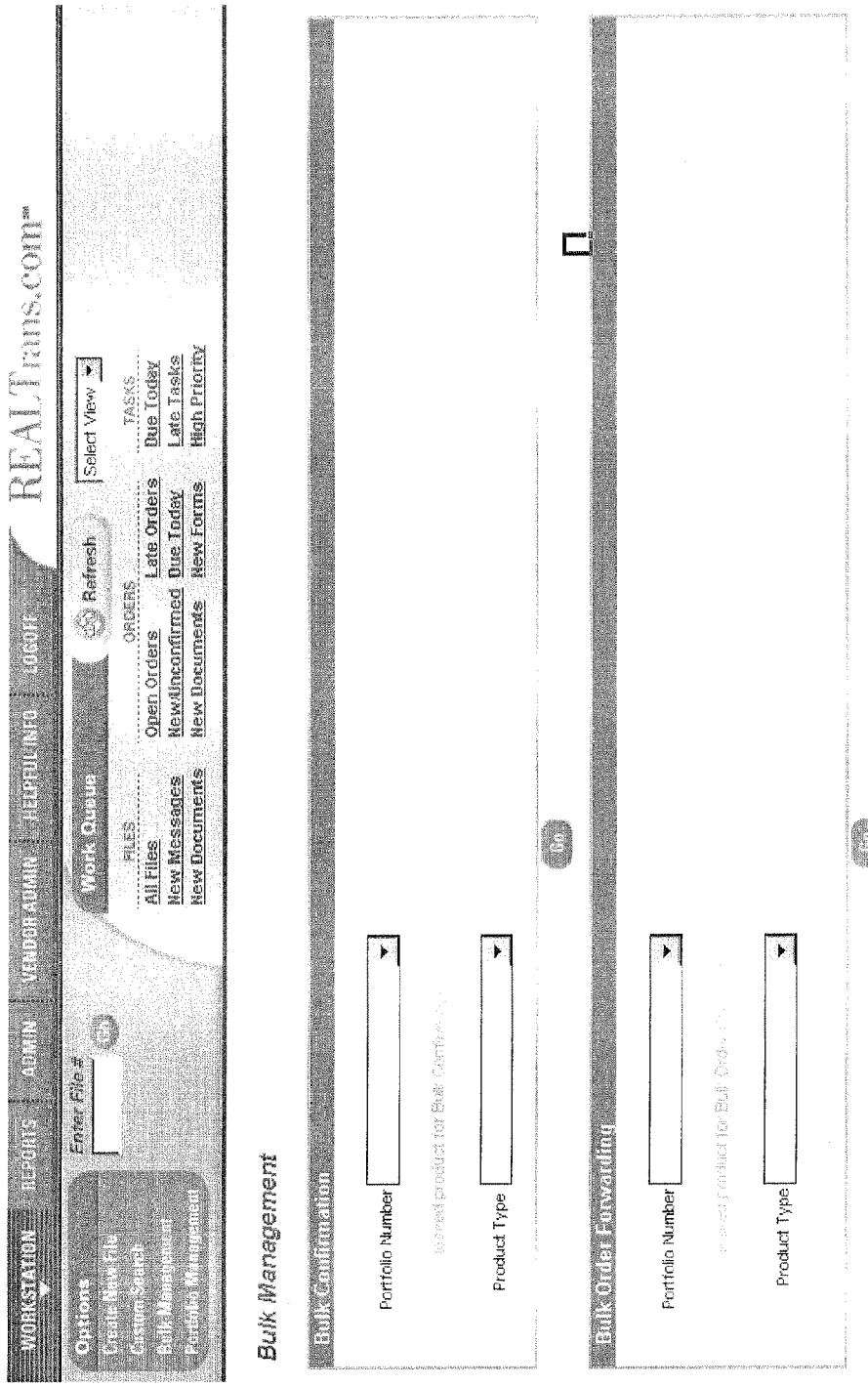
Figure 23:
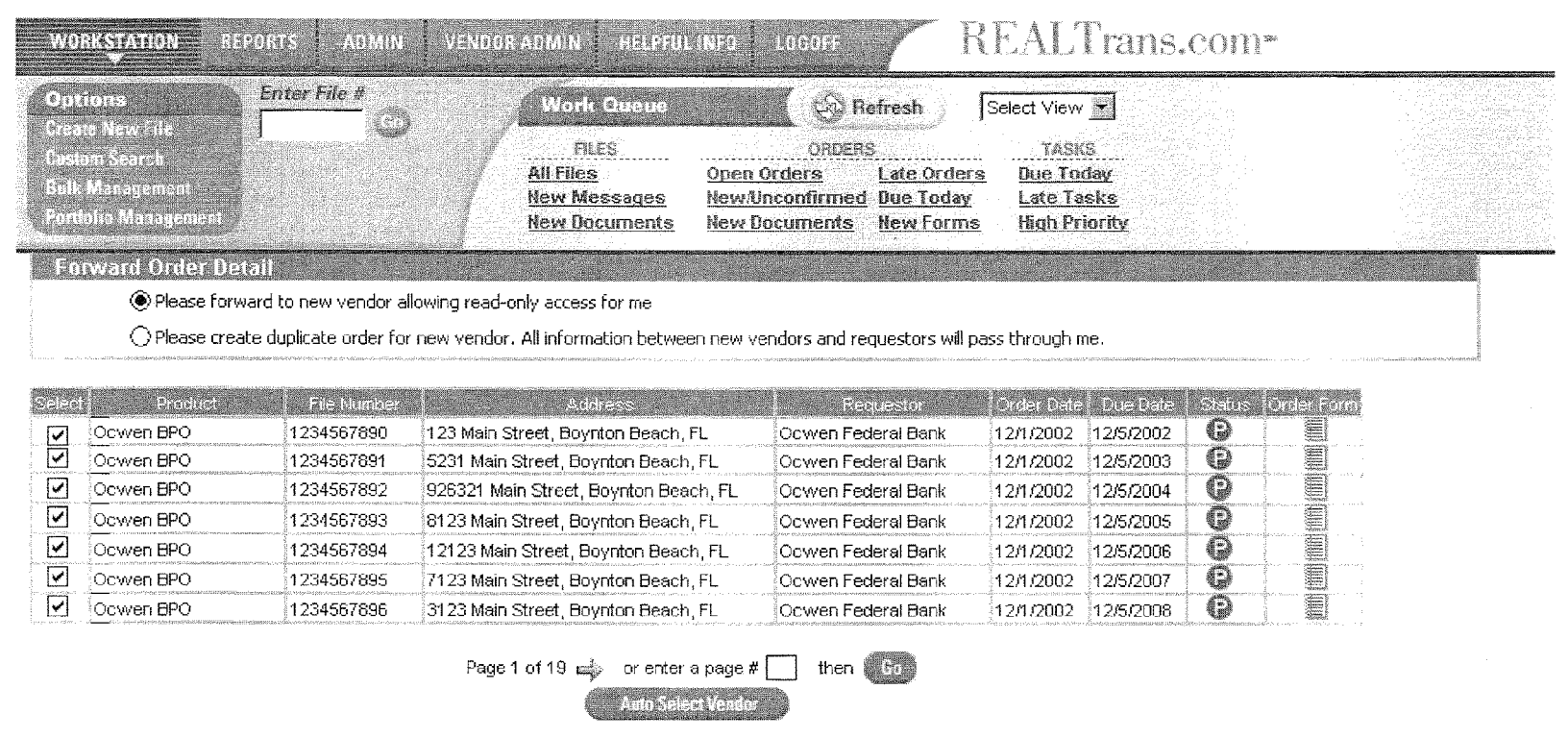

FIG. 21 is a GUI screen that allows a user to select a vendor for a particular order and to transmit the order to the vendor. FIGS. 22-23 are GUI screens that allow a user to place a bulk order for an order package consisting of two or more goods or services. Bulk ordering provides, for example, a cost benefit to the user. The user may select a vendor for each product or may enable autoselect, in which case the vendors will be automatically selected.

FIGS. 24-35 are sample GUI screens that may be presented to a user, such as a user wishing to enroll a vendor in a system. FIG. 24 is a GUI screen that allows the user to input general company information for the vendor. FIG. 25 is a GUI screen that is presented to a user enrolling a VMC. This screen allows the user to input criteria related to sub-distribution among independent service providers, such as the available independent service providers, and the criteria to use in distributing work orders among independent service providers. The GUI screen of FIG. 26 allows the user to enter the workload capacity for the vendor.

Figure 27:
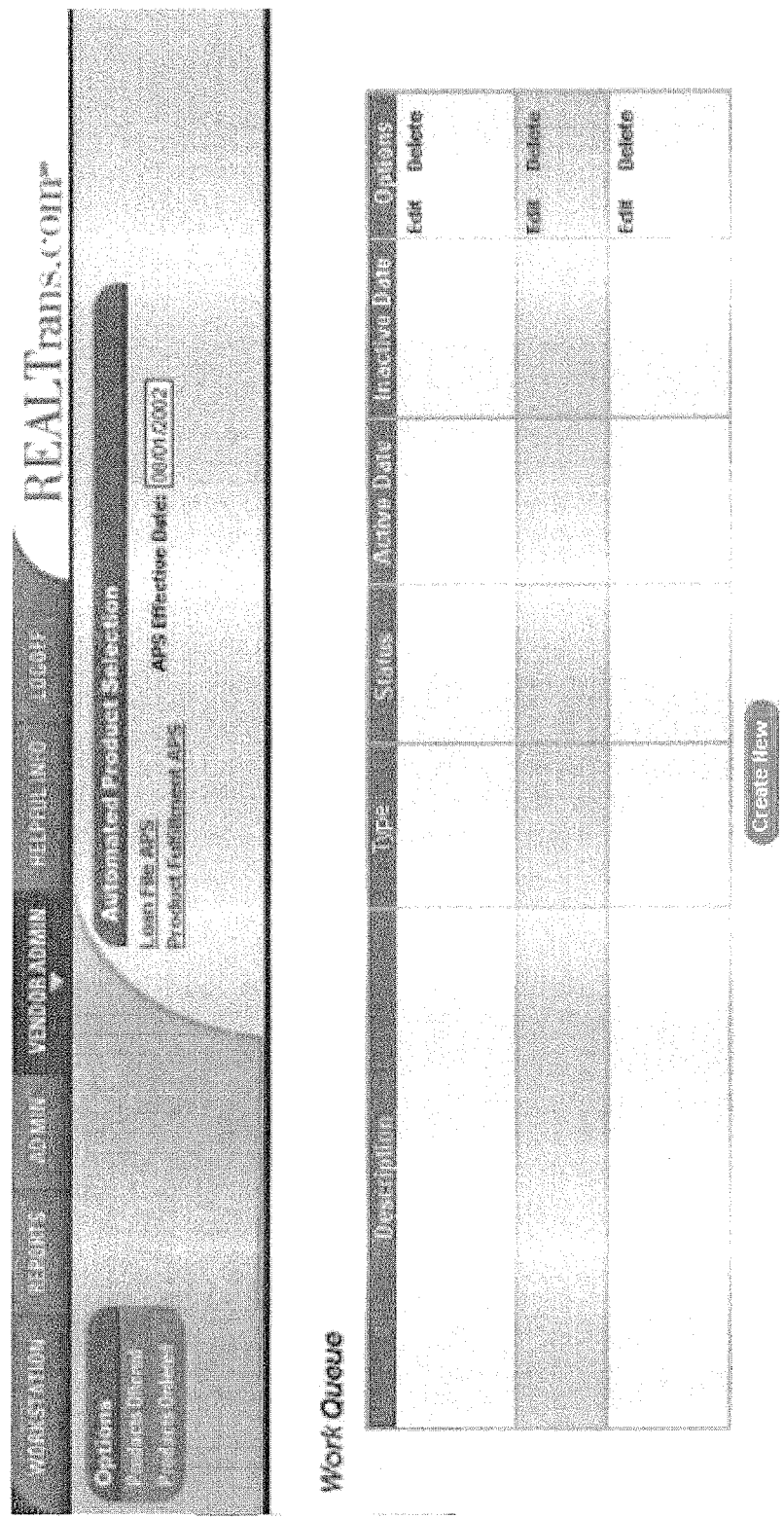
Figure 28:
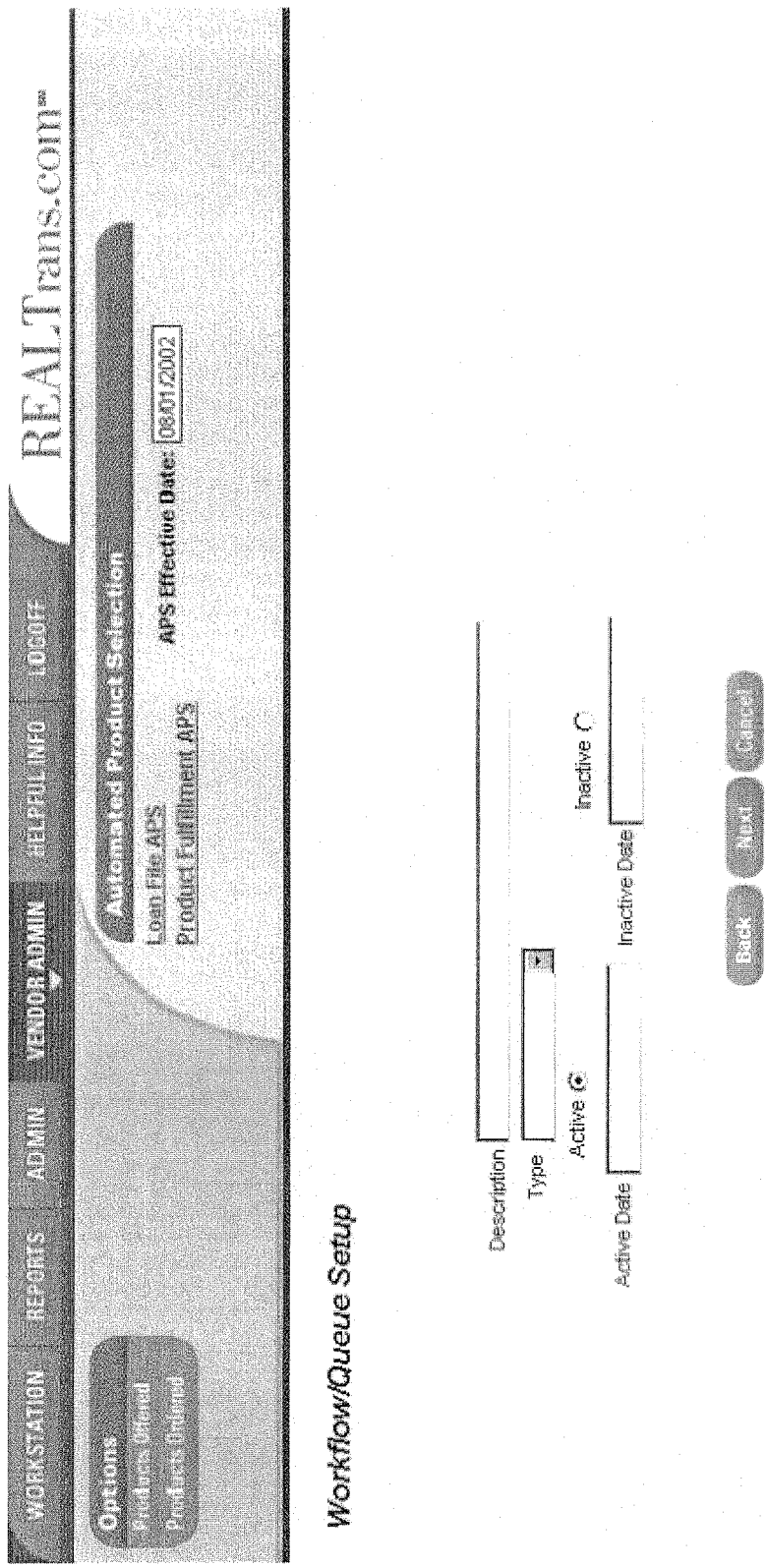
Figure 29:
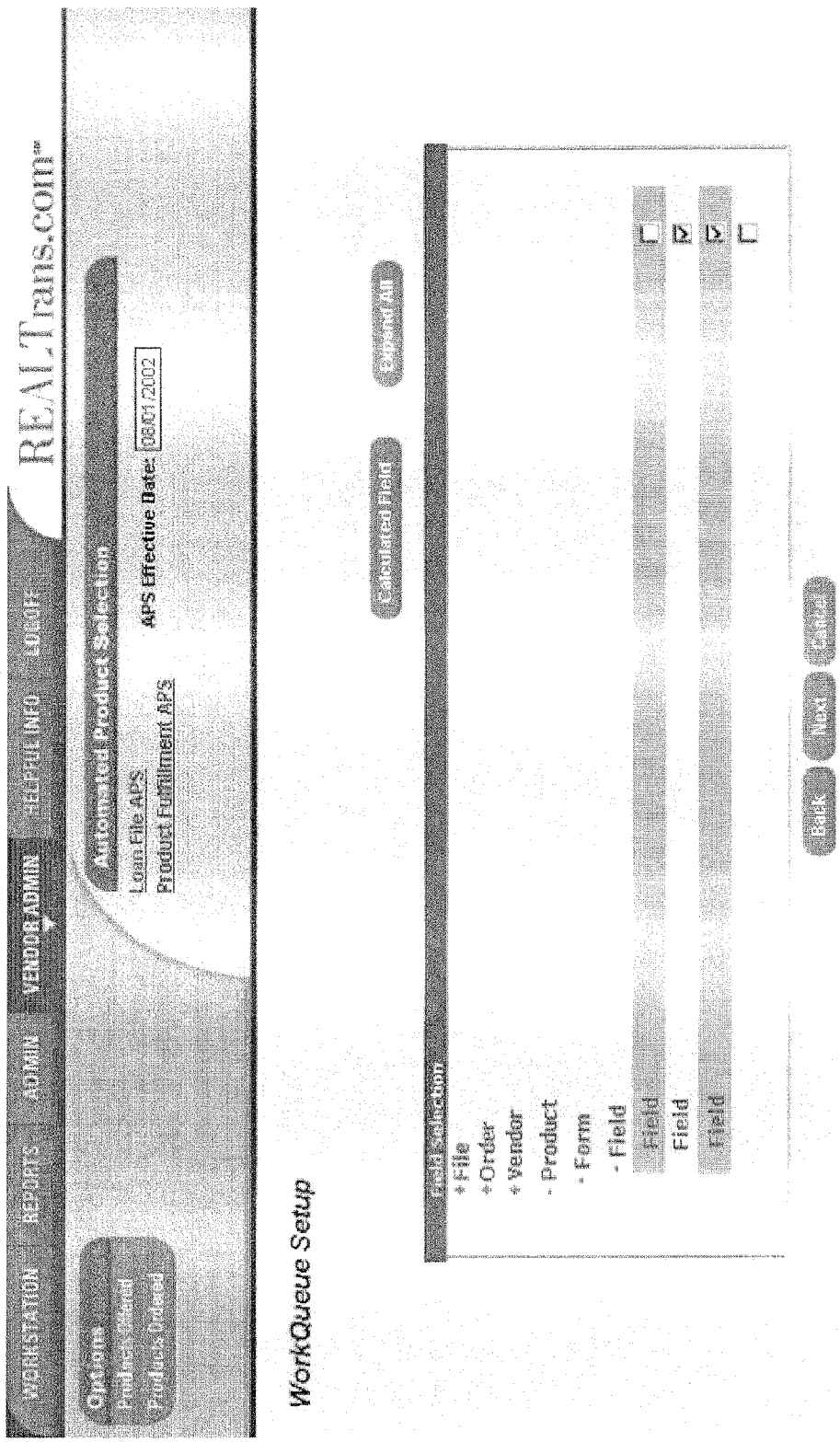
Figure 30:
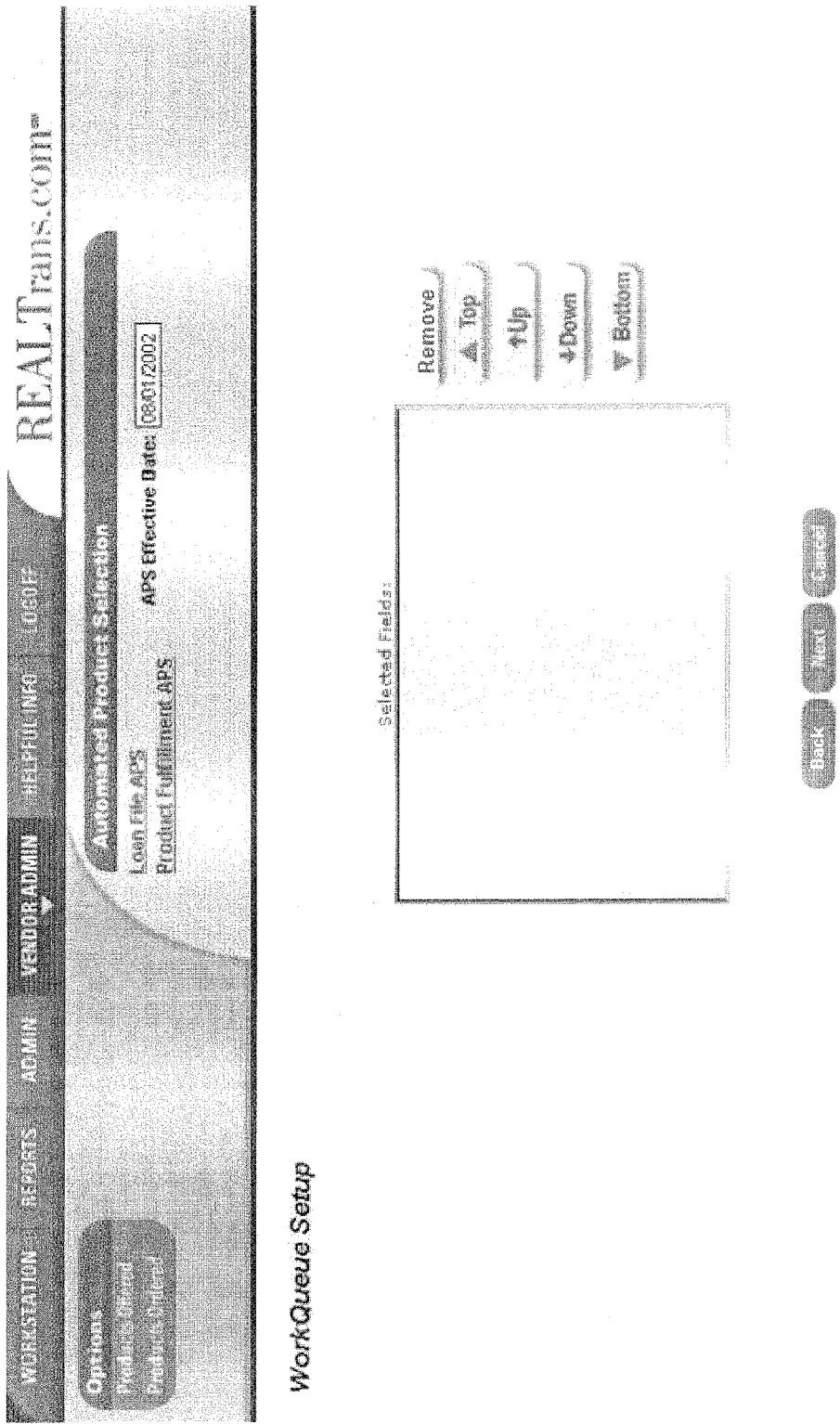
Figure 31:
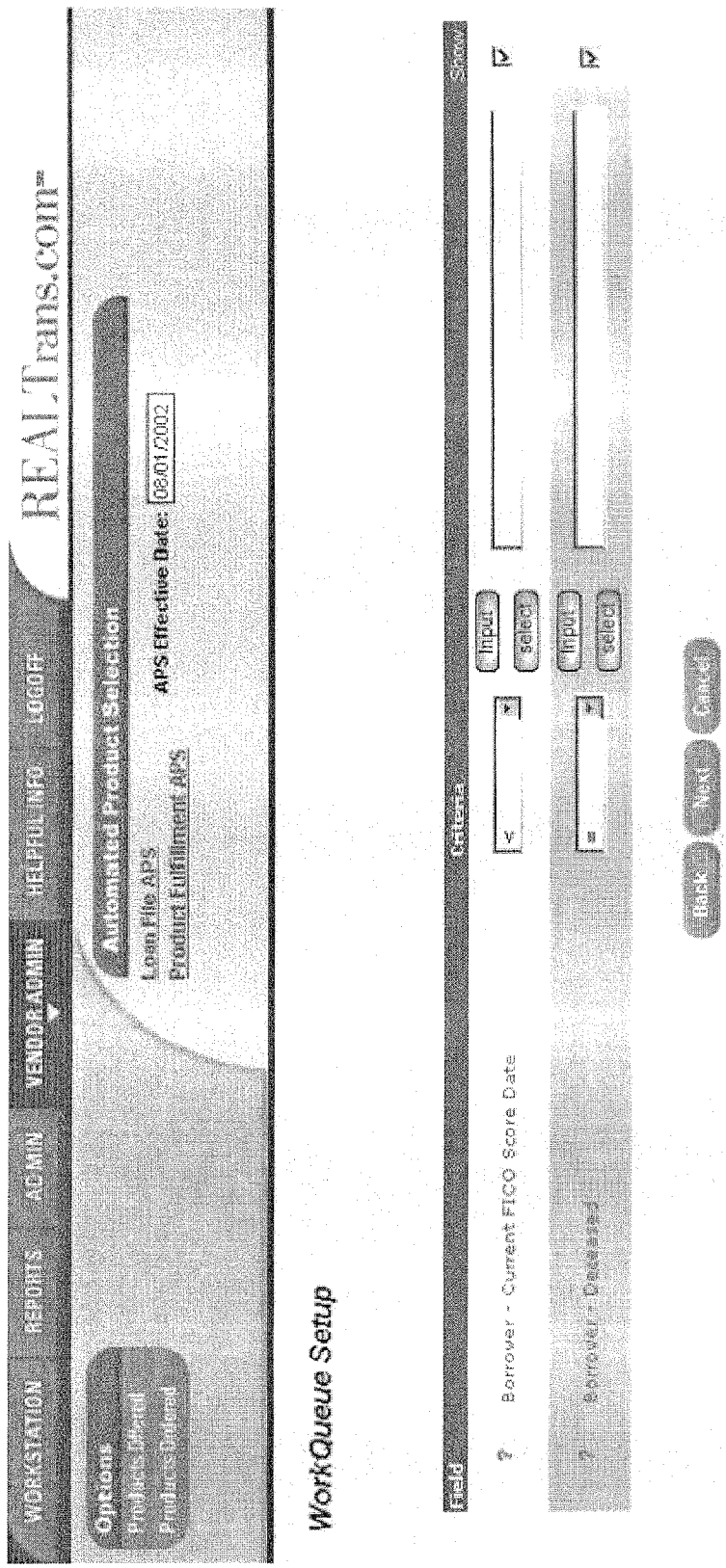
Figure 32:
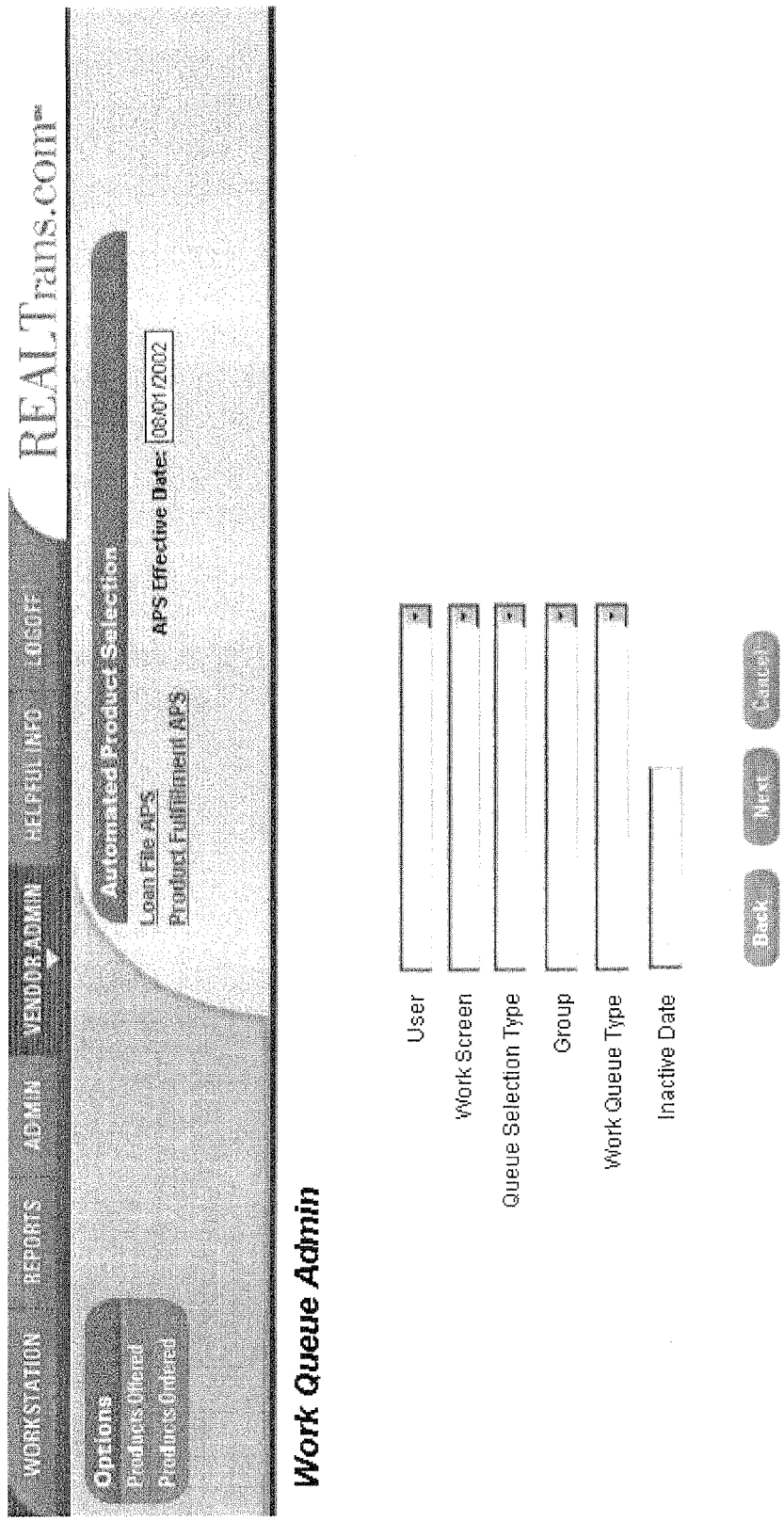
Figure 33:
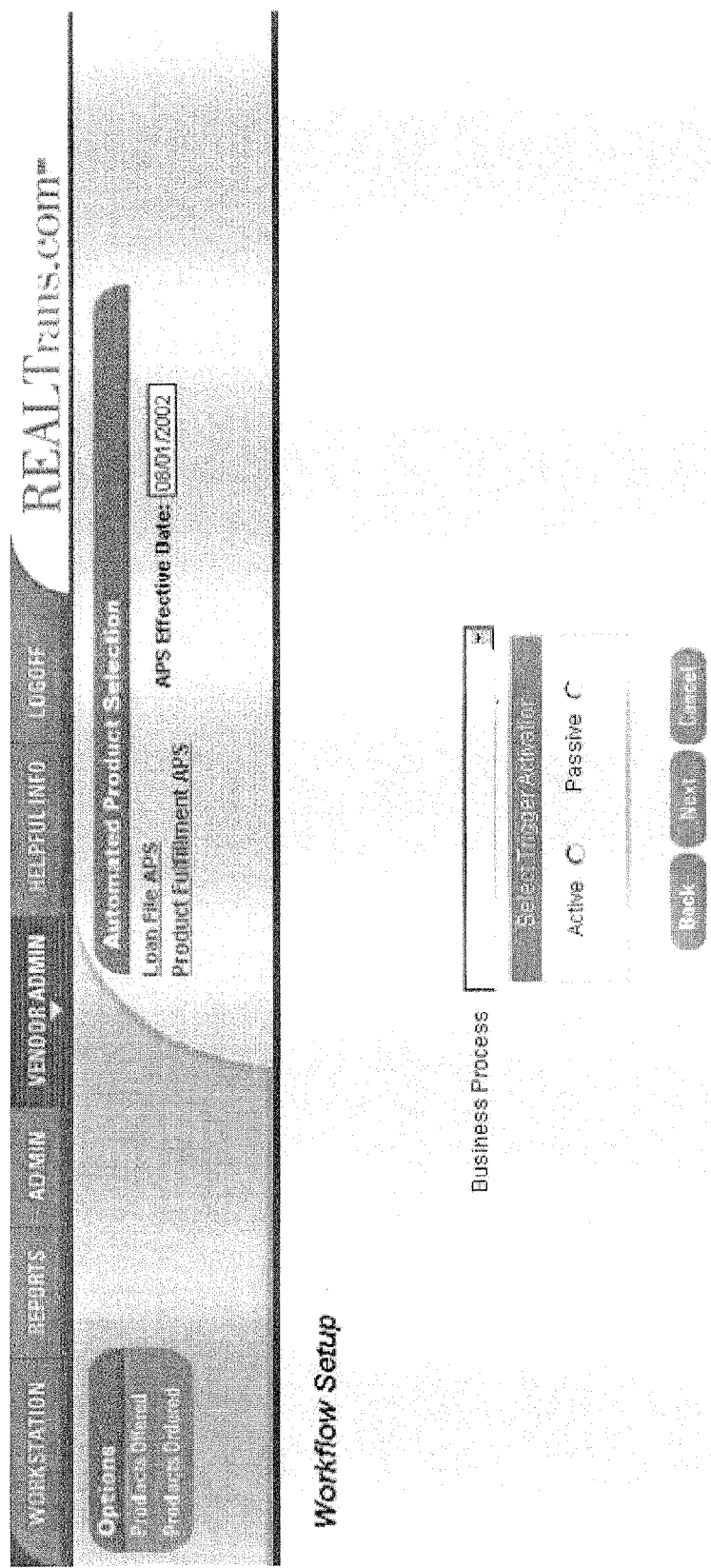
Figure 34:
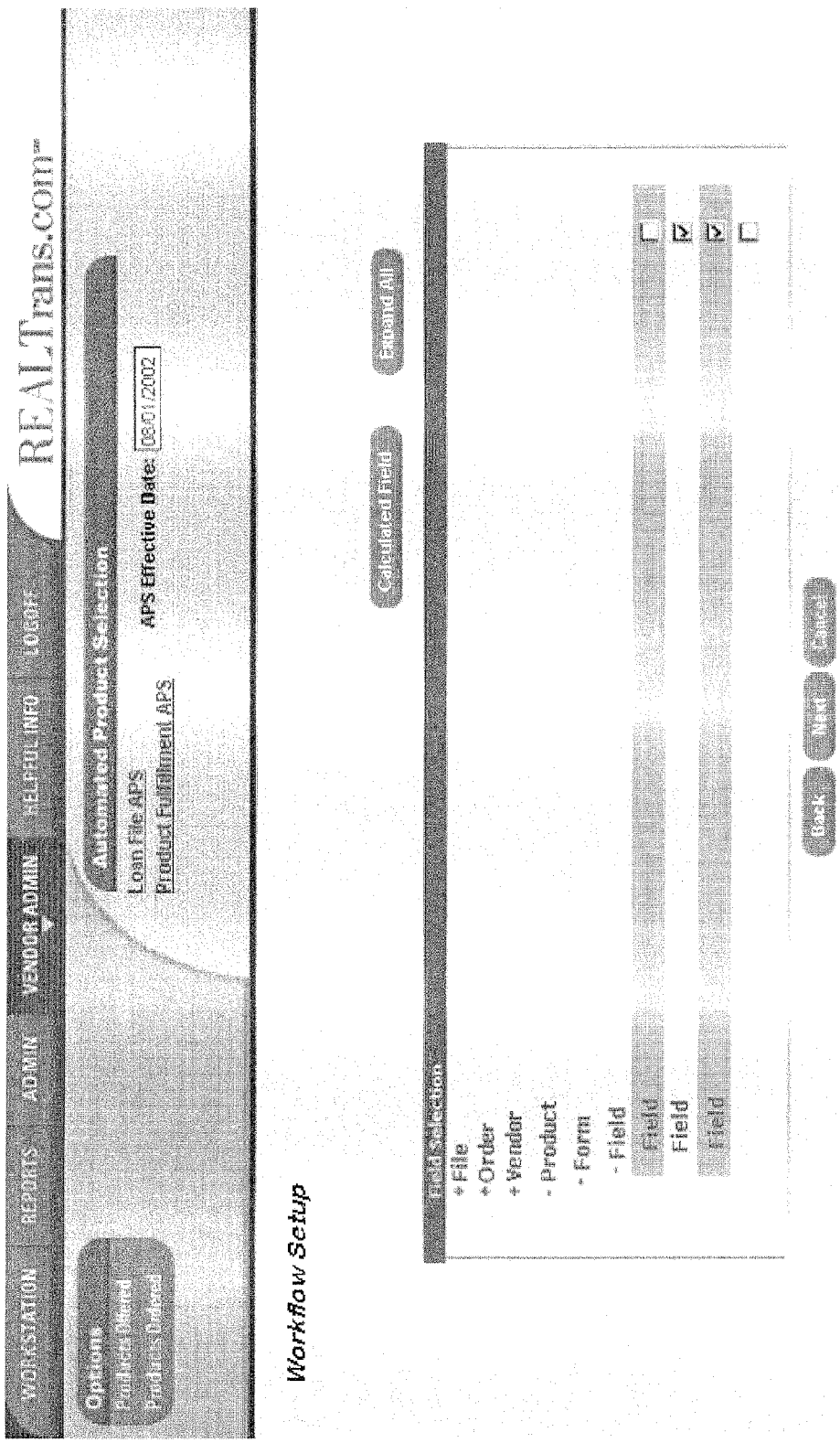
Figure 35:
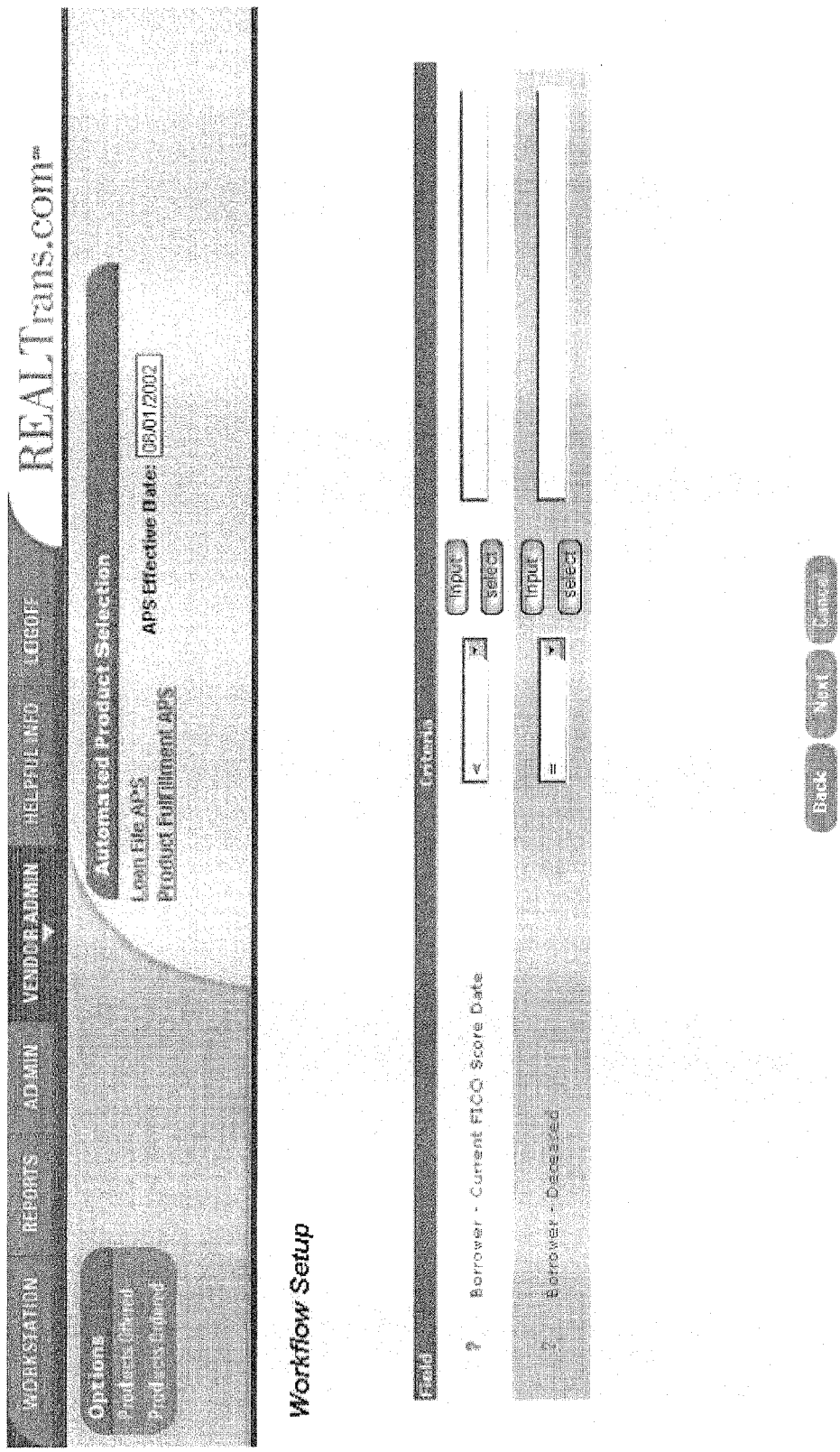
Figure 37:
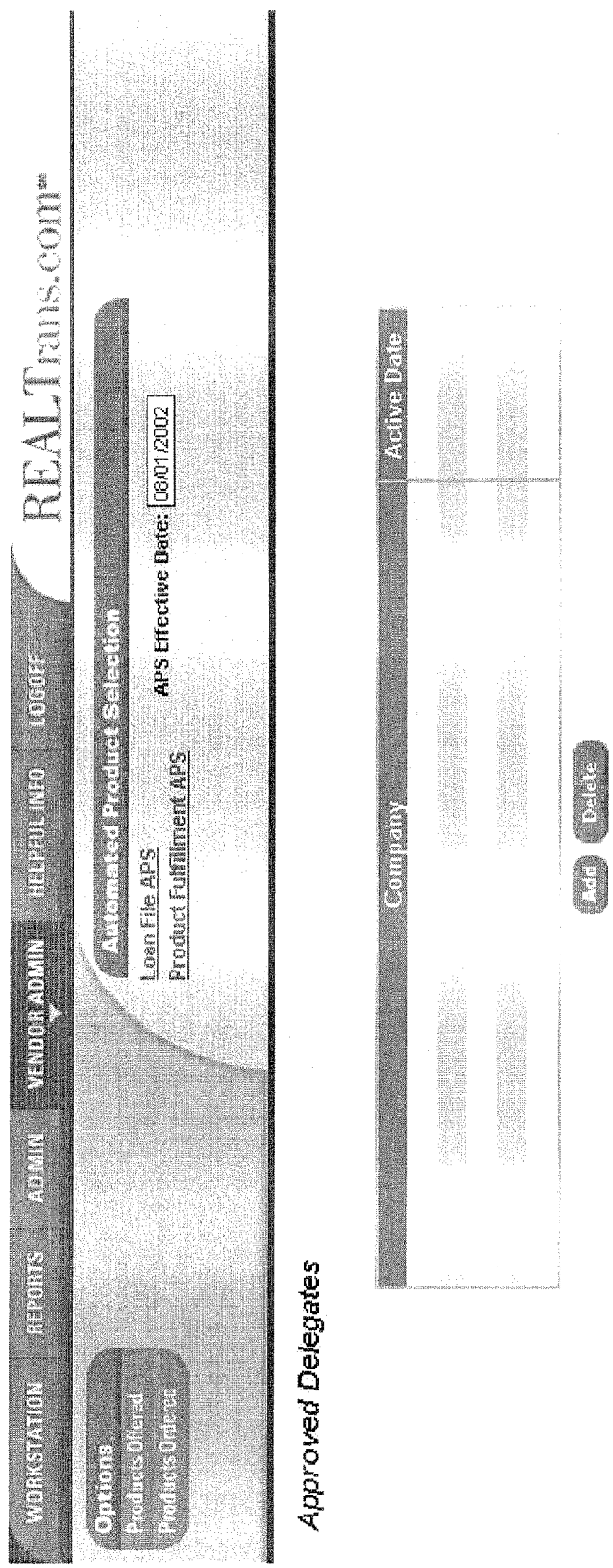
Figure 38:
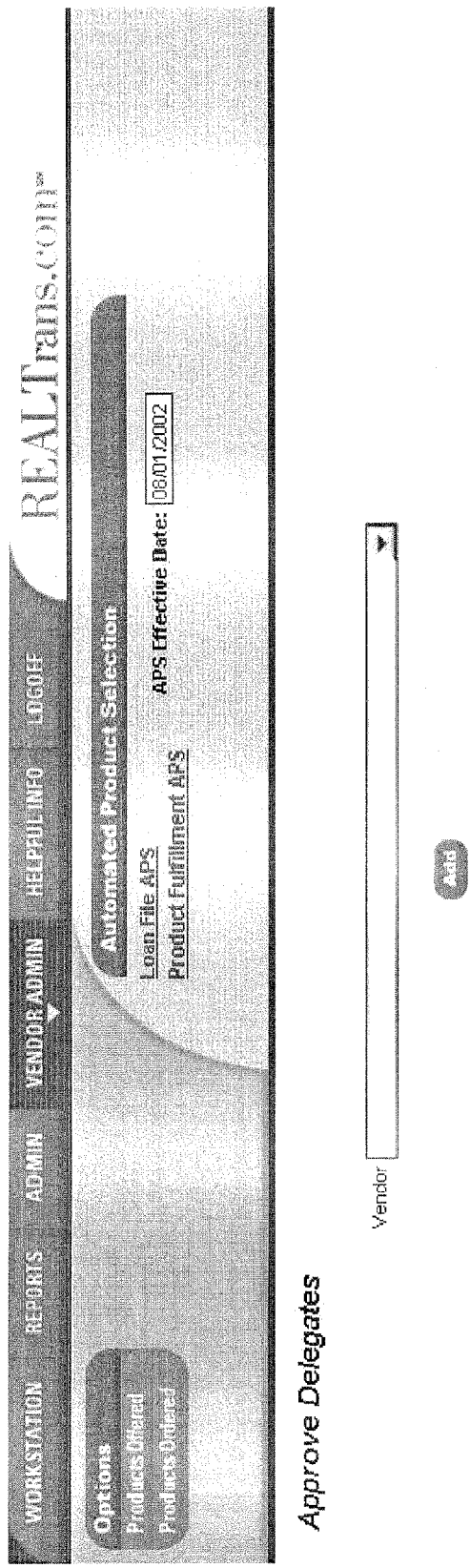
Figure 39:
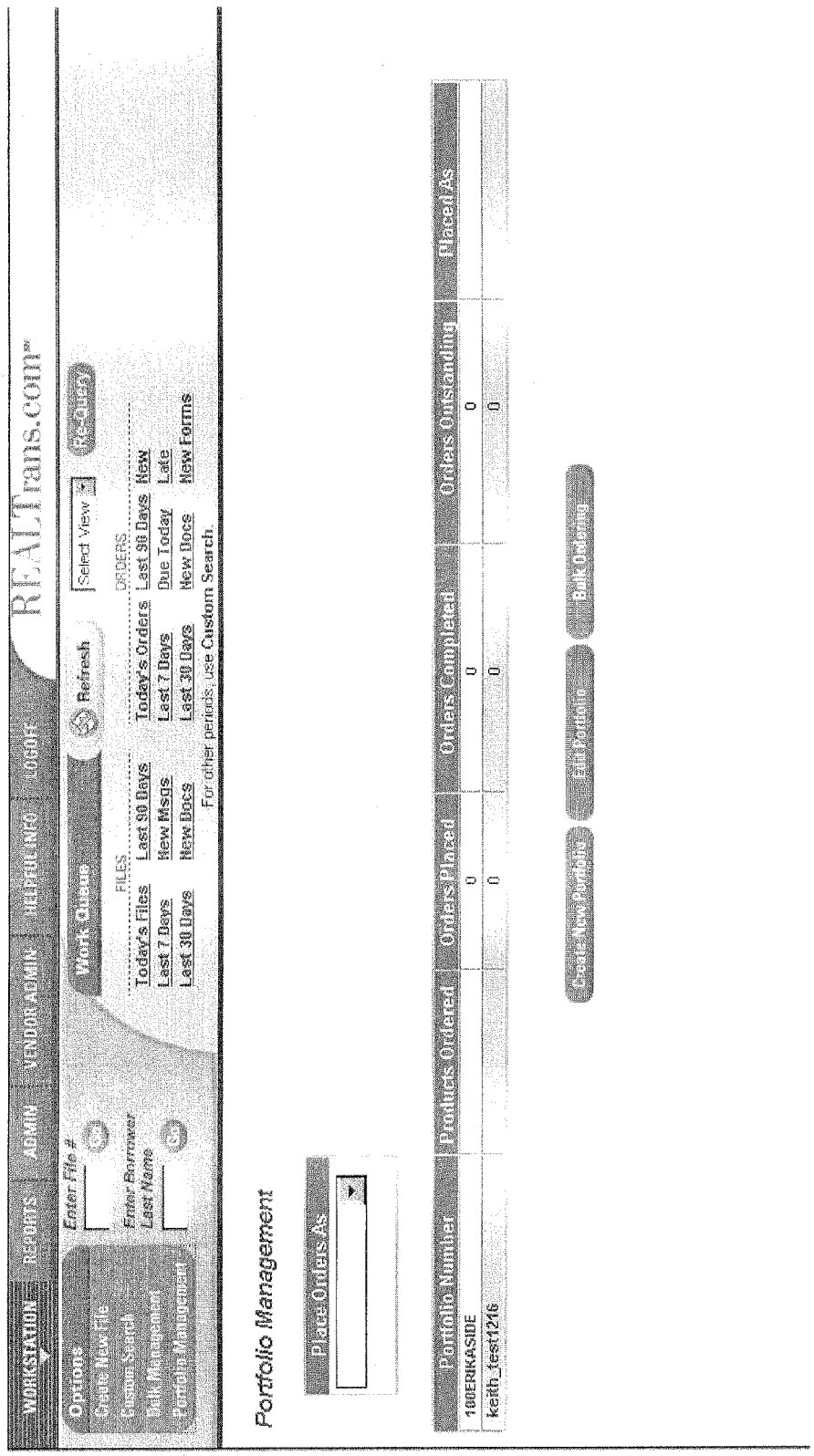

The GUI screen of FIG. 27 allows the user to view the work queue for the vendor. The GUI screens of FIGS. 28-35 allow the user to add an item to the work queue or change fields of an item in the work queue.

Figure 36:
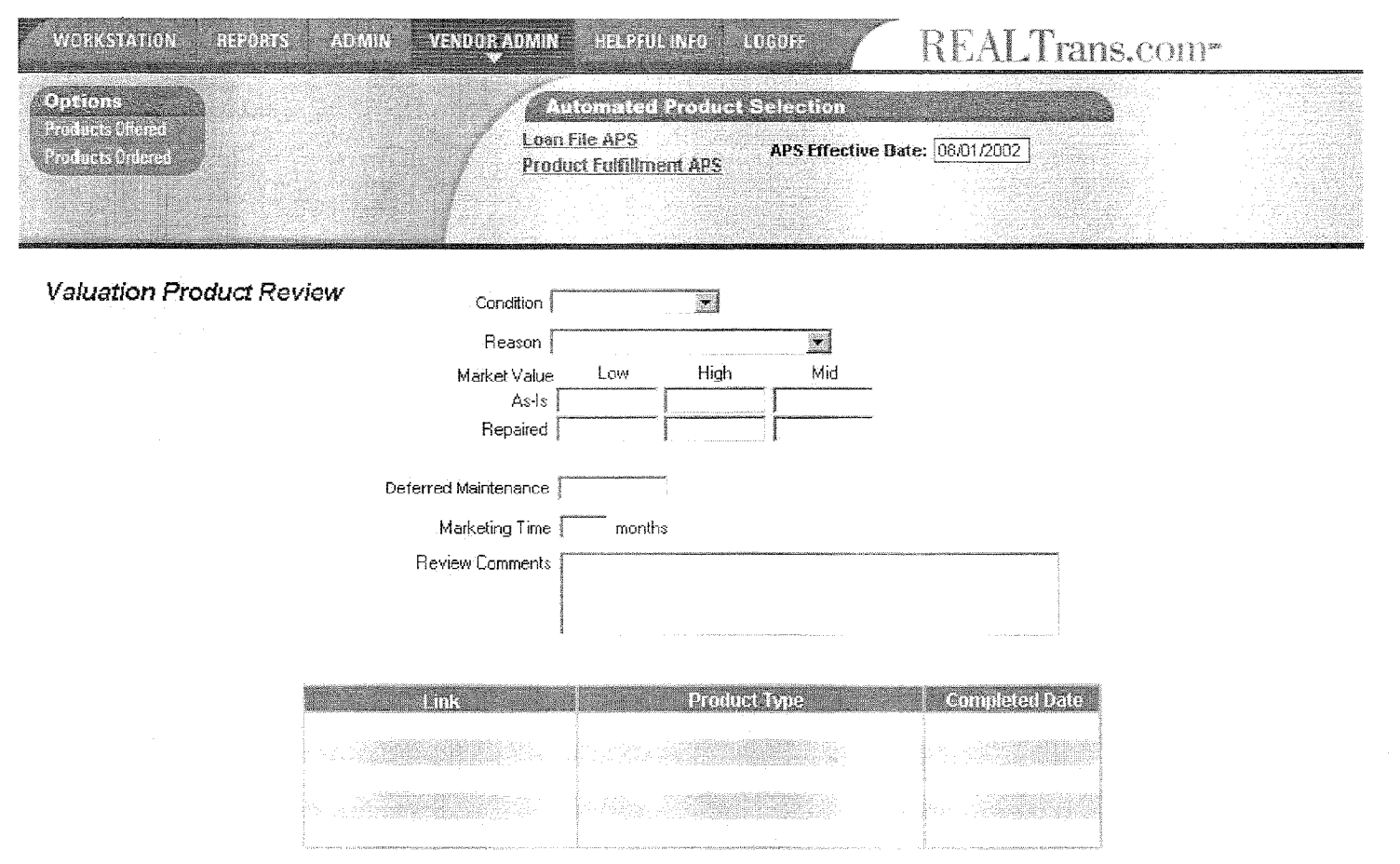

The GUI screen of FIG. 36 allows a user to view information on a property. The GUI screens of FIGS. 37-38 allow the user to add and approve delegates to perform work orders. The GUI screen of FIG. 39 allows a user to view a portfolio, or list of services ordered, for a particular property.

Figure 40:
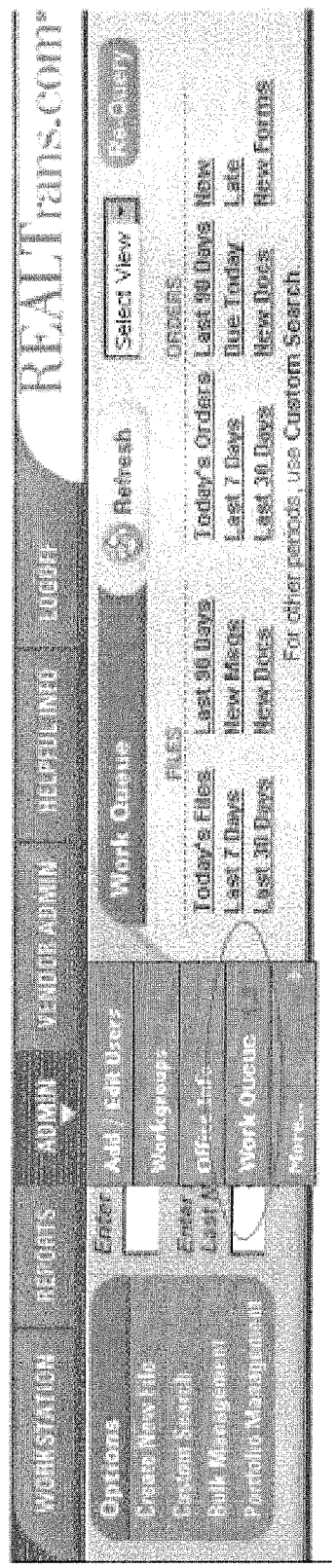
Figure 41:
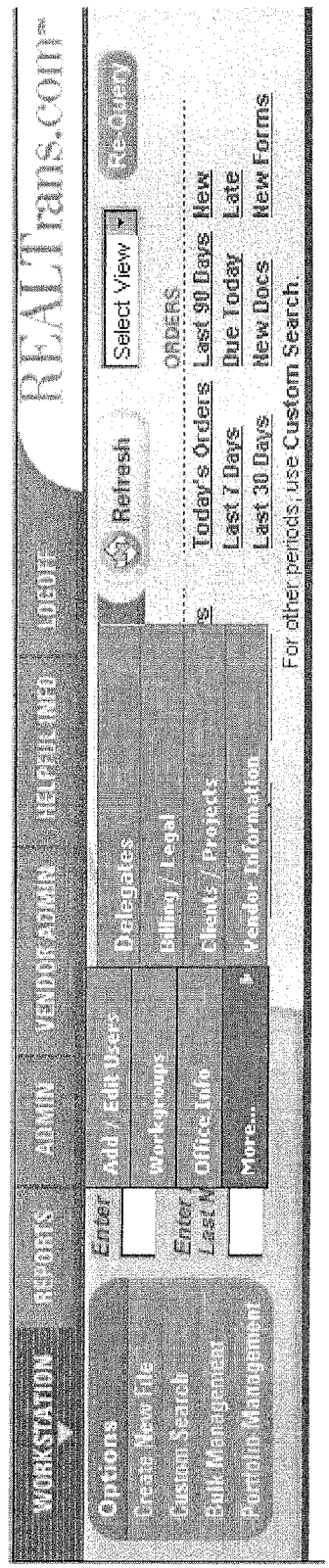
Figure 42:
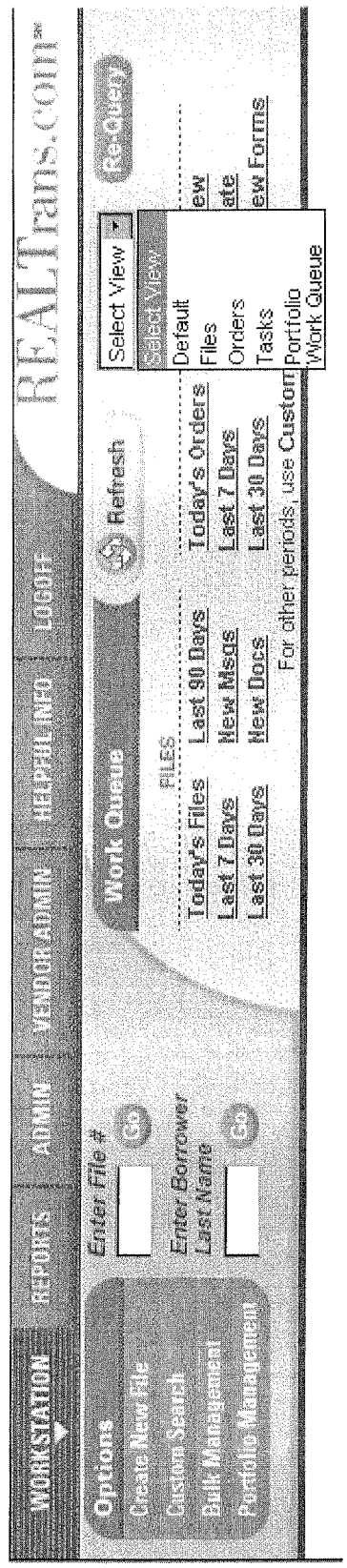
Figure 43:
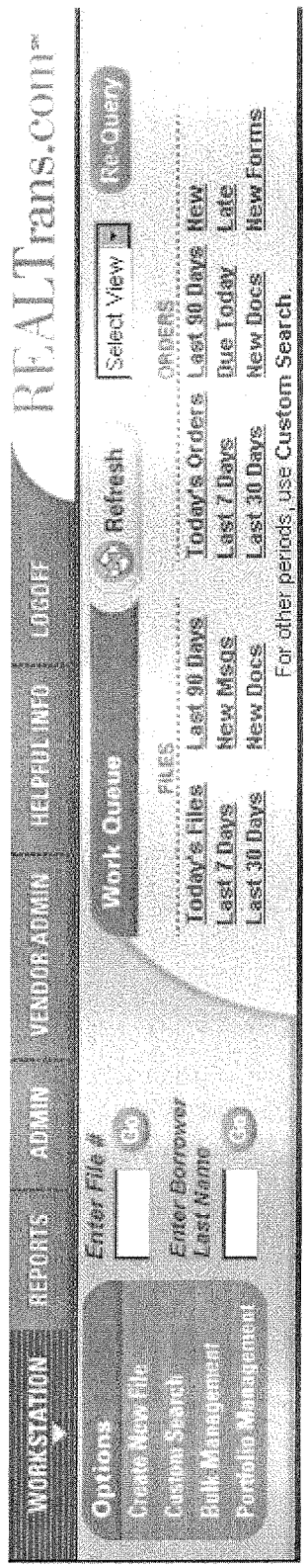
Figure 44:
Figure 48:
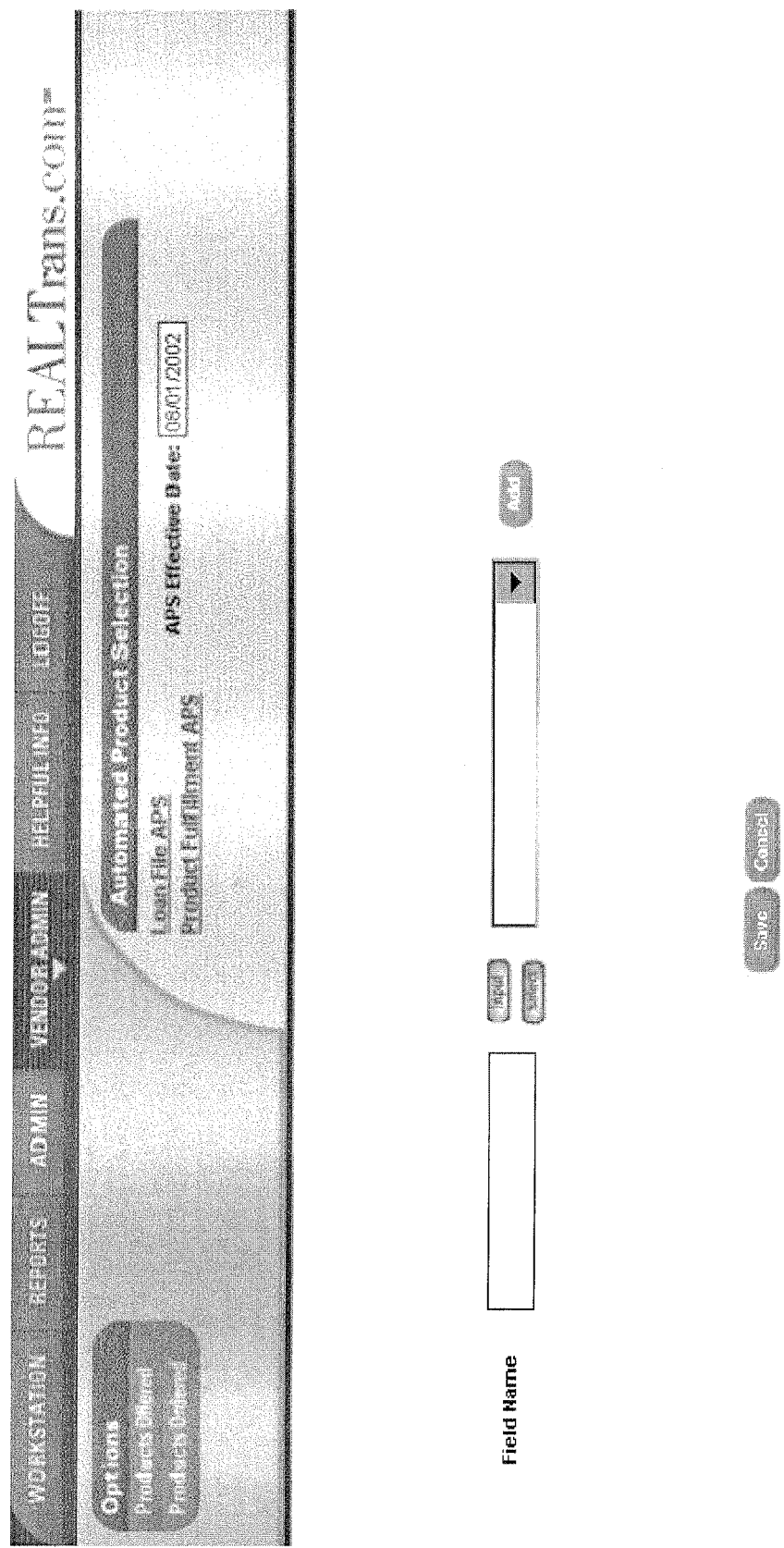
Figure 49:
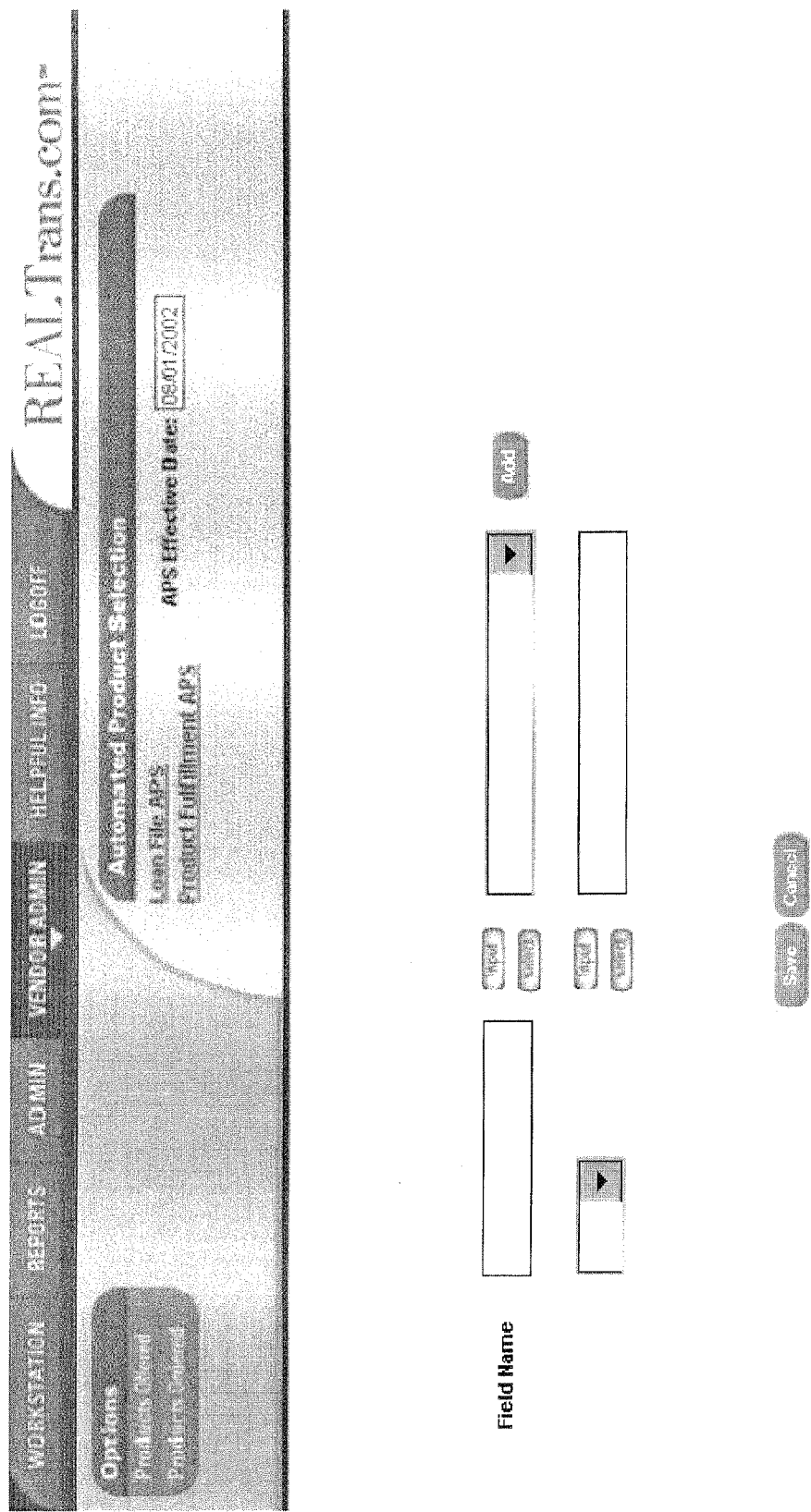

The GUI screen of FIG. 40 displays the options available to a user selecting "Admin" from the menu bar. The GUI screen of FIG. 41 displays the options available to a user selecting "Workstation" from the menu bar. The GUI screen of FIG. 42 displays the viewing options available to a user selecting from a drop-down box. The GUI screen of FIG. 43 displays the options for viewing work queues available to a user selecting from a drop-down box. The GUI screen of FIG. 44 displays work queues to a user.

Figure 45:
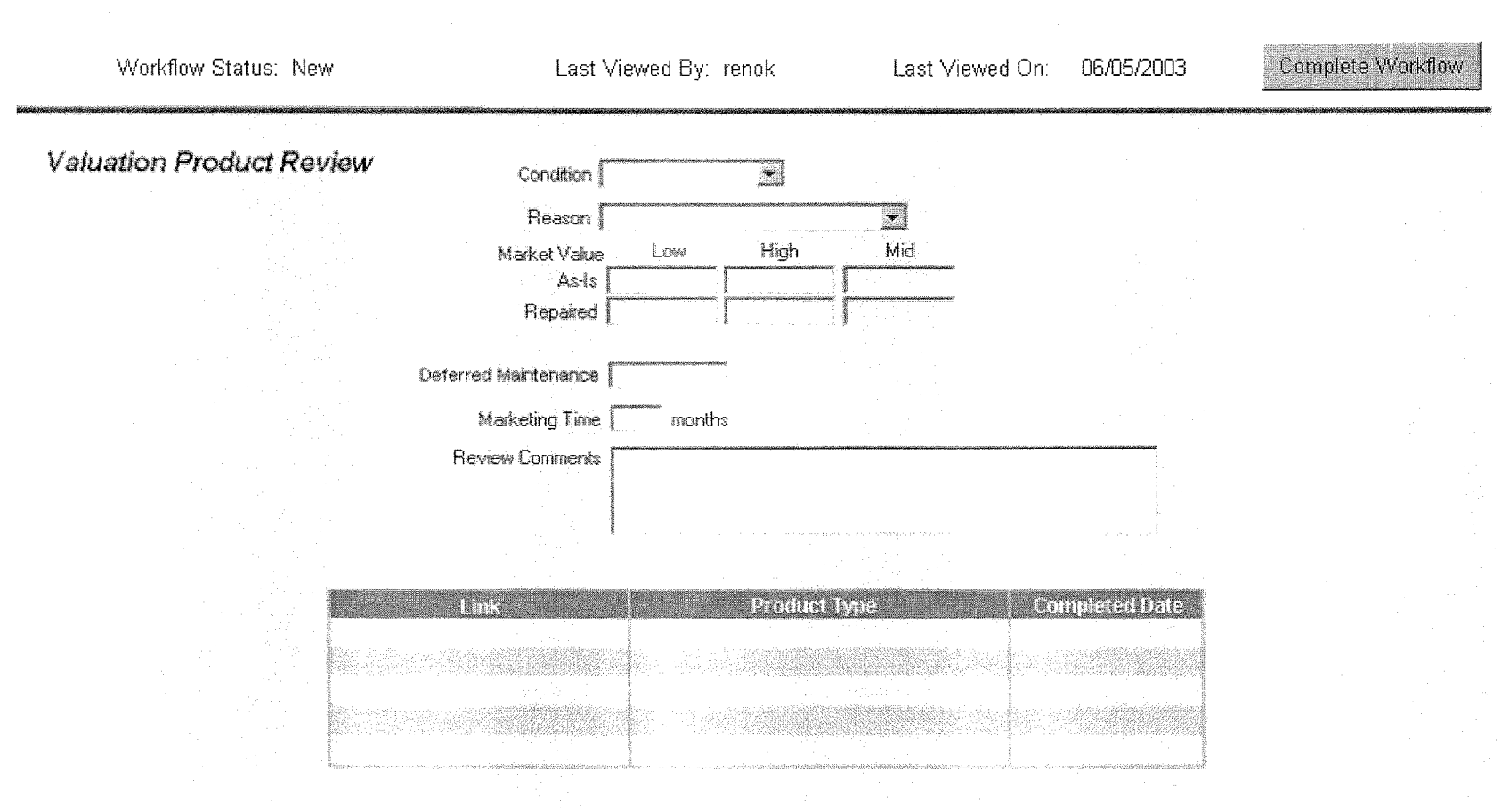
Figure 46:
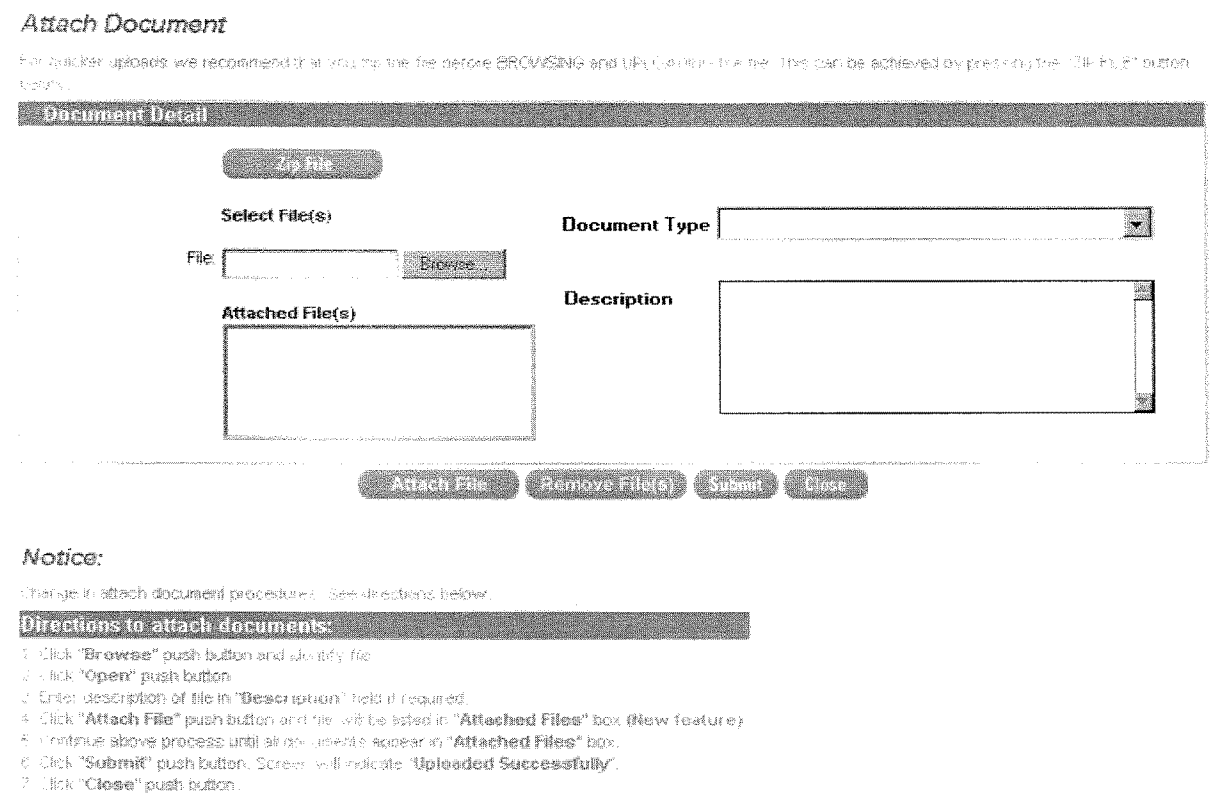

The GUI screen of FIG. 45 allows a user to enter data for a new work order or product in a workflow. The GUI screen of FIG. 46 allows a user to attach a file to a work order or other communication. The GUI screen of FIG. 47 displays attached files to a recipient of the files. The GUI screens of FIGS. 48-49 allow a user to input information for automatic product selection.

Figure 50:
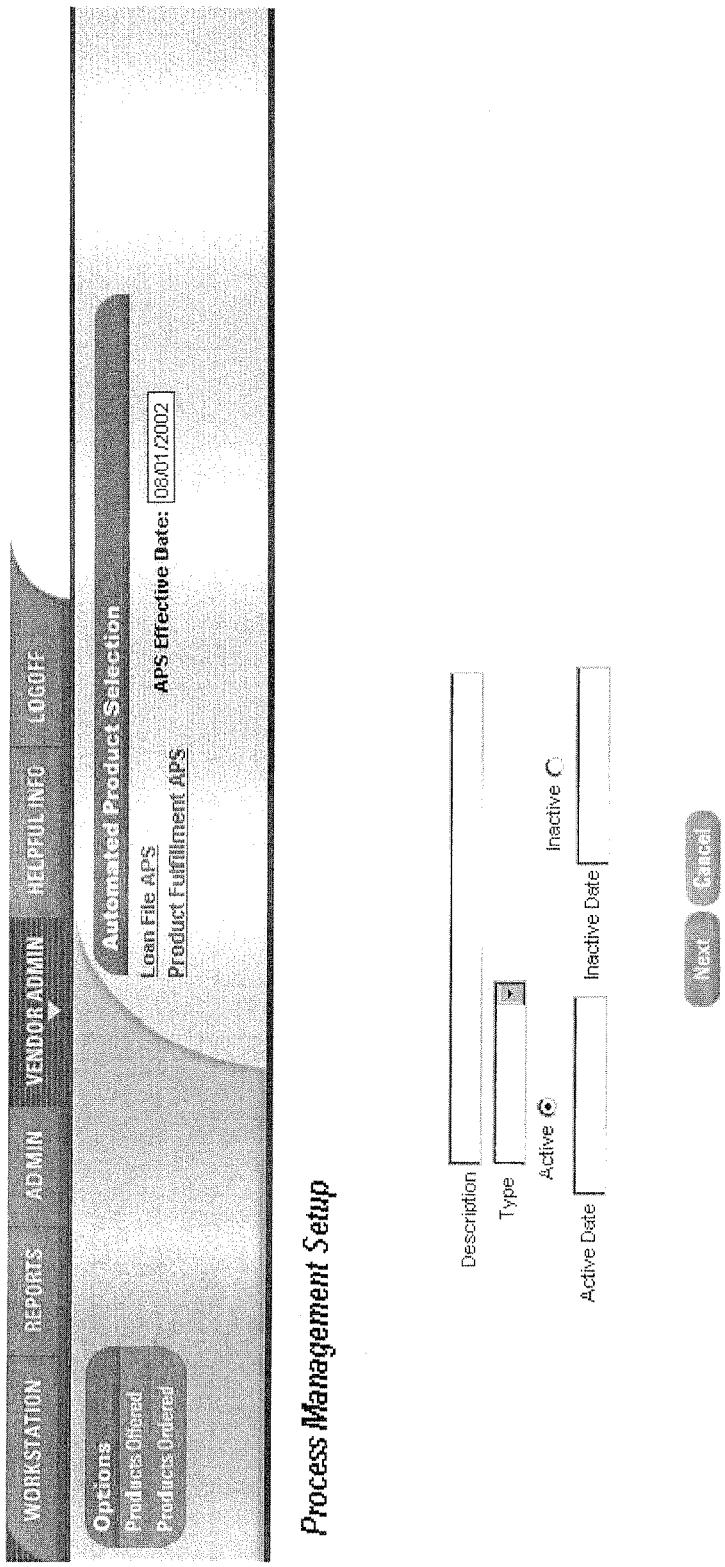
Figure 51:
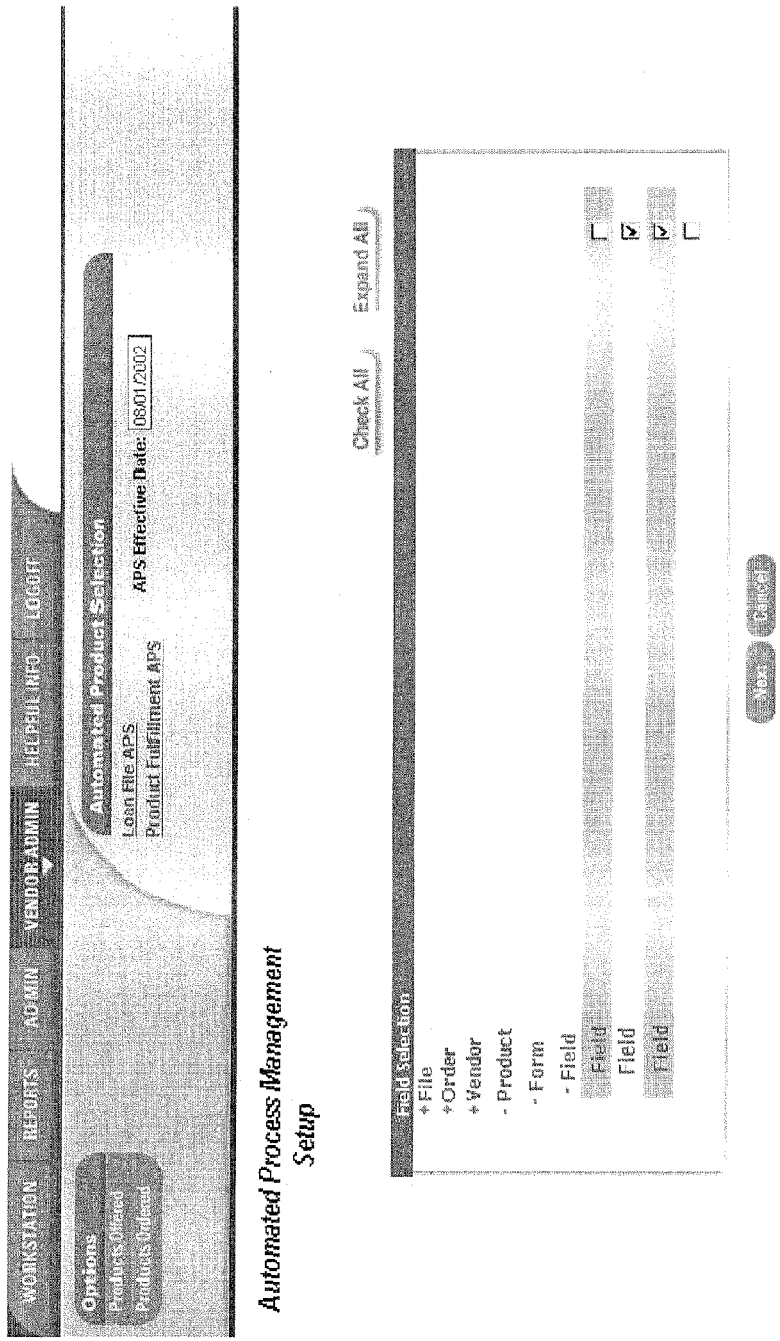
Figure 52:
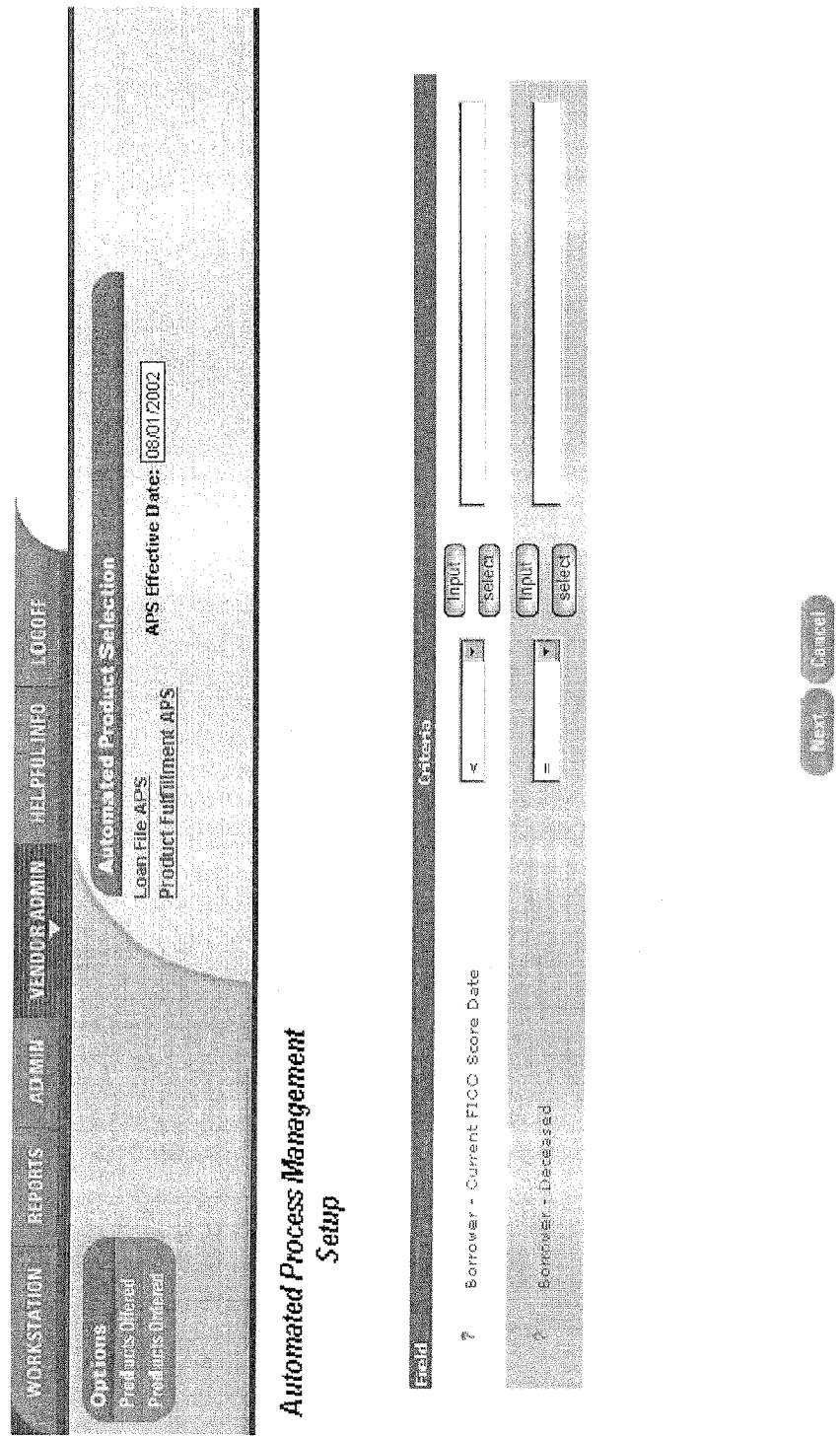
Figure 53:
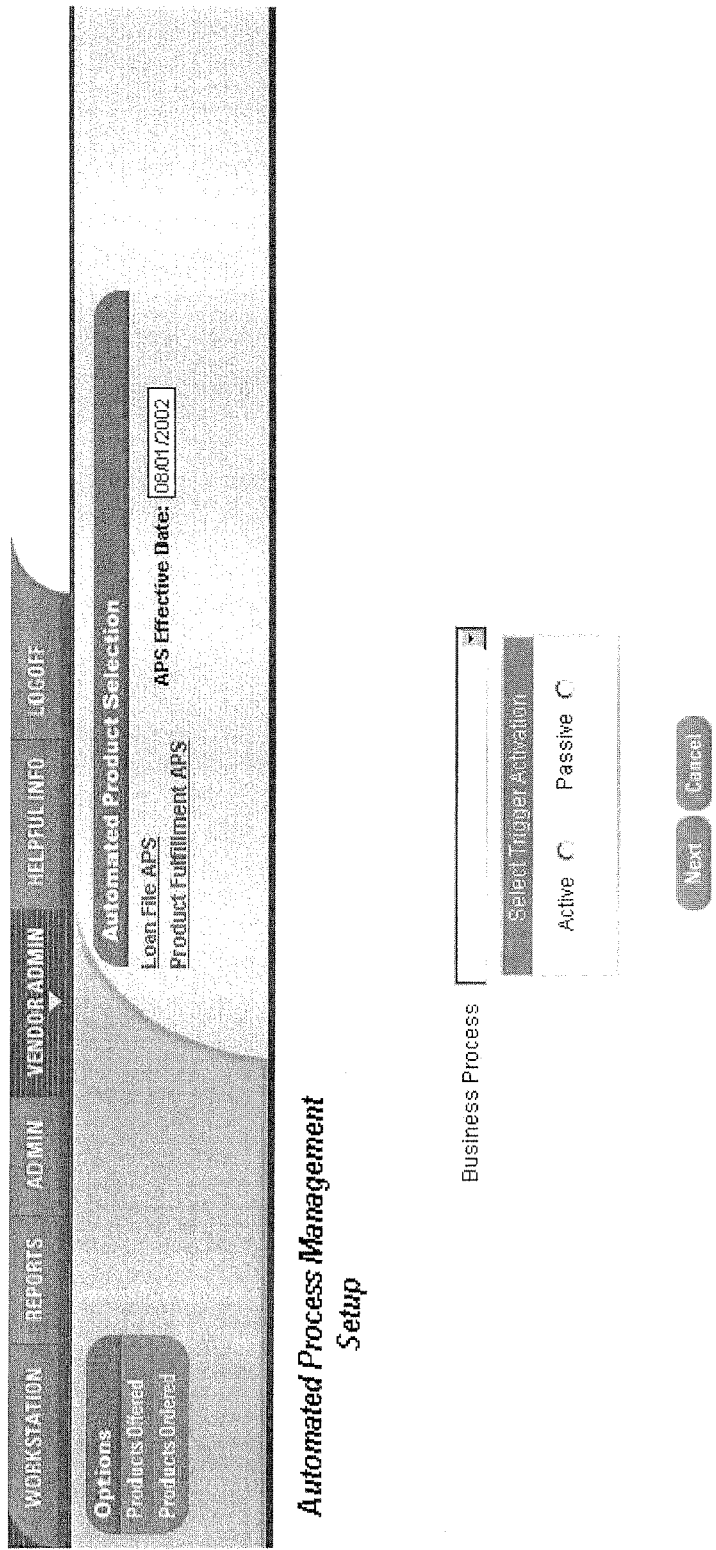

The GUI screen of FIG. 50 allows a user to enter data for process management setup. The GUI screens of FIGS. 51-53 present a user with information regarding an automatic process management setup and allow the user to enter data for automatic process management setup.

Figure 54:
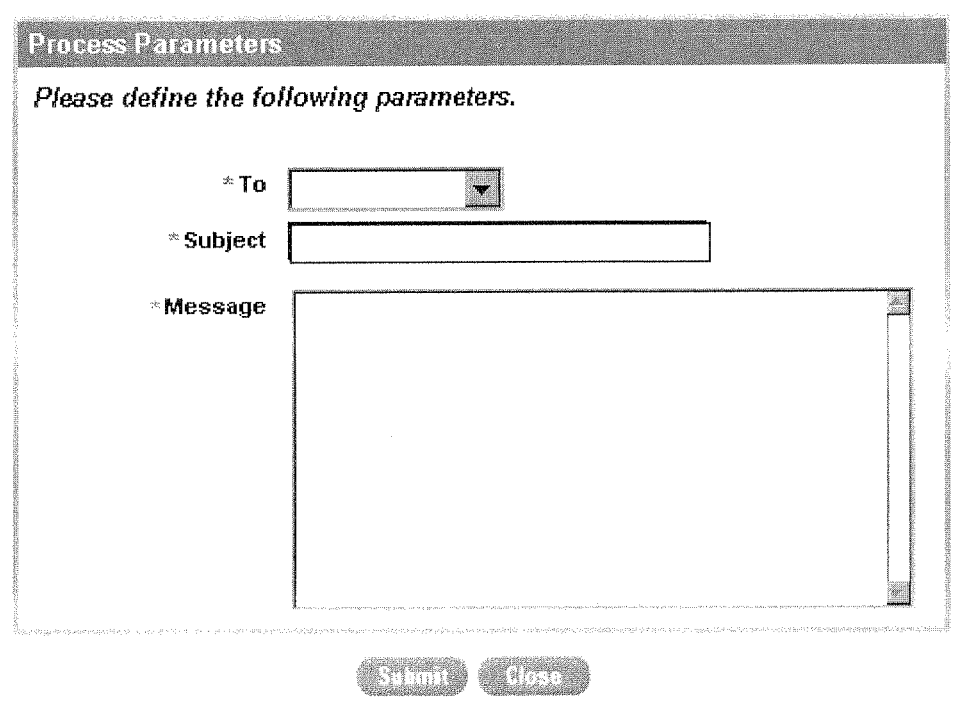

The GUI screen of FIG. 54 allows a user to send an email to a recipient. If the email is regarding a particular product or order, the user specifies the product or order by inputting information into the GUI screen of FIG. 55. The user may input information into the GUI screen of FIG. 56 to cancel the product or order.

Figure 57:
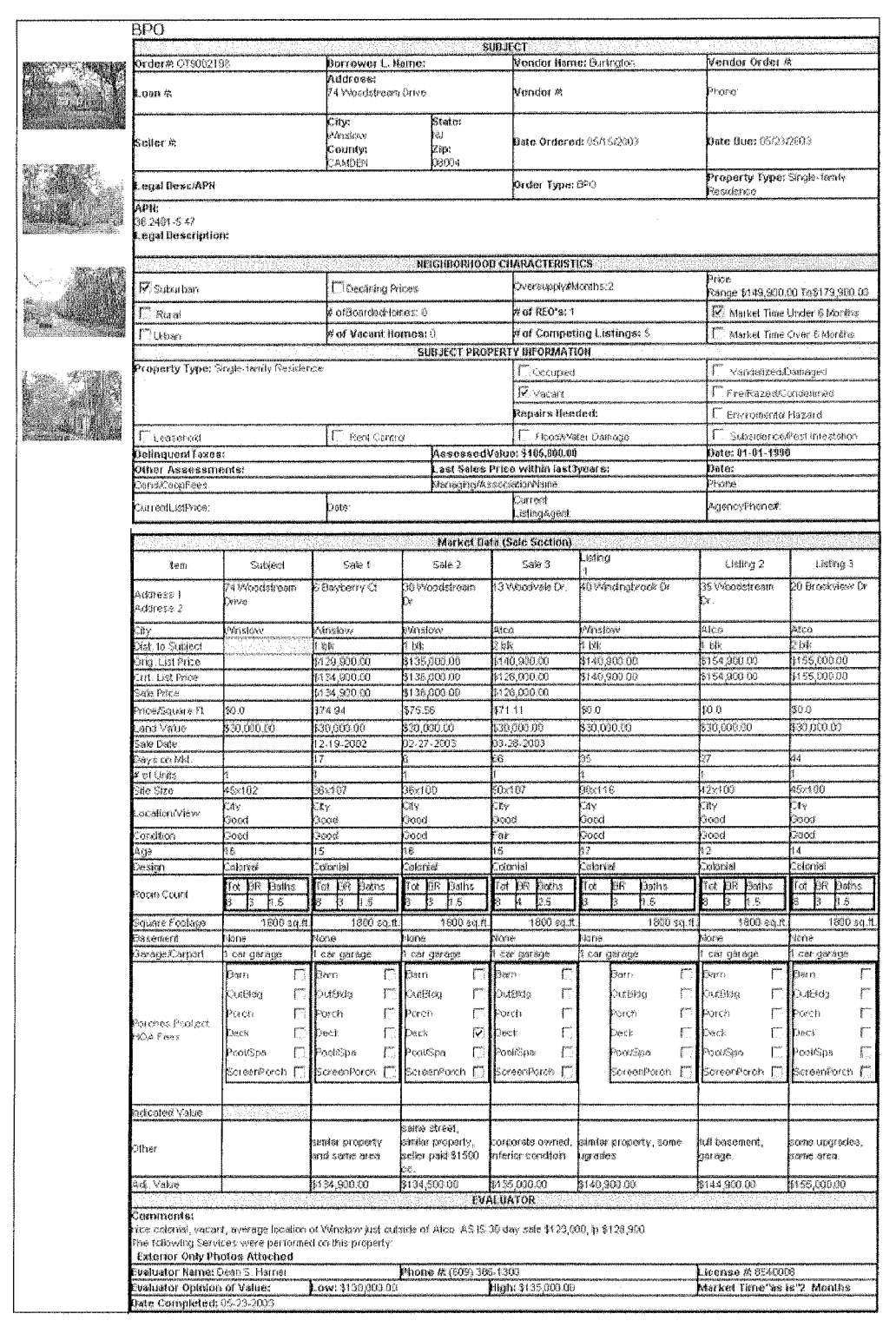

FIG. 57 is a GUI screen listing properties and information related to each property, such as property data, loan information, and work order information.

Figure 58:
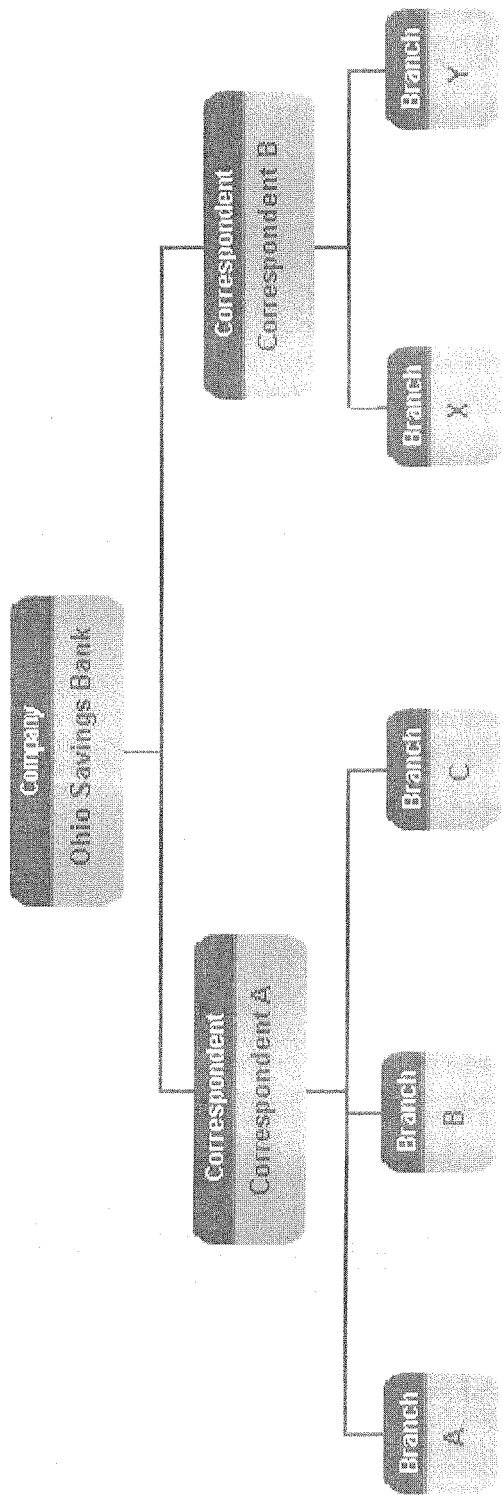
FIG. 58 is a block diagram illustrating a sample corporate hierarchy in conjunction with an embodiment of the present invention.
Figure 59:
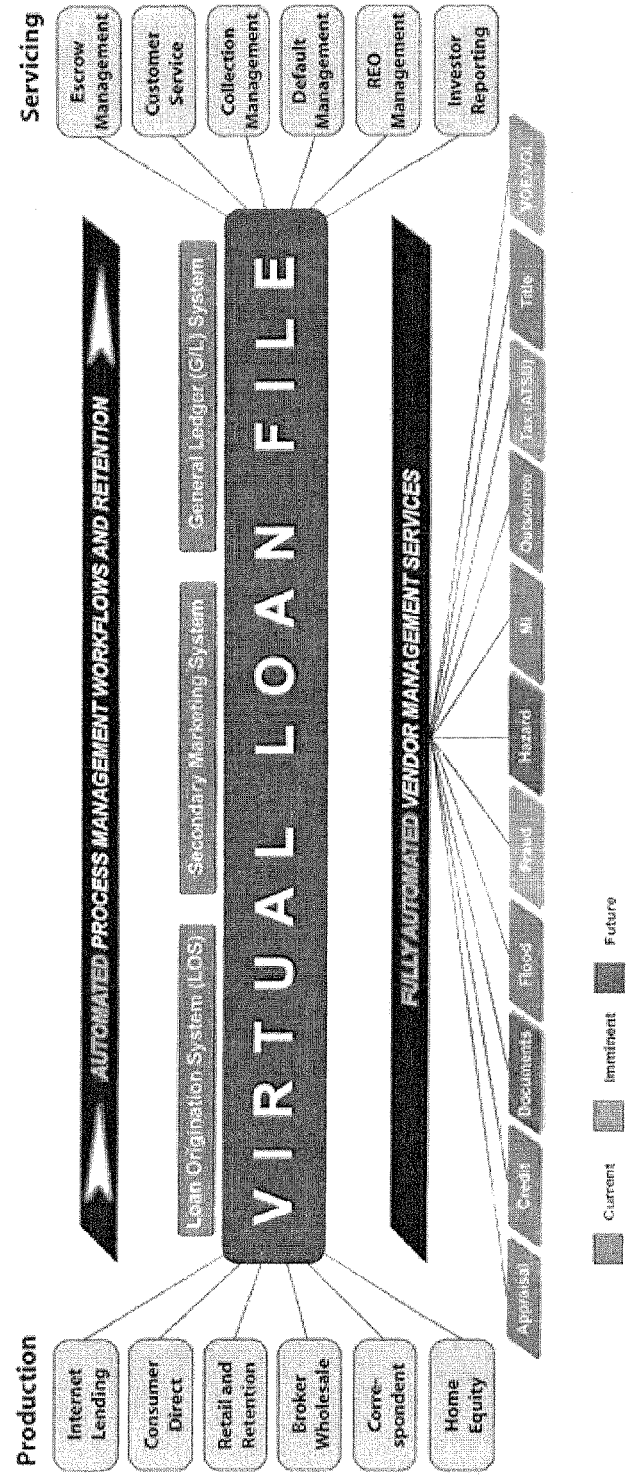
FIG. 59 is a block diagram illustrating various functionalities of a system in conjunction with an embodiment of the present invention.
Figure 61:
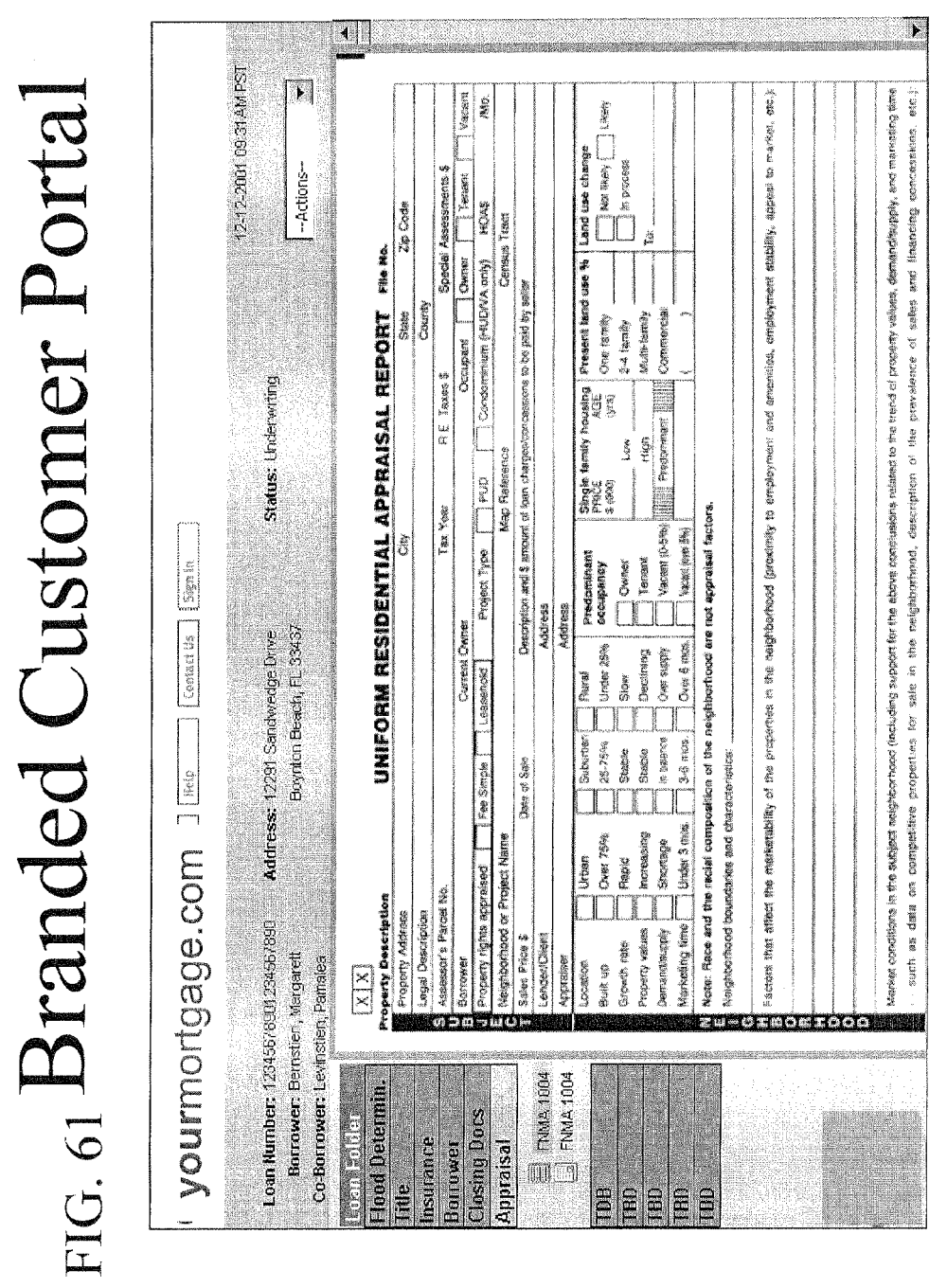

FIG. 58 displays a sample corporate hierarchy. The corporate hierarchy exhibits, for example, parent-child infrastructure (PCI) and is displayed as a tree diagram. FIG. 59 is a block diagram illustrating various functionalities of a system in accordance with an embodiment of the present invention. FIGS. 60-61 illustrate a branded customer portal in accordance with an embodiment of the present invention.

Example embodiments of the present invention have now been described in accordance with the above advantages. It will be appreciated that these examples are merely illustrative of the invention. Many variations and modifications will be apparent to those skilled in the art.

TABLE 1

| UNIQUE REQ ID | FUNCTION | REQUIREMENT NAME | REQUIREMENT/FUNCTION DESCRIPTION | FIG. |
|---|---|---|---|---|
| 2 | VENDOR MANAGEMENT PROCESSING/SETUP | VENDOR MANAGEMENT PROCESSING/SETUP | | |
| 2.0A | Real-time calculation updates: | | Real-time updates of vendors' orders. | |
| 2.1A | | Capacity | Real-time updates of vendors' open orders. | |
| 2.2A | | Threshold | Real-time updates of total number of vendors' orders for a specified time period. | |
| 2.3A | | Outstanding Late Order Ratio | Real-time updates of the specified outstanding late order ratio (ratio of late orders to open orders). | |
| 2.0C | Modification of Acknowledgement File (file-based orders) | | With the addition of Workflow and AVS, the Acknowledgement file would need to be modified to handle notification of the automated selection. | |
| 2.1C | | Workflow Specific Information | The Acknowledgement file would contain the following APS Info: Product Selected Workflow Name Used | |
| 2.2C | | AVS Specific Information | The Acknowledgement file contains the following AVS Info: Vendor Selected AVS Profile Selected AVS Distribution Rule Selected Current % of orders Current capacity Current threshold Current late order ratio | |
| 2.0D | AVS Profile Viewer AVS Rules | | This will provide a Vendor Manager to view current AVS distribution rules that are in Production. | Appendix A |
| 2.1D | | AVS Profile Viewer Section | Provide a section to view the AVS Rules that are currently in Production. (See appendix for layout) | Appendix A |

TABLE 1-continued

| UNIQUE REQ ID | FUNCTION | REQUIREMENT NAME | REQUIREMENT/FUNCTION DESCRIPTION | FIG. |
|---|---|---|---|---|
| 2.2D | | AVS Profile Effective Date | Display the date the AVS Rules migrated to Production (See appendix for layout) | Appendix A |
| 2.3D | | AVS Profile Viewer Table | Provide a table that contains all Profiles that are currently in Production. | Appendix A |
| 2.4D | | AVS Profile Viewer Actions | This table layout and functionality will duplicate the current Profile table, except the Action column will contain a View link. | Appendix A |
| 2.5D | | AVS Profile Viewer View Profiles | The Action link will duplicate the edit link, except it will be view-only. | Appendix A |
| 2.6D | | AVS Profile Viewer Vendor Distribution List | The AVS Profile Viewer will contain a View link on each distribution set to view the vendor list (This View link will replace the Edit link). | Appendix A |
| 3.1 | Cumulative Score | | | |
| 3.1.A | | Create a Link for Scorecard Menu | Create a link for Scorecards under Products Ordered Menu. Link will go to the Scorecard menu. | Appendix B |
| 3.1.B | | Create Scorecard Menu | Create a Scorecard Menu. This will be set up the same as the Automated Product Selection Menu. | Appendix C |
| 3.1.B.1 | | Add links to Scorecard Menu | Add links to the Scorecard Menu for Quality Score, Service Score, Cumulative Score and Auto Scoring. | Appendix C |
| 3.1.B.2 | | Create a link for Cumulative Score Screen | Create a link for Cumulative Score under Scorecard Menu. Link will go to the Cumulative Score Screen. | Appendix C |
| 3.1.C | | Create Cumulative Score Screen | Create Cumulative Score Screen to allow users to view all saved cumulative scorecards. | Appendix D |
| 3.1.C.1 | | Create Cumulative Scorecard table | Create a table to display Scorecard Name, Description of Scorecard, Products, Quality Ratio, and Service Ratio. | Appendix D |
| 3.1.C.2 | | Add Edit Buttons | Add edit button to edit any saved scorecard. The edit button will be a link to Cumulative Score Setup Screen #2. | Appendix D |
| 3.1.C.3 | | Add Delete Buttons | Add Delete buttons to delete any saved scorecards. Display message box "Are you sure you want to delete the saved scorecard" when the Delete button is clicked. Remove scorecard from table if yes is clicked. Refresh Cumulative Score Screen. | Appendix D |
| 3.1.C.4 | | Add Create New Scorecard Button | Add Create New Scorecard Button to create new Cumulative Scorecard. Create New Scorecard button will be a link to Cumulative Score Setup Screen #1. | Appendix D |
| 3.1.D | | Create Cumulative Score Setup Screen #1 | Create Cumulative Score Setup Screen to allow users to create a new cumulative scorecard. | Appendix E |
| 3.1.D.1 | | Add Radio Buttons | Add Radio Buttons to start with an existing scorecard. Radio button will default to No. If yes button is selected, provide combo box for all saved scorecards. | Appendix E |
| 3.1.D.2 | | Add Scorecard Name Text Box | Add Scorecard Name text box. This is a required field. Text box should be large enough to display 30 characters. | Appendix E |
| 3.1.D.3 | | Add Scorecard Description Text Box | Add Scorecard Description text box. This is a required field. Text box should have a scroll bar to allow user to scroll through entire description. | Appendix E |
| 3.1.D.4 | | Add Next Button | Add Next button to link to Cumulative Score Setup Screen #2. If No Radio button is selected and Scorecard Name or Scorecard Description are null, display message "Scorecard Name and Description are Required". | Appendix E |
| 3.1.D.5 | | Add Cancel Button | Add Cancel Button to link to Cumulative Score Screen. | Appendix E |
| 3.1.E | | Create Cumulative Score Setup Screen #2 | Create Cumulative Score Setup Screen to allow users to add products and quality and service ratios for the Cumulative Scorecards. | Appendix F |
| 3.1.E.1 | | Display Scorecard Name | Display Scorecard name text box that was entered on Cumulative Score Setup Screen #1. | Appendix F |
| 3.1.E.2 | | Display Scorecard Description | Display Scorecard Description text box that was entered on Cumulative Score Setup Screen #1. | Appendix F |

TABLE 1-continued

| UNIQUE REQ ID | FUNCTION | REQUIREMENT NAME | REQUIREMENT/FUNCTION DESCRIPTION | FIG. |
|---|---|---|---|---|
| 3.1.E.3 | | Add Product Category Combo Box | Provide a combo box for the user to select the product category that the scorecard will apply to. | Appendix F |
| 3.1.E.4 | | Add Product Combo Box | Provide a combo box for the user to select the product that the scorecard will apply to. The list will only contain products that are in the chosen Product Category. | Appendix F |
| 3.1.E.5 | | Create Product Table | Create table to display products for the current scorecard. | Appendix F |
| 3.1.E.6 | | Add Product button | Add "Add Product" button to allow user to add the selected product to the current scorecard. When Add Product button is clicked, check to make sure that product does not exist in any saved scorecards. If product is not in any saved scorecards, add product selected to the Product Table. Refresh screen after button is clicked. | Appendix F |
| 3.1.E.7 | | Add Delete Buttons | Add Delete buttons to delete any products in the Product Table. Display message box "Are you sure you want to delete the product from the current scorecard" when the Delete button is clicked. Remove product from table if yes is clicked. Refresh screen after button is clicked. | Appendix F |
| 3.1.E.8 | | Add Quality Ratio Text Box | Provide a text box to enter the ratio for the Quality Score. Values entered must be between 0 and 100. | Appendix F |
| 3.1.E.9 | | Add Service Ratio Text Box | Provide a text box to enter the ratio for the Service Score. Values entered must be between 0 and 100. | Appendix F |
| 3.1.E.10 | | Display Cumulative Ratio | Provide a field to display the total of the Quality and Service ratios. Cumulative Ratio is the sum of the Quality Ratio and Service Ratio. | Appendix F |
| 3.1.E.11 | | Add Submit Button | Add Submit button to save current scorecard. Cumulative Ratio must be equal to 100. Display message box "Cumulative Ratio must equal 100% before proceeding" if Cumulative Ratio does not equal 100. Message box "Are you sure you want to save this scorecard" should appear when submit button is clicked, if Cumulative Ratio is equal to 100. If the users clicks OK, add current scorecard to Cumulative Scorecard table and the users is returned to the Cumulative Score Screen. If the user clciks "Cancel", the action is cancelled. | Appendix F |
| 3.2 | Turnaround Time Score Matrix | | | |
| 3.2.A | | Create a Link for Service Score Screen | Create a link for the Service Score under Scorecard Menu. Link will go to the Service Score Screen. | Appendix C |
| 3.2.B | | Create Service Score Screen | Create Service Score Screen to allow users to view all saved service scorecards. | Appendix G |
| 3.2.B.1 | | Create Service Scorecard Table | Create a table to display Products and Description of scorecard. | Appendix G |
| 3.2.B..2 | | Add Edit Buttons | Add edit button to edit any saved scorecard. The edit button will be a link to Service Score Setup Screen #2. | Appendix G |
| 3.2.B..3 | | Add Delete Buttons | Add Delete buttons to delete any saved scorecards. Display message box "Are you sure you want to delete the saved scorecard" when the Delete button is clicked. Remove scorecard from table if yes is clicked. Refresh Service Score Screen. | Appendix G |
| 3.2.B..4 | | Add Create Scorecard Button | Add Create Scorecard Button to create new Service Scorecard. Create Scorecard button will be a link to Service Score Setup Screen #1. | Appendix G |
| 3.2.C | | Create Service Score Setup Screen #1 | Create Service Score Setup Screen to allow users to create a new service scorecard. | Appendix H |
| 3.2.C.1 | | Add Radio Buttons | Add Radio Buttons to start with an existing scorecard. Radio button will default to No. If yes button is selected, provide combo box for all saved scorecards. | Appendix H |

TABLE 1-continued

| UNIQUE REQ ID | FUNCTION | REQUIREMENT NAME | REQUIREMENT/FUNCTION DESCRIPTION | FIG. |
|---|---|---|---|---|
| 3.2.C.2 | | Add Scorecard Name Text Box | Add Scorecard Name text box. This is a required field. Text box should be large enough to display 30 characters. | Appendix H |
| 3.2.C.3 | | Add Scorecard Description Text Box | Add Scorecard Description text box. This is a required field. Text box should have a scroll bar to allow user to scroll through entire description. | Appendix H |
| 3.2.C.5 | | Add Next Button | Add Next button to link to Service Score Setup Screen #2. If No Radio button is selected and Scorecard Name is null, display message "Scorecard is Required". | Appendix H |
| 3.2.C.6 | | Add Cancel Button | Add Cancel Button to link to Service Score Screen. | Appendix H |
| 3.2.D | | Create Service Score Setup Screen #2 | Create Service Score Setup Screen to allow users to add products and set up Turn Time Matrix. | Appendix I |
| 3.2.D.1 | | Display Scorecard Name | Display Scorecard name t that was entered on Service Score Setup Screen #1. | Appendix I |
| 3.2.D.2 | | Display Scorecard Description | Display Scorecard Description that was entered on Service Score Setup Screen #1. | Appendix I |
| 3.2.D.3 | | Add Product Category Combo Box | Provide a combo box for the user to select the product category that the scorecard will apply to. (The category will only be those categories the Requestor has setup in Products to Order) | Appendix I |
| 3.2.D.4 | | Add Product Combo Box | Provide a combo box for the user to select the product that the scorecard will apply to. The list will only contain products that are in the chosen Product Category. (The products will only be those products the Requestor has setup in Products to Order) | Appendix I |
| 3.1.D.5 | | Create Product Table | Create table to display products for the current scorecard. | Appendix I |
| 3.1.D.6 | | Add Product button | Add "Add Product" button to allow user to add the selected product to the current scorecard. When Add Product button is clicked, check to make sure that product does not exist in any saved scorecards. If product is not in any saved scorecards, add product selected to the Product Table. Refresh screen after button is clicked. | Appendix I |
| 3.1.D.7 | | Add Delete Buttons | Add Delete buttons to delete any products in the Product Table. Display message box "Are you sure you want to delete the product from the current scorecard" when the Delete button is clicked. Remove product from table if yes is clicked. Refresh screen after button is clicked. | Appendix I |
| 3.2.D.8 | | Create Turn Time Matrix | Create Turn Time Matrix to allow user to assign a percentage score to range of days. | Appendix I |
| 3.2.D.9 | | Add a text box for (<=) | This box will contain the number of days, from the ordered date, it takes a vendor to complete an order. If the vendor completes the order within the set period (<=), the vendor will receive the score specified. | |
| 3.2.D.10 | | Add Nine Range Text Boxes | Provide nine range text boxes to allow the user to enter the number of days from the due date for each score. | Appendix I |
| 3.2.D.11 | | Range - Rule 1 | When a value is entered in the first text box, the min value on the following text box will contain the previous value + 1. (i.e 2 is entered for the first text box, 3 will be displayed for the min for the following range) | |
| 3.2.D.12 | | Range - Rule 2 | When a value is entered for the max value, the following min value will contain the previous max value + 1. (i.e 3 to 5 is entered for the range, 6 will be displayed for the min for the following range) | |
| 3.2.D.13 | | Range - Rule 3 | All min values will be grayed-out and disabled. | |
| 3.2.D.14 | | Range - Rule 4 | An infinity sign will be displayed in the max value for a range following a completed range. | |
| 3.2.D.15 | | Range - Rule 5 | The infinity sign will be removed when the max value field is accessed. | |
| 3.2.D.16 | | Range - Rule 6 | If no value is entered in the ending range's max value field, and the user tabs out of the box, the infinity sign is repopulated. | |
| 3.2.D.17 | | Range - Rule 7 | The max value of an ending range must contain an infinity symbol. | |

TABLE 1-continued

| UNIQUE REQ ID | FUNCTION | REQUIREMENT NAME | REQUIREMENT/FUNCTION DESCRIPTION | FIG. |
|---|---|---|---|---|
| 3.2.D.18 | | Range - Rule 8 | If a max value is lower than the min value and the user tabs out of the max value field, display the following message "A max value can't be lower than the min value". | |
| 3.2.D.19 | | Add Service Score % Text Box | Provide a text box for the user to enter the score that is attributed to each day range. There should be ten text boxes. | Appendix I |
| 3.2.D.20 | | Service Score % - Rule 1 | When a value is entered in a Service Score % text field, a % is added to the value. (i.e 95 is entered, value displayed is 95%) | |
| 3.2.D.21 | | Service Score % - Rule 2 | The value entered in a Service Score % text field must be numeric. | |
| 3.2.D.22 | | Service Score % - Rule 3 | Special characters can't be entered in the Service Score % text field. | |
| 3.2.D.23 | | Service Score % - Rule 4 | The Service Score % can't be higher than 100%. | |
| 3.2.D.24 | | Add Submit Button | When the Submit button is depressed, add current service score to Service Score table and display the Service Score Screen. | Appendix I |
| 3.2.D.25 | | Add Cancel Button | When the Cancel button is depressed, the message "All information will be lost, are you sure you wish to continue?" will appear. The two options will be "Yes" or "No". | |
| 3.3.0 | Automated Vendor Scoring | | Rules for the setup process for the Automated Vendor Scoring Setup | |
| 3.3.1B | | Automated Vendor Scoring Setup | When Automated Scoring link is activated from the Score Card page, populate the workstation frame with the Automated Scoring page | Appendix C |
| 3.3.2B | | Automated Vendor Scoring Setup - Profile Table | Provide a table that will contain all of the Profiles created. | Appendix J |
| 3.3.3B | | Profile Table - Columns | The Profile Table's columns will be as follows: APS Profile Name Description Options | Appendix J |
| 3.3.4B | | Profile Table - Options | The following hyperlinks will appear under the Options column: Edit Delete | Appendix J |
| 3.3.5B | | Options - Edit | When the Edit link is activated, the workstaion section will display the Profile for editing. | Appendix K |
| 3.3.6B | | Options - Delete | When the Delete link is activated, the message "Are you sure you wish to delete this item?" will appear. The two options will be "Yes" or "No". | Appendix J |
| 3.3.7B | | Profile Table - Create New Auto-Scoring Profile | When the "Create New Auto-Scoring Profile" button is depressed, the New Profile page will appear in the workstation. | Appendix J |
| 3.3.8B | | New Auto-Scoring Profile | The New APS Profile page will contain the following sections: Description Products Fulfilled (See Appendix Q for layout) | Appendix K |
| 3.3.9B | | Auto-Scoring Profile - Description | Description will contain a scrolling text box. (See Appendix Q for layout) | Appendix K |
| 3.3.10B | | Auto-Scoring Profile - Products Fulfilled | Products to Order will contain the standard product selection process: Select Category, Select Product. The products available will be those that the Requestor has setup. | Appendix K |
| 3.3.11B | | Auto-Scoring Profile - Product Sub-List 1 | The list of products will not contain products that are contained within other Profiles within Staging. (This prevents overlaps) | |
| 3.3.12B | | Auto-Scoring Profile - Product Sub-List 2 | The list of products will only contain those products that are setup for a Quality Score Card. (All products must have a Quality Score Card association to be a product defined in Auto-Scoring). | |
| 3.3.13B | | Auto-Scoring Profile - Next Button | When the 'Next' button is depressed, the second screen of New APS Profile will appear in the workstation frame. | Appendix K |
| 3.3.14B | | Auto-Scoring Profile - Cancel Button | When the Cancel button is depressed, the message "All information will be lost, are you sure you wish to continue?" will appear. The two options will be "Yes" or "No". | Appendix K |

TABLE 1-continued

| UNIQUE REQ ID | FUNCTION | REQUIREMENT NAME | REQUIREMENT/FUNCTION DESCRIPTION | FIG. |
|---|---|---|---|---|
| 3.3.15B | | Auto-Scoring Profile - 2$^{nd}$ Screen | The 2$^{nd}$ screen will contain the following sections:<br>Product Fulfilled<br>Options<br>Score | Appendix L |
| 3.3.16B | | APS Profile - Product Fulfilled | The Products Fulfilled section will contain the product identified in the first screen.<br>(See Appendix R for layout) | Appendix L |
| 3.3.17B | | APS Profile - Add Product Rule | When the Add Product Rule button is depressed, add a row for a new Product APS rule. | Appendix L |
| 3.3.18B | | APS Profile - Product | The Product section will contain the following columns:<br>Data Element<br>Operator<br>Data Element<br>Operator<br>Value<br>Options | Appendix L |
| 3.3.19B | | APS Profile - Data Element (1) [Product] | When Data Element has 'Product 'selected, provide all "product fulfillment" fields for the specified product in the combo-box for Data Element. (i.e. for Flood Zone Determination LOL, the complete dataset for Element 79) | Appendix L |
| 3.3.20B | | APS Profile - Data Element (1) [File] | When Data Element has 'Product 'selected, provide all "file data" fields in RT in the combo-box for Data Element. This includes the Property BO and Loan BO data elements. | Appendix L |
| 3.3.21B | File Data Element (1) - w/Enumerated Values | | When the data type = enumerated value, the following requirements will apply: | Appendix L |
| 3.3.22B | | Operator (1) - Enumerated Values | When the data type of Data Element (1) = 'enumerated value', then provide the following value in the combo-box:<br>=<br><=> | Appendix L |
| 3.3.23B | | Data Element (2) - Enumerated Values | This field should be disabled and grayed-out. | Appendix L |
| 3.3.24B | | Operator (2) - Enumerated Values | This field should be disabled and grayed-out. | Appendix L |
| 3.3.25B | | Value - Enumerated Values | Provide the data element (1) enumerated value list in a combo-box | Appendix L |
| 3.3.26B | File Data Element (1) - w//Numeric Values | | When the data type = numeric, the following requirements will apply: | Appendix L |
| 3.3.27B | | Operator (1) - non-enumerated values | When the data type of Data Element (1) = 'numeric', then provide the following values in the combo-box:<br>+<br>−<br>/<br>*<br>=<br><<br><=<br>><br>>=<br><=> | Appendix L |
| 3.3.28B | | File Data Element (2) - Non-Enumerated Values I | Provide all "file data" fields in RT that does not have a data type = 'Enumerated Value' in a combo-box. | Appendix L |
| 3.3.29B | | File Data Element (2) - Non-Enumerated Values II | Remove the value that was selected in Data Element (1) from the list in Data Element (2). | Appendix L |
| 3.3.30B | | Operator (2) - Enumerated Values | When the data type of Data Element (1) = 'numeric', then provide the following values in the combo-box:<br>N/A<br>+<br>−<br>/<br>*<br>=<br><<br><=<br>><br>>=<br><=> | Appendix L |

TABLE 1-continued

| UNIQUE REQ ID | FUNCTION | REQUIREMENT NAME | REQUIREMENT/FUNCTION DESCRIPTION | FIG. |
|---|---|---|---|---|
| | | | In Range<br>Outside Range | |
| 3.3.31B | | Value - Non-Enumerated Values | Provide an open text box. | Appendix L |
| 3.3.32B | | Value - Data Type | The data entered must be numeric | Appendix L |
| 3.3.33B | | Value - Character limit | 10 character limit | Appendix L |
| 3.3.34B | | Value - Decimal | Allow up to two decimal places | Appendix L |
| 3.3.35B | Data Element (2) | | Rules for Data Element (2) | Appendix L |
| 3.3.36B | | Data Element (2) - Default | Defaults value = N/A | Appendix L |
| 3.3.37B | | Operator (2) - N/A | When Data Element (2) value is = N/A, then Operator (2) is disabled and grayed-out. | Appendix L |
| 3.3.38B | Operator (2) | | Rules for Operator (2) | Appendix L |
| 3.3.39B | | Operator (2) - Enumerated Values | Provide the following values in the combo-box:<br>N/A<br>+<br>−<br>/<br>*<br>=<br><<br><=<br>><br>>=<br><=><br>In Range<br>Outside Range | Appendix L |
| 3.3.40B | | Operator (2) - Range | If Operator (2) value = Range, then provide two text boxes.<br>(See Appendix R for layout) | Appendix L |
| 3.3.41B | Delete Link | | Rules for Delete link | Appendix L |
| 3.3.42B | | Delete link | When the Delete link is activated, the message "Are you sure you wish to delete this item?" will appear. The two options will be "Yes" or "No". | Appendix L |
| 3.3.43B | Add Rule Button | | Rules for Add Rule button | Appendix L |
| 3.3.44B | | Add Rule Button | When the add Rule button is depressed, add a row for a new APS rule. | Appendix L |
| 3.3.45B | Save Button | | Rules for Save Button | Appendix L |
| 3.3.46B | | Save Button | When the Save Button is depressed, it submits Profile and brings you to the Auto-Scoring Profile page | Appendix L |
| 3.3.47B | Cancel Button | | Rules for Cancel Button | Appendix L |
| 3.3.48B | | Cancel Button | When the Cancel Button is depressed, display "Are you sure you want to cancel this action?" The two options will be "Yes" or "No". | Appendix L |
| 3.3.49B | | Cancel Button - Yes | If Yes is selected, action cancelled, takes you to Auto-Scoring Profile page. | Appendix L |
| 3.3.50B | Product Fulfillment APS - Options | | Rules for Product Fulfillment APS - Options | Appendix L |
| 3.3.51B | | Product Fulfillment APS - Options | There will be two option boxes for Product Fulfillment APS:<br>Both of the rules fit the criteria<br>Either of the rules fit the criteria | Appendix L |
| 3.3.52B | | Options - Both Rules | If the option box 'Both of the rules fit the criteria' is selected then both of the rules must take place for the APS to take place. | Appendix L |
| 3.3.53B | | Options - Either of the Rules | If the option box 'Either of the rules fit the criteria' is selected then if either of the rules can happen for the APS to take place. | Appendix L |
| 3.3.54B | Score | | This is the score the vendor will receive if the rules are met. | Appendix L |
| 3.3.55B | | Auto-Scoring - Score | A combo-box with the list of the possible scores for that product's Score Card will be contained within the combo-box. | Appendix L |
| 3.3.54B | | APS Profile - Submit Button | When the 'Submit' button is depressed, the Product Fulfillment APS page will appear in the workstation frame. | Appendix L |
| 3.3.55B | | APS Profile - Cancel Button | When the Cancel button is depressed, the message "All information will be lost, are you sure you wish to continue?" will appear. The two options will be "Yes" or "No". | Appendix L |
| 3.4 | Quality Scoring | Ability to apply scorecard to multiple products | | |

TABLE 1-continued

| UNIQUE REQ ID | FUNCTION | REQUIREMENT NAME | REQUIREMENT/FUNCTION DESCRIPTION | FIG. |
|---|---|---|---|---|
| 3.4.A | | Update Quality Scorecard Table | Add new column to quality scorecard table to display products that saved scorecards apply to. | Appendix C |
| 3.4.B | | Update Quality Score Setup Screen #2 | Provide the ability to assign products to a quality scorecard. | Appendix M |
| 3.4.B.1 | | Add Product Category Combo Box | Provide a combo box for the user to select the product category that the scorecard will apply to. | Appendix N |
| 3.4.B.2 | | Add Product Combo Box | Provide a combo box for the user to select the product that the scorecard will apply to. The list will only contain products that are in the chosen Product Category. | Appendix N |
| 3.4.B.3 | | Create Product Table | Create table to display products for the current scorecard. | Appendix N |
| 3.4.B.4 | | Add Product button | Add "Add Product" button to allow user to add the selected product to the current scorecard. When Add Product button is clicked, check to make sure that product does not exist in any saved scorecards. If product is not in any saved scorecards, add product selected to the Product Table. Refresh screen after button is clicked. | Appendix N |
| 3.4.B.5 | | Add Delete Buttons | Add Delete buttons to delete any products in the Product Table. Display message box "Are you sure you want to delete the product from the current scorecard" when the Delete button is clicked. Remove product from table if yes is clicked. Refresh screen after button is clicked. | Appendix N |
| | | Delete Current Scorecard/Product Setup | Delete the current Scorecard/Product Setup features located within the Product Page. | |
| 4.0A | Enhanced Qualitative Distribution | Enhanced Qualitative Distribution | This function will provide the users of AVS the capability of distributing orders to vendors based on the history of their turn-time performance. The cumulative score function will allow a requestor to uniquely weight a vendor's quality score w/the vendor's service score on a per product basis. | |
| 4.1A | | Turn-time score criteria. | This function will provide the users of AVS the capability of distributing orders to vendors based on the history of their turn-time performance. | |
| 4.2A | | Cumulative score criteria. | THE CUMULATIVE SCORE FUNCTION WILL ALLOW A REQUESTOR TO UNIQUELY WEIGHT A VENDOR'S QUALITY SCORE W/THE VENDOR'S SERVICE SCORE ON A PER PRODUCT BASIS. | |
| | Automated Vendor Selection | | | |
| 4.0C | Add'l Distribution Limits | Add'l Distribution Limits | This function will provide the users of AVS the capability of preventing distribution of orders to vendors that do not fall into the automated distribution model. | |
| 4.2C | | Outstanding Late Order Ratio | This function will provide the users of AVS the capability of preventing distribution of orders to vendors that do not have more than "x" percent of late orders/"x" percent orders | Appendix Y |
| 4.3C | | Daily Capacity | This will provide the users of AVS the capability of limiting the number of orders given to a vendor on a given day. | Appendix Y |
| 4.3C1 | | Daily Capacity Definition/Calculation | Daily capacity is the maximum number of new orders a vendor can receive in a given day. | |
| 4.3C2 | | Add Daily Capacity to Products Ordered Vendor Selection Screen | Add Daily Capacity to Products Ordered Vendor Selection Screen. | |
| 4.3C3 | | Daily Capacity Rule 1 | The auto vendor selection feature should eliminate vendors who have reached their daily capacity. automated distribution model. | |
| 4.1D | | Auto-Reprocess Declined Orders | This function will provide the users of AVS the capability of reprocessing a declined order. This reprocessing will create a new order, deselect the original vendor from the available distribution list, run the AVS engine, select the vendor, and place the order. | |

TABLE 1-continued

| UNIQUE REQ ID | FUNCTION | REQUIREMENT NAME | REQUIREMENT/FUNCTION DESCRIPTION | FIG. |
|---|---|---|---|---|
| 4.2D | | Distribution Option Section | Add a distribution option section to the Distribution Option Page. | |
| 4.3D | | Auto-Reprocess Declined Orders Option Box | Add a Yes/No option box for Auto-Reprocess Declined Orders. | |
| 4.4D | | Auto-Reprocess Declined Orders | When an order is declined, and the product is selected for AVS, and Yes is selected for Auto-Reprocess Declined Orders, the order automatically gets reprocessed. Data needed for reprocessing: Declined Status Order ID RESP ID | |
| 4.5D | | Reprocess Functionality 1 | The original declined order's order form will be used to create a duplicate order. | |
| 4.6D | | Reprocess Functionality 2 | The duplicate order will be processed via the AVS engine, with the original vendor (that declined the order) de-selected from the eligible vendor list. | |
| 4.7D | | Reprocess Functionality 3 | If successfully placed via the AVS engine, the order will be placed to the selected vendor. | |
| 4.8D | | Reprocess Functionality 4 | If there is a problem with the AVS processing, the file will be sent to the exception bin with the reason for the exception. | |
| 4.9D | | Reprocess - Substatus | The Placed status should contain a substatus of Reprocessed. | |
| 4.10D | | Reprocess - Event Log | The reprocessing events should be logged within the Event Log. | |
| 4.0E | AVS - Pre Order Form Submission | AVS - Pre Order Form Submission | This function will use the AVS functionality prior to order form submission. | |
| 4.1E | | Expanding File Level Data | This modification will expand the file level information to capture key data that will be used for AVS. | |
| 4.2E | | Pre-Selection of Best Vendor | This functionality will pre-select "the best" vendor that the RT engine has selected. | |
| 4.3E | | Displaying Available Vendors for Distribution | This functionality will display vendors that are available for distribution. | |
| 4.4E | | AVS Selection Override | This functionality will allow for the user to override the AVS decision. | |
| 4.5E | | AVS Selection - Order Counting | The vendor's order count will be incremented when the order is placed (Not when the AVS rules engine selects the vendor) | |
| 5.1A | Order Forwarding - AVS | Order Forwarding - AVS | Provide the ability for auto vendor selection to work with Order Forwarding | |
| 5.2A | | Order Forwarding - AVS | When the forward link is activated, if the requestor is VM enabled the AVS engine will run the rules, and highlight the AVS selected vendor. | Appendix O |
| 5.3A | | Order Forwarding Page | Expand the Order Fowarding page to include the additions made to the new ordering page detailed in Xpress Ordering. | Appendix O |
| 5.4A | Order Forwarding Changes: | | Detailed below are the Order Forwarding changes | Appendix O |
| 5.5A | | Filter Options | The filter options detailed in Appendix C should duplicate the current vendor filters in REALTrans. (The screen layout is detailed in Appendix L.) | Appendix O |
| 5.6A | Vendor List Table | --- | The available vendor list should be displayed in a table depicted in Appendix C. The table should contain the following sections/columns. AVS Profile Name AVS Distribution Rule ID Company Name Branch Name City State Vendor Type National Coverage Flag SLA Price % Current profile orders Current Vendor Grade Current capacity Auto-Select Flag Exceeded Capacity Flag Current late order ratio | Appendix L |

TABLE 1-continued

| UNIQUE REQ ID | FUNCTION | REQUIREMENT NAME | REQUIREMENT/FUNCTION DESCRIPTION | FIG. |
|---|---|---|---|---|
| | | | (See Appendix C for details on layout of the table.) | |
| 5.7A | | AVS Profile Name | Display the AVS Profile Name | Appendix O |
| 5.8A | | AVS Distribution Rule ID | Display the AVS Distribution Rule ID | Appendix O |
| 5.9A | | Company Name | Display the vendor's Company Name | Appendix O |
| 5.10A | | Branch Name | Display the vendor's Branch Name | Appendix O |
| 5.11A | | City | Display the vendor's City | Appendix O |
| 5.12A | | State | Display the vendor's State | Appendix O |
| 5.13A | | Vendor Type | Display the vendor's Vendor Type | Appendix O |
| 5.14A | | National Coverage Flag | Display a check mark if the vendor has nationwide coverage | Appendix O |
| 5.15A | | SLA Price | Display the vendor's SLA price | Appendix O |
| 5.16A | | % Current profile orders | If the Distribution Rule is set for % distribution, then display the vendor's percentage of current profile orders | Appendix O |
| 5.17A | | Current Vendor Grade | Display the vendor's current vendor grade | Appendix O |
| 5.18A | | Current capacity | Display the vendor's current capacity | Appendix O |
| 5.19A | | Auto-Select Flag | Display a check mark if the vendor is marked for AVS | Appendix O |
| 5.20A | | Exceeded Capacity Flag | Display a check mark if the vendor has Exceeded Capacity | Appendix O |
| 5.21A | | Current late order ratio | Display the vendor's current late order ratio (Late Open Orders/Total Open orders) | Appendix O |
| 5.22A | | Selected Vendor | The entire row for the Vendor selected by the AVS engine should be highlighted. (See Appendix C in Xpress Ordering Req for details on layout of the table.) | Appendix O |
| 5.23A | | Screen Layout | The screen layout is detailed in Appendix C in Xpress Ordering Req. | Appendix O |
| 5.24A | | Command Button - Next (Single Product Selected) | When the Next command is depressed, the user should be brought to the selected product's order form (Appendix D in Xpress Ordering Req). | Appendix O |
| 5.25A | | Command Button - Next (Multiple Products Selected) | When the Next command is depressed, the user should be brought to the consolidated order form (Appendix E in Xpress Ordering Req). | Appendix O |
| 5.26A | | Command Button - Cancel | When the Cancel command is depressed, the order placement should be halted and the user should be brought to the Ordering Page (Appendix A in Xpress Ordering Req). | Appendix O |
| 5.0B | Bulk Order Forwarding | | Provide the ability for a vendor to bulk forward orders by either Prortfolio or by Requestor. The Bulk Order Forwarding will be used in conjunction with AVS. | Appendix S |
| 5.1B | | Bulk Order Forwarding | If the client's account is VM enabled, provide a Bulk Order Forwarding section in the Bulk Management Screen. | Appendix S |
| 5.2B | | Bulk Order Forwarding - Filters | The orders will be able to be filtered by: Portfolio Number In the vendor's entire system | Appendix S |
| 5.3B | | Bulk Order Forwarding - Specified Category Type | This filter will display the specified product for each file that has a status of New (10) or Confirmed (20) in their system. (This can also be sub-filtered by Portfolio.) | Appendix S |
| 5.4B | | Bulk Order Forwarding - System | If only the product type is specified, this will display the specified product for each file in the vendor's system. | Appendix S |
| 5.5B | | Bulk Order Forwarding - Portfolio Number | This sub-filter will display the specified product (Req # 5.3B) for each file that has a status of New (10) or Confirmed (20), in the specified Portfolio. | Appendix S |
| 5.7B | | Bulk Order Forwarding - 'Go' Button | When the 'Go' button is depressed, the specified filters will be ran, and the $2^{nd}$ page will appear (AppendixT), | Appendix S |
| 5.8B | | Order Forwarding Options | The order forwarding options detailed in Appendix C should duplicate the current order forwarding options in REALTrans. (The screen layout is detailed in Appendix T.) | Appendix T |
| 5.9B | | Bulk Order Forwarding - Order Page | This page will display the orders that have been specified by the filters on the previous page. | Appendix T |

TABLE 1-continued

| UNIQUE REQ ID | FUNCTION | REQUIREMENT NAME | REQUIREMENT/FUNCTION DESCRIPTION | FIG. |
|---|---|---|---|---|
| 5.10B | | Bulk Order Forwarding - Order Page Table | The table of orders will consist of the following columns:<br>Select<br>Product<br>File #<br>Vendor Order #<br>Property<br>Borrower<br>Requestor<br>Ordered Date<br>Due Date<br>Status<br>Order Form | Appendix T |
| 5.11B | | Bulk Order Forwarding - Select | This column will contain a check box that selects (if checked) or deselects (if unchecked) the order to be forwarded | Appendix T |
| 5.12B | | Bulk Order Forwarding - Product | This column will contain the Product Name | Appendix T |
| 5.13B | | Bulk Order Forwarding - File # | This column will contain the File Number | Appendix T |
| 5.14B | | Bulk Order Forwarding - Vendor Order # | This column will contain the Vendor Order Number | Appendix T |
| 5.15B | | Bulk Order Forwarding - Property | This column will contain the Property Address | Appendix T |
| 5.16B | | Bulk Order Forwarding - Borrower | This column will contain the Borrower's First and Last Name | Appendix T |
| 5.17B | | Bulk Order Forwarding - Requestor | This column will contain the Requestor's name that is ordering the product | Appendix T |
| 5.18B | | Bulk Order Forwarding - Ordered Date | This column will contain the date the product was ordered | Appendix T |
| 5.19B | | Bulk Order Forwarding - Due Date | This column will contain the date the product is due | Appendix T |
| 5.20B | | Bulk Order Forwarding - Status | This column will contain the Stauts of the order (New or Confirmed) | Appendix T |
| 5.21B | | Bulk Order Forwarding - Order Placement Form | This column will contain an icon that links to the Order Placement Form. | Appendix T |
| 5.22B | | Activation of the Order Placement Form Icon | When the Order Placement Form icon is activated, the Order Placement Form will appear in a separate window. | Appendix T |
| 5.23B | | Editing of the Order Placement Form | When the Order Placement Form is edited, the Bulk Order Forwarding page will update the changes. | Appendix T |
| 5.24B | | Bulk Order Forwarding - Page scrolling | The standard page scrolling function will be located on the bottom of the page. (See Appendix T) | Appendix T |
| 5.25B | | Bulk Order Forwarding - Auto Select Vendors | When the 'Auto Select Vendors' button is depressed each order will run the AVS rules, and then place the selected orders to the vendors specified in the AVS engine. | Appendix T |
| 5.26B | | Bulk Order Forwarding - Exception Bin | If the AVS engine can't place an order for whatever reason (i.e no vendor coverage, error, etc...), the files will be sent to the Exception Bin. | Appendix T |
| 7.0 | Work Queues | | Provide the capability of creating flexible work queues that will contain orders that meet the specified criteria. The criteria for each work queue must be rules driven and set up or modified by the account administrator. | |
| 7.0A | Create Work Queue Display Screen | | Create a screen to allow the user to view all Work Queues that have been created. | |
| 7.1A | | Add Work Queues Menu Option | Add a menu option for Work Queues under the 'Admin' button. | |
| 7.2A | | Create Work Queue Administration screen | Create a screen to display all active and inactive work queues. | |
| 7.3A | | Create Work Queue table | Create work queue table to store all work queues and information related to the work queues. | Appendix BB |
| 7.4A | | Work Queue table columns | The Work Queue table's columns will be:<br>Work Queue Description<br>Work Queue Type<br>Work Queue Status<br>Work Queue Created Date<br>Work Queue Inactive Date<br>Options | |

TABLE 1-continued

| UNIQUE REQ ID | FUNCTION | REQUIREMENT NAME | REQUIREMENT/FUNCTION DESCRIPTION | FIG. |
|---|---|---|---|---|
| 7.4A1 | | Work Queue table - Work Queue Description | The Work Queue Description will display the description of the work queue. | |
| 7.4A2 | | Work Queue table - Work Queue Type | The Work Queue Type will display the type of work queue. The type of work queue will be WorkFlow or Work Queue. | |
| 7.4A3 | | Work Queue Status | The Work Queue Status will display the current status of the work queue. | |
| 7.4A4 | | Work Queue Created Date | The Work Queue Created Date will display the date that the work queue was created. | |
| 7.4A5 | | Work Queue Inactive Date | The Work Queue Created Date will display the date that the work queue was inactivated. | |
| 7.5A | | Work Queue table - Options | The following buttons will appear under the Options column:<br>Edit<br>Delete | |
| 7.6A | | Options - Edit Button Action | When the 'Edit' button is clicked, the Work Queue setup screen will appear for the corresponding Work Queue. | |
| 7.7A | | Options - Delete Button | When the 'Delete' button is clicked, the message "Are you sure you want to delete this item?" | |
| 7.8A.1 | | Delete Message Box | The Delete Message Box will contain two buttons - "OK" and "Cancel" | |
| 7.8A.2 | | Delete Message Box - OK Button | When the 'OK' button is clicked, the work queue will be deleted and the Work Queue Display screen will refresh. | |
| 7.8A.3 | | Delete Message Box - Cancel Button | When the 'Cancel' button is clicked, the Message box will close and no changes will be made. | |
| 7.8A | | Add Create New Button | When the 'Create New' button is clicked the Work Queue setup screen will appear. | |
| 7.0B | Create Workflow/ Queue Setup Screen | | Create a screen to allow the user to setup work queues and workflows. | Appendix CC |
| 7.1B | | Add Description Text box to Work Queue Setup screen | Add a text box to the Work Queue Setup screen to allow the user to enter a description of the Work Queue. The text box should allow up to 250 characters. | |
| 7.2B | | Add Work Queue Type Combo box to Work Queue Setup screen | Add a combo box to the Work Queue Setup screen to allow the user to specify the type of work being created. | |
| 7.2B1 | | Work Queue Type - Values | The Work Queue Type combo box should contain the following values:<br>Work Queue<br>Work Flow | |
| 7.3B | | Add Active Radio Button to Work Queue Setup screen | Add a radio button to the Work Queue Setup screen to allow the user to mark the current work queue as active. | |
| 7.4B1 | | Add Active Date field to Work Queue Setup screen | Add a field to the Work Queue Setup screen to display the date that the work queue was marked as active. | |
| 7.4B2 | | Active Date field - Rule | The Active Date field should automatically populate based on the date that the Active Radio Button is clicked. | |
| 7.5B | | Add Inactive Radio Button to Work Queue Setup screen | Add a radio button to the Work Queue Setup screen to allow the user to mark the current work queue as inactive. | |
| 7.6B1 | | Add Inactive Date field to Work Queue Setup screen | Add a field to the Work Queue Setup screen to display the date that the work queue was marked as inactive. | |
| 7.6B2 | | Inactive Date field - Rule | The Active Date field should automatically populate based on the date that the Inactive Radio Button is clicked. | |
| 7.7B1 | | Setup Screen - Next button | Add a 'Next' button to the Work Queue setup screen. | |
| 7.7B2 | | Next Button - Rule 1 | When the 'Next' button is clicked, if value in the Work Queue Type Combo Box equals "Work Queue" the Work Queue setup2 screen will appear. | |
| 7.7B3 | | Next Button - Rule 2 | When the 'Next' button is clicked, if value in the Work Queue Type Combo Box equals "Work Flow" the WorkFlow setup2 screen will appear. | |

TABLE 1-continued

| UNIQUE REQ ID | FUNCTION | REQUIREMENT NAME | REQUIREMENT/FUNCTION DESCRIPTION | FIG. |
|---|---|---|---|---|
| 7.8B | | Setup Screen - Cancel button | Add a 'Cancel' button to the Work Queue setup screen. When the 'Cancel' button is clicked, the Work Queue Display screen will appear. | |
| 7.9B1 | | Setup2 screen - Cancel Warning Message | Provide a warning message that appears if the 'Cancel' button is clicked. The warning should read "Are you sure you want to Cancel the setup?" | |
| 7.9B2 | | Warning Message button - OK | Provide an 'OK' button on the warning message. If the 'OK' button is clicked all changes will be lost and the Work Queue Display screen will appear. | |
| 7.9B3 | | Warning Message button - Cancel | Provide a 'Cancel' button on the warning message. If the 'Cancel' button is clicked the warning message will close and the Setup screen will appear. | |
| 7.0C | Create Work Queue Setup 2 Screen | | Create a screen to allow the user to setup work queues and select the fields that will be used in the work queue. | |
| 7.1C | | Setup Screen 2 - Fields Available | Add a table to display all available fields for the Work Queue. | Appendix DD |
| 7.2C | | Setup Screen 2 - Fields Selected | Add a table to display all fields selected for the Work Queue. | |
| 7.3C.1 | | Setup Screen 2 - Select Field button | Provide a button for the user to select the highlighted field in the 'Fields Available' table. | |
| 7.3C.2 | | Select Field Button - Action | When the button is clicked, the highlighted field is moved to the 'Fields Selected' table and removed from the 'Fields Available' table. | |
| 7.4C | | Setup Screen 2 - Select Warning Message | Provide a warning message that appears if the 'Select Field' button is clicked without highlighting a field in the 'Fields Available' list box. The warning should read "Please select a field from the list of Fields Available". | |
| 7.5C | | Setup Screen 2 - Deselect Field button | Provide a button for the user to deselect the highlighted field. When the button is clicked the highlighted field should be moved to the 'Fields Available' table and removed from the 'Fields Selected' table. | |
| 7.6C | | Setup Screen 2 - Deselect Warning Message | Provide a warning message that appears if the 'Deselect Field' button is clicked without highlighting a field in the 'Fields Selected' list box. The warning should read "Please select a field from the list of Fields Selected". | |
| 7.7C | | Setup Screen 2 - Deselect All Fields button | Provide a button for the user to deselect all of the fields from the 'Fields Selected' list. When the button is clicked, all fields in the 'Fields Selected' table should be moved to the 'Fields Available' table and removed from the 'Fields Selected' table. | |
| 7.8C | | Setup Screen 2 - Next button | Add a 'Next' button to the Work Queue Setup 2 screen. When the 'Next' button is clicked, the Work Queue setup2 screen will appear. | |
| 7.9C | | Setup Screen 2 - Cancel button | Add a 'Cancel' button to the Work Queue Setup 2 screen. When the 'Cancel' button is clicked, the Work Queue Display screen will appear. | |
| 7.10C | | Setup screen 2 - Cancel Warning Message | Provide a warning message that appears if the 'Cancel' button is clicked. The warning should read "Are you sure you want to Cancel the setup?" | |
| 7.11C | | Warning Message button - OK | Provide an 'OK' button on the warning message. If the 'OK' button is clicked all changes will be lost and the Work Queue Display screen will appear. | |
| 7.12C | | Warning Message button - Cancel | Provide a 'Cancel' button on the warning message. If the 'Cancel' button is clicked the warning message will close and the Setup screen will appear. | |
| 7.13C | | Vendor Fields Available | The Vendor fields that should be available are: Contact Name Company Name Company Address Company City Company State Company Zip | |

TABLE 1-continued

| UNIQUE REQ ID | FUNCTION | REQUIREMENT NAME | REQUIREMENT/FUNCTION DESCRIPTION | FIG. |
|---|---|---|---|---|
| | | | Business Phone Email Address Cell Phone | |
| 7.14C | | Add Calculated Field Button | Add a button to allow the user to create a calculated field. | |
| 7.15C | | Calculated Field Button - Action | When the Calculated Field Button is clicked, the Calculated Field screen will open. | |
| 7.0D | Create Work Queue Setup Screen 3 | | Create a screen to allow the user to sort the fields that will be displayed in the Work Queue. | Appendix EE |
| 7.1D1 | | Add Selected Fields table to Setup Screen 3 | Add a table to contain all selected fields to the Work Queue Setup Screen 3. | |
| 7.1D2 | | Selected Fields Table - Values | The Selected Fields table should contain all fields in the selected Fields table from the Work Queue Setup Screen 2. | |
| 7.2D1 | | Add Move to Top button to the Setup Screen 3 | Add Move to Top button to the Work Queue Setup Screen 3. | |
| 7.2D2 | | Move to Top button - Action | When the Move to Top button is clicked, the highlighted field should be moved to the top of the list. | |
| 7.2D3 | | Move to Top button - Rule 1 | When the Move to Top button is clicked, if the field is already located at the top of the list, the Move Up Warning message box should appear. | |
| 7.3D1 | | Add Move to Bottom button to the Setup Screen 3 | Add Move to Bottom button to the Work Queue Setup Screen 3. | |
| 7.3D2 | | Move to Bottom button - Action | When the Move to Bottom button is clicked, the highlighted field should be moved to the bottom of the list. | |
| 7.3D3 | | Move to Bottom button - Rule 1 | When the Move to Bottom button is clicked, if the field is already located at the bottom of the list, the Move Down Warning message box should appear. | |
| 7.4D1 | | Add Move Up button to the Setup Screen 3 | Add Move Up button to the Work Queue Setup Screen 3. | |
| 7.4D2 | | Move Up button - Action | When the Move Up button is clicked, the highlighted field should be moved up one position in the list. | |
| 7.4D3 | | Move Up button - Rule 1 | When the Move Up button is clicked, if the field is already located at the top of the list, the Move Up Warning message box should appear. | |
| 7.5D1 | | Add Move Down button to the Setup Screen 3 | Add Move Down button to the Work Queue Setup Screen 3. | |
| 7.5D2 | | Move Down button - Action | When the Move Down button is clicked, the highlighted field should be moved down one position in the list. | |
| 7.5D3 | | Move Down button - Rule 1 | When the Move to Bottom button is clicked, if the field is already located at the bottom of the list, the Move Down Warning message box should appear. | |
| 7.6D | | Move Up Warning Message - Details | The Move Up Warning message should read "The selected field is at the top of the list. | |
| 7.7D | | Move Down Warning Message - Details | The Move Down Warning message should read "The selected field is at the bottom of the list. | |
| 7.8D1 | | Add Remove Button to the Setup Screen 3 | Add Remove button to the Work Queue Setup Screen 3. | |
| 7.8D2 | | Remove Button - Action | When the Remove button is clicked, the highlighted field should be removed from the list. | |
| 7.0E | Create Work Queue Criteria screen | | Create a screen to determine how each of the fields selected in Work Queue Setup 3 screen will be used. | Appendix FF |
| 7.1E | | Criteria screen - Display Fields | Display all fields in the "Fields Selected" table on the Work Queue Criteria screen. The fields should be displayed in one column vertically down the left side of the screen. | |
| 7.2E | | Criteria screen - Show Check Box | Add a check box to the right of each field that is in the 'Fields Selected' table. If the box is checked the field will be displayed in the Work Queue. If the box is not checked the field will not be displayed, but it can be used as criteria. | |

TABLE 1-continued

| UNIQUE REQ ID | FUNCTION | REQUIREMENT NAME | REQUIREMENT/FUNCTION DESCRIPTION | FIG. |
|---|---|---|---|---|
| 7.3E | | Criteria screen - Operator combo box | Add a combo box to the right of each check box containing the following values:<br>=<br>><br>>=<br><<br><=<br><> | |
| 7.4E | | Criteria screen - Filter Text Box | Add a text box to the right of each operator combo box. This text box will contain the criteria for the Work Queue. | |
| 7.5E | | Criteria screen - Back button | Add a 'Back' button to the Work Queue Criteria screen. When the 'Back' button is clicked, the Work Queue setup screen will appear. All of the fields that were in the 'Fields Selected' table should remain in the 'Fields Selected' table. All changes to the Work Queue Criteria screen should save. | |
| 7.6E | | Criteria screen - Next button | Add a 'Next' button to the Work Queue Criteria screen. When the 'Next' button is clicked, the Work Queue setup3 screen will appear. All of the changes to the Work Queue Criteria screen should save. | |
| 7.7E | | Criteria screen - Cancel button | Add a 'Cancel' button to the Work Queue Criteria screen. | |
| 7.8E | | Criteria screen - Cancel Warning Message | Provide a warning message that appears if the 'Cancel' button is clicked. The warning should read "Are you sure you want to Cancel the setup?" | |
| 7.9E | | Warning Message button - OK | Provide an 'OK' button on the warning message. If the 'OK' button is clicked all changes will be lost and the Work Queue Display screen will appear. | |
| 7.10E | | Warning Message button - Cancel | Provide a 'Cancel' button on the warning message. If the 'Cancel' button is clicked the warning message will close and the Criteria screen will appear. | |
| 7.0F | Create Work Queue Admin Screen | | | Appendix GG |
| 7.1F.1 | | Add User Combo box | Add a combo box to allow the user to select the user or users that will be associated to the work queue. | |
| 7.1F.2 | | User Combo box - Details | The combo box should contain all users set up for the account. | |
| 7.1F.3 | | User Combo box - Multiple Selections | The user should be able to select multiple users by holding down the control button. | |
| 7.2F.1 | | Add Group Combo box | Add a combo box to allow the admin to select the group or groups that will be associated to the work queue. | |
| 7.2F.2 | | Group Combo box - Details | The combo box should list all users set up for the account. | |
| 7.2F.3 | | Group Combo box - Multiple Selections | The user should be able to select multiple groups by holding down the control button. | |
| 7.3F1 | | Add Work Screen Combo box | Add a combo box to allow the admin to select the screen that should appear when the Work Queue user selects an order in the queue. | |
| 7.3F2 | | Work Screen Combo box - Details | The Work Screen combo box should list all screens available to the user. Examples of screens that should be available are:<br>Order Manager<br>Valuation Product Review element<br>View Only Fulfillment Form for all products<br>Vendor Maintenance Screen<br>Message Center | |
| 7.3F3 | | Work Screen Combo box - Multiple Selections | The user should be able to select multiple groups by holding down the control button. | |
| 7.4F1 | | Add Work Queue Selection combo box | Add a combo box to allow the admin to select the selection type for the current Work Queue. | |
| 7.4F2 | | Selection Combo box - Values | Add the following values to the Work Queue Selection Combo box:<br>Round Robin<br>Auto Feed<br>Manual Select | |

TABLE 1-continued

| UNIQUE REQ ID | FUNCTION | REQUIREMENT NAME | REQUIREMENT/FUNCTION DESCRIPTION | FIG. |
|---|---|---|---|---|
| 7.4F3 | | Round Robin Selection Description | When Round Robin is selected, the items in the work queue will be distributed to each user equally until all items in the work queue have been distributed or all users assigned to the queue have reached their maximum capacity. | |
| 7.4F4 | | Auto Feed Selection Description | When Auto Feed is selected, the items in the work queue will be distributed to each user equally automatically as each workflow item is closed. The user will not see the Work Queue, only the Work Queue Work Screen will appear. | |
| 7.5F5 | | Manual Select | When Manual Select is selected, the items in the work queue will be available to all users until a user selects the item to work on. Once a user has selected an item in the work queue, that item is unavailable for all other users and is removed from the work queue. | |
| 7.5F1 | | Add Inactive Date Field | Add a text box to enter the date that the Work Queue will become inactive. | |
| 7.5F2 | | Inactive Date Field - Format | The format of the Inactive Date field should be a date (mm/dd/yyyy). | |
| 7.5F3 | | Inactive Date Field - Rule 1 | The Inactive Date field is not a required field. | |
| 7.5F4 | | Inactive Date Field - Rule 2 | When the Inactive Date is less than today's date the Work Queue status should change from active to inactive. | |
| 7.6F1 | | Add Work Queue Type combo box | Add a combo box to allow the admin to select the Work Queue Type. | |
| 7.6F2 | | Work Queue Type Combo box - Values | Add the following values to the Work Queue Type Combo box:<br>File<br>Order | |
| 7.7F | | Work Queue Distribution | The Work Queue Distribution must refresh each day. All items in a user's Work Queue will be removed and redistributed at the beginning of the day. | |
| 7.0G | Create Work Flow Setup2 | | Create a screen to allow the user to setup work flows and select the business process that will occur when the work flow criteria is met. | Appendix HH |
| 7.1G1 | | Add Business Process Combo Box | Add a combo box to the Work Flow Setup 2 screen to allow the user to select the business process that will kick off when all of the workflow criteria are met. | |
| 7.1G2 | | Business Process Combo Box - Values | The Business Process Combo box will contain all business process that have been created. | |
| 7.2G1 | | Add Work Flow Trigger Combo box | Add a combo box to the Work Flow Setup 2 screen to allow the user to select the trigger type for the current workflow. | |
| 7.2G2 | | Work Flow Trigger Combo box - Values | The Work Flow Trigger Combo box should contain the following values:<br>Passive<br>Active | |
| 7.3G | | Add Next button to Work Flow Setup 2 screen | Add a 'Next' button to the Work Flow Setup 2 screen. When the 'Next' button is clicked, the WorkFlow setup3 screen will appear. All of the changes to the Work Flow Setup 2 screen should save. | |
| 7.4G | | Add Cancel button to Work Flow Setup 2 screen | Add a 'Cancel' button to the Work Flow Setup 2 screen. | |
| 7.5G1 | | Cancel Warning Message | Provide a warning message that appears if the 'Cancel' button is clicked. The warning should read "Are you sure you want to Cancel the setup?" | |
| 7.5G2 | | Warning Message button - OK | Provide an 'OK' button on the warning message. If the 'OK' button is clicked all changes will be lost and the Work Queue Display screen will appear. | |
| 7.5G3 | | Warning Message button - Cancel | Provide a 'Cancel' button on the warning message. If the 'Cancel' button is clicked the warning message will close and the Criteria screen will appear. | |
| 7.0H | Create Work Flow Setup 3 Screen | | Create a screen to allow the user to setup work queues and select the fields that will be used in the work queue. | Appendix II |

TABLE 1-continued

| UNIQUE REQ ID | FUNCTION | REQUIREMENT NAME | REQUIREMENT/FUNCTION DESCRIPTION | FIG. |
|---|---|---|---|---|
| 7.1H1 | | Setup Screen 3 - Fields Available | Add a table to display all available fields for the WorkFlow. | |
| 7.2H | | Setup Screen 3 - Fields Selected | Add a table to display all fields selected for the WorkFlow. | |
| 7.3H.1 | | Setup Screen 3 - Select Field button | Provide a button for the user to select the highlighted field in the 'Fields Available' table. | |
| 7.3H.2 | | Select Field Button - Action | When the button is clicked, the highlighted field is moved to the 'Fields Selected' table and removed from the 'Fields Available' table. | |
| 7.4H | | Setup Screen 3 - Select Warning Message | Provide a warning message that appears if the 'Select Field' button is clicked without highlighting a field in the 'Fields Available' list box. The warning should read "Please select a field from the list of Fields Available". | |
| 7.5H | | Setup Screen 3 - Deselect Field button | Provide a button for the user to deselect the highlighted field. When the button is clicked the highlighted field should be moved to the 'Fields Available' table and removed from the 'Fields Selected' table. | |
| 7.6H | | Setup Screen 3 - Deselect Warning Message | Provide a warning message that appears if the 'Deselect Field' button is clicked without highlighting a field in the 'Fields Selected' list box. The warning should read "Please select a field from the list of Fields Selected". | |
| 7.7H | | Setup Screen 3 - Deselect All Fields button | Provide a button for the user to deselect all of the fields from the 'Fields Selected' list. When the button is clicked, all fields in the 'Fields Selected' table should be moved to the 'Fields Available' table and removed from the 'Fields Selected' table. | |
| 7.8H | | Setup Screen 3 - Next button | Add a 'Next' button to the Work Queue Setup 2 screen. When the 'Next' button is clicked, the Work Queue setup2 screen will appear. | |
| 7.9H | | Setup Screen 3 - Cancel button | Add a 'Cancel' button to the Work Flow Setup 2 screen. When the 'Cancel' button is clicked, the Work Queue Display screen will appear. | |
| 7.10H | | Setup screen 3 - Cancel Warning Message | Provide a warning message that appears if the 'Cancel' button is clicked. The warning should read "Are you sure you want to Cancel the setup?" | |
| 7.11H | | Warning Message button - OK | Provide an 'OK' button on the warning message. If the 'OK' button is clicked all changes will be lost and the Work Queue Display screen will appear. | |
| 7.12H | | Warning Message button - Cancel | Provide a 'Cancel' button on the warning message. If the 'Cancel' button is clicked the warning message will close and the Setup screen will appear. | |
| 7.13H | | Vendor Fields Available | The Vendor fields that should be available are: Contact Name Company Name Company Address Company City Company State Company Zip Business Phone Email Address Cell Phone | |
| 7.14H1 | | Add Calculated Field Button | Add a button to allow the user to create a calculated field. | |
| 7.14H2 | | Calculated Field Button - Action | When the Calculated Field Button is clicked, the Calculated Field screen will open. | |
| 7.0I | Create Work Flow Criteria screen | | Create a screen to determine how each of the fields selected in Work Flow Setup 3 screen will be used. | Appendix JJ |
| 7.1I | | Criteria screen - Display Fields | Display all fields in the "Fields Selected" table on the WorkFlow Criteria screen. The fields should be displayed in one column vertically down the left side of the screen. | |
| 7.2I | | Criteria screen - Operator combo box | Add a combo box to the right of each check box containing the following values: = > > = | |

TABLE 1-continued

| UNIQUE REQ ID | FUNCTION | REQUIREMENT NAME | REQUIREMENT/FUNCTION DESCRIPTION | FIG. |
|---|---|---|---|---|
| | | | < | |
| | | | < = | |
| | | | < > | |
| 7.3I | | Criteria screen - Filter Text Box | Add a text box to the right of each operator combo box. This text box will contain the criteria for the WorkFlow. | |
| 7.4I | | Criteria screen - Back button | Add a 'Back' button to the WorkFlow Criteria screen. When the 'Back' button is clicked, the WorkFlow setup screen 3 will appear. All of the fields that were in the 'Fields Selected' table should remain in the 'Fields Selected' table. All changes to the WorkFlow Criteria screen should save. | |
| 7.5I | | Criteria screen - Next button | Add a 'Next' button to the WorkFlow Criteria screen. When the 'Next' button is clicked, the WorkFlow setup3 screen will appear. All of the changes to the WorkFlow Criteria screen should save. | |
| 7.6I | | Criteria screen - Cancel button | Add a 'Cancel' button to the WorkFlow Criteria screen. | |
| 7.7I | | Criteria screen - Cancel Warning Message | Provide a warning message that appears if the 'Cancel' button is clicked. The warning should read "Are you sure you want to Cancel the setup?" | |
| 7.8I | | Warning Message button - OK | Provide an 'OK' button on the warning message. If the 'OK' button is clicked all changes will be lost and the WorkFlow Display screen will appear. | |
| 7.9I | | Warning Message button - Cancel | Provide a 'Cancel' button on the warning message. If the 'Cancel' button is clicked the warning message will close and the Criteria screen will appear. | |
| 7.0J | Add Work Queue Link to Menu Bar | | Add a link to the Work Queue display screen to the menu bar. | Appendix OO |
| 7.1J | | Add Link to Work Queue to Menu Bar | Add a link to the Menu Bar to direct users to the Work Queue Display screen. | |
| 7.0K | Add Work Queue to the View Selection Combo Box | | Add Work Queue to the View Selection Combo box. | Appendix QQ |
| 7.1K | | Add Work Queue to View Selection Combo box | Add a link to the View Selection Combo box to direct the user to the Assigned Work Queue screen. | |
| 7.0L | Create Assigned Work Queue Screen | | Create a screen to allow users to select from all Work Queues that they have been assigned to. | Appendix RR |
| 7.1L | | Add Assigned Work Queues combo box to Assigned Work Queue Screen | Add a combo box to display all work queues that the current user is assigned to. | |
| 7.2L1 | | Add 'Go' button to the Assigned Work Queue Screen | Add 'Go' button to the Assigned Work Queue screen. | |
| 7.2L2 | | Go Button - Action | When the 'Go' button is clicked, the Work Queue screen for the selected work queue will appear. | |
| 7.0M | Create Work Queue screen | | Create Work Queue screen to display all items that have not been completed in a work queue. | Appendix SS |
| 7.1M1 | | Create Work Queue Detail Table | Create a table to display details about the items in the current work queue. | |
| 7.1M2 | | Add Work Queue Item link to Work Queue Detail Table | Add the link to the Work Queue item to the work queue table. | |
| 7.1M3 | | Work Queue Item Link - Action | When the Work Queue Item Link is clicked, a separate window will open with the work screen selected for the current work queue. The screen will open inside of the Work Queue Frame. | |
| 7.1M4 | | Add Work Queue Item Date to Work Queue Detail Table | Add the date that the item appeared in the work queue to the work queue table. | |
| 7.1M5 | | Add Work Queue Item link to Work Queue Detail Table | Add the status of the item to the work queue table. | |

TABLE 1-continued

| UNIQUE REQ ID | FUNCTION | REQUIREMENT NAME | REQUIREMENT/FUNCTION DESCRIPTION | FIG. |
|---|---|---|---|---|
| 7.1M6 | | Work Queue Item Statuses | The Statuses that will be displayed in the Work Queue table will be: Viewed New Completed | |
| 7.1M7 | | Work Queue Item Status - New | The Work Queue Item Status for an order that appears in a work queue and has not been viewed by any user and has not been completed will have a status of 'New'. | |
| 7.1M9 | | Work Queue Item Status - Viewed | The Work Queue Item Status for an order that appears in a work queue and has been viewed by a user and has not been completed will have a status of 'Viewed'. The item is not removed from the work queue, but it is moved to the bottom of the work queue. | |
| 7.1M10 | | Work Queue Item Status - Completed | The Work Queue Item Status for an order that appears in a work queue and has been viewed by a user and has been completed will have a status of 'Completed'. | |
| 7.1M11 | | Add Work Queue Item Viewed By to Work Queue Detail Table | Add the user name that the Work Queue Item was last viewed by. | |
| 7.1M12 | | Work Queue Item Viewed By - Rule | Will only be available for items with a status of 'Viewed'. | |
| 7.1M13 | | Add Work Queue Item Viewed On to Work Queue Detail Table | Add the date that the Work Queue Item was last viewed on. | |
| 7.1M14 | | Work Queue Item Viewed On - Rule | Will only be available for items with a status of 'Viewed'. | |
| 7.2M1 | Create Work Queue Frame | | Create a Frame that will open when the Work Queue Item Link is clicked. | Appendix TT |
| 7.2M2 | | Add Work Queue Item Status to Work Queue Frame | Add the Item Status to the Work Queue Frame. | |
| 7.2M3 | | Add Work Queue Item Viewed By to Work Queue Frame | Add the user name of the last person that viewed the work queue item. | |
| 7.2M4 | | Add Work Queue Item Viewed On to Work Queue Frame | Add the last date that the work queue item was viewed. | |
| 7.2M5 | | Add 'Complete' button to the Work Queue Frame | Add the 'Complete' button to the Work Queue Frame. | |
| 7.2M6 | | Complete Button - Action 1 | When the Complete button is clicked, the work queue item status will change to complete. | |
| 7.2M7 | | Complete Button - Action 2 | When the Complete button is clicked, the Work Queue screen will appear if the Work Queue Selection type is not 'Auto Feed'. | |
| 7.2M8 | | Complete Button - Action 3 | When the Complete button is clicked, if the Work Queue Selection type is 'Auto Feed', the current item will close and the next work queue item will appear in the Work Queue Frame. | |
| 7.0N | Create Calculated Field Screen | | Create a screen to allow the user to create a calculated field. | Appendix YY |
| 7.1N | | Add Field Name to Calculated Field Screen | Add a text box to allow the user to name the field that is being created. | |
| 7.2N | | Add Input Button to Calculated Field Screen | Add a button to the Calculated Field screen that will change the Field Variable to a text box. This will allow the user to enter free form values. | |
| 7.3N | | Add Select Button to Calculated Field Screen | Add a button to the Calculated Field screen that will change the Field Variable to a Combo box. This will allow the user to select a field. | |
| 7.4N1 | | Add Field Select Combo Box to Calculated Field Screen | Add a combo box to the Calculated Field screen that will allow the user to choose a field to perform a calculation. | |
| 7.4N2 | | Select Combo box - Values | The Select Combo box will contain the same values that are available in the Criteria Selection screen. | |
| 7.5N | | Add Field Text Box to Calculated Field Screen | Add a text box to allow the user to enter a value to perform a calculation. | |

TABLE 1-continued

| UNIQUE REQ ID | FUNCTION | REQUIREMENT NAME | REQUIREMENT/FUNCTION DESCRIPTION | FIG. |
|---|---|---|---|---|
| 7.6N | | Field Variable - Default | Field Variable should default to the Combo box. | |
| 7.7N1 | | Add 'Add' button to the Calculated Field Screen | Add a button to the Calculated Field screen to allow a user to add another text box or select combo box. | |
| 7.7N2 | | 'Add' Button - Action 1 | When the 'Add' button is clicked, the operator combo box will appear. | Appendix ZZ |
| 7.7N3 | | 'Add' Button - Action 2 | When the 'Add' button is clicked, the 'Input' Button will appear. | |
| 7.7N4 | | 'Add' Button - Action 3 | When the 'Add' button is clicked, the 'Select' Button will appear. | |
| 7.7N5 | | 'Add' Button - Action 3 | When the 'Add' button is clicked, the Field Variable will appear. | |
| 7.7N6 | | 'Add' Button - Action 4 | When the 'Add' button is clicked, the 'Add' button will appear. | |
| 7.7N7 | | Add Button - Rule | Each time the 'Add' button is clicked a new row should be added and all of the above items should be provided. | |
| 7.8N1 | | Add Operator Combo Box to Calculated Field Screen | Add a combo box to include all operators that will be needed to create a calculated field. | |
| 7.8N2 | | Operator Combo Box - Values | The Operator Combo box should contain the following values:<br>+<br>−<br>/<br>* | |
| 7.0 | Add Unavailable Date to Vendor Information Screen | | Provide the ability for a vendor to remove itself from a list of available vendors for a specified period of time. This will be necessary if a vendor is going on vacation or unavailable for a period of time. | Appendix UU |
| 7.1AA | | Add Unavailable Flag to Vendor Information screen | Add a check box to the vendor information screen. | Appendix UU |
| 7.1BB | | Unavailable Flag - Action | When the Unavailable Flag is checked, the vendor will not appear as an available vendor for all requestors. | Appendix UU |
| 7.2AA | | Add Unavailable Start Date to Vendor Information Screen | Add a field to the vendor information screen to allow a vendor to enter the date at which the vendor will become unavailable. | Appendix UU |
| 7.2BB | | Add Unavailable End Date to Vendor Information Screen | Add a field to the vendor information screen to allow a vendor to enter the date at which the vendor will become available. | Appendix UU |
| 7.2CC | | Unavailable Date End - Rule | The Unavailable End Date must be after the Unavailable Start Date. | Appendix UU |
| 8.0 | Update Qualitative Distribution Setup Screen | | Update the Qualitative Distribution Setup Screen to allow users to use different criteria for vendor selection than in the current production environment. | Appendix VV |
| 8.1 | | Add Lowest Price parameter to Qualitative Distribution screen | Add an option for the Lowest Price as a distribution parameter. | Appendix VV |
| 8.2 | | Add Highest Service Score parameter to Qualitative Distribution screen | Add an option for the Highest Service Score as a distribution parameter. | Appendix VV |
| 8.3 | | Add Highest Quality Score parameter to Qualitative Distribution screen | Add an option for the Highest Quality Score as a distribution parameter. | Appendix VV |
| 8.4 | | Add Highest Cumulative Score parameter to Qualitative Distribution screen | Add an option for the Highest Cumulative Score as a distribution parameter. | Appendix VV |
| 8.0 | Add Valuation Product Review element to all ORA valuation products. | | | |
| 8.0A | | Add Valuation Product Review element to Ocwen BPO product | Add option to select a Valuation Product Review to Ocwen BPO product | |

TABLE 1-continued

| UNIQUE REQ ID | FUNCTION | REQUIREMENT NAME | REQUIREMENT/FUNCTION DESCRIPTION | FIG. |
|---|---|---|---|---|
| 8.0B | | Add Valuation Product Review element to Ocwen Comparative Market Analysis | Add option to select a Valuation Product Review to Ocwen Comparative Market Analysis product | |
| 8.0C | | Add Valuation Product Review element to ORA 2055 | Add option to select a Valuation Product Review to ORA 2055 product | |
| 8.0D | | Add Valuation Product Review element to ORA 1004 | Add option to select a Valuation Product Review to ORA 1004 product. (This product does not exist yet. An RDD is forthcoming). | |
| 8.1 | Create Valuation Product Review Element Fulfillment | | | |
| 8.1A | | Create Valuation Product Review element fulfillment | Create the Data Entry Valuation Product Review element fulfillment form to enter the data needed for a Valuation Product Review. | |
| 8.1B | | Valuation Product Review - Rule 1 | Valuation Product Review will not be forwarded to vendor it will only be available to requestor/forwarder. | |
| 8.1C | | Valuation Product Review - Rule 2 | Completed order is not available to requestor/forwarder until Valuation Product Review status changes to Confirmed Complete. | |
| 8.1D | | Add Market Value Low field to Valuation Product Review Element Fulfillment | Add the Market Value Low field to the Valuation Product Review Element Fulfillment. This field should be formatted as currency. | |
| 8.1E | | Add Market Value High field to Valuation Product Review Element Fulfillment | Add the Market Value High field to the Valuation Product Review Element Fulfillment. This field should be formatted as currency. | |
| 8.FI | | Add Market Value Mid field to Valuation Product Review Element Fulfillment | Add the Market Value Mid field to the Valuation Product Review Element Fulfillment. This field should be formatted as currency. | |
| 8.1F1 | | Review Element Fulfillment - Market Value Mid field Rule 1 | The Market Value Mid should not populate if the Market Value High is null | |
| 8.1F2 | | Review Element Fulfillment - Market Value Mid field Rule 2 | The Market Value Mid should not populate if the Market Value Low is null | |
| 8.1F3 | | Review Element Fulfillment - Market Value Mid field calculation | The Market Value Mid calculation method is (Market Value High + Market Value Low)/2 | |
| 8.1G | | Add Repaired Market Value Low field to Valuation Product Review Element Fulfillment | Add the Repaired Market Value Low field to the Valuation Product Review Element Fulfillment. This field should be formatted as currency. | |
| 8.1H | | Add Repaired Market Value High field to Valuation Product Review Element Fulfillment | Add the Repaired Market Value High field to the Valuation Product Review Element Fulfillment. This field should be formatted as currency. | |
| 8.1I | | Add Repaired Market Value Mid field to Valuation Product Review Element Fulfillment | Add the Repaired Market Value Mid field to the Valuation Product Review Element Fulfillment. This field should be formatted as currency. | |
| 8.1I1 | | Review Element Fulfillment - Repaired Market Value Mid field Rule 1 | The Market Value Mid should not populate if the Repaired Market Value High is null | |
| 8.1I2 | | Review Element Fulfillment - Repaired Market Value Mid field Rule 2 | The Repaired Market Value Mid should not populate if the Repaired Market Value Low is null | |
| 8.1I3 | | Review Element Fulfillment - Repaired Market Value Mid field calculation | The Repaired Market Value Mid calculation method is (Repaired Market Value High + Repaired Market Value Low)/2 | |

TABLE 1-continued

| UNIQUE REQ ID | FUNCTION | REQUIREMENT NAME | REQUIREMENT/FUNCTION DESCRIPTION | FIG. |
|---|---|---|---|---|
| 8.1J | | Add Deferred Maintenance field to Valuation Product Review Element Fulfillment | Add the Total Repair Amount Field to the Valuation Product Review Element Fulfillment. This field should be formatted as currency. | |
| 8.1K | | Add Marketing Time field to Valuation Product Review Element Fulfillment | Add the Marketing Time Field to the Valuation Product Review Element Fulfillment. This field should be formatted as Number (Double). | |
| 8.1L | | Add Review Comment field to Valuation Product Review Element Fulfillment | Add the Review Comment Field to the Valuation Product Review Element Fulfillment. This field should be formatted as Memo. | |
| 8.1M | | Add Reason Code field to Valuation Product Review Element Fulfillment | Add the Reason Code Field to the Valuation Product Review Element Fulfillment. This field should be formatted as Text (50). | |
| 8.1KM1 | | Add Reason Code combo box field to Valuation Product Review Element Fulfillment | Add a combo box to specify the Reason Code Field on the Valuation Product Review Element Fulfillment. The combo box should contain the following values: Driveby Bad previous value Condemned Driveby on wrong property Deferred Maintenance Earthquake Fire Flood Functional Obsolescence Incorrect Prop Rights Valued Market Decline Market Increase Mudslide No Change In Value No Original (Previous) Value Go Repaired Sight Area Incorrect Structural Problems Tornado Vandalized Does Not Comply With Zoning | |
| 8.1N | | Add Condition Code field to Valuation Product Review Element Fulfillment | | |
| 8.1O | | Add Condition Code field to Valuation Product Review Element Fulfillment | Add the Condition Code Field to the Valuation Product Review Element Fulfillment. This field should be formatted as Text (10). | |
| 8.1O1 | | Add Condition Code combo box field to Valuation Product Review Element Fulfillment | Add a combo box to specify the Condition Code Field on the Valuation Product Review Element Fulfillment. The combo box should contain the following values: Poor Fair Average Good | |
| 8.1P | | Create Valuation Order Table | | |
| 8.1P1 | | Valuation Order Table - Add Link to Valuation Product | Links will be created for all other valuation products associated to the file number of the order the review is selected for. | |
| 8.1P2 | | Valuation Order Table - Link Action | Activating link will open a new window displaying the valuation product referenced by the link. | |
| 8.1P2 | | Valuation Order Table - Add Valuation Type | This will show the Valuation Product Type of the valuation product referenced by the link. | |
| 8.2P4 | | Valuation Order Table - Add Completed Date | This will show the confirmed completed date of the valuation product referenced by the link. | |
| 9.0 | Create Invoice Creation Process | | Create output file from REALTrans database for upload into Infinium for Invoice creation. | |
| 9.1 | | Create Infinium export file creation | Create file with all needed data for invoice creation in Infinium. | |
| 9.2 | | Create Infinium import file mapping | Create Infinium mapping process from file created in Section (9.1) | |

TABLE 1-continued

| UNIQUE REQ ID | FUNCTION | REQUIREMENT NAME | REQUIREMENT/FUNCTION DESCRIPTION | FIG. |
|---|---|---|---|---|
| 9.0A | Create Business Processes for Workflow Automation | | Create basic business processes that perform a simple function. This will allow admin users to select a business process that can occur for all files/orders that meet workflow criteria. | |
| 9.1A | | Create Send Message Business Process | Create a business process to send a message using the Message Center function. | Appendix WW |
| 9.1B | | Send Message Business Process - Action | When the user selects the 'Send Message Business Process' from the Work Flow Setup2 screen, a Process Parameter window should appear. | Appendix WW |
| 9.1C | | Process Parameter Window | The Process Parameter window should appear requiring the user to complete all fields for the business process. | Appendix WW |
| 9.1D | | Process Parameter Window - Parameters | The number of parameters that are necessary will be determined by the process that is being created. | Appendix WW |
| 9.1E | | Parameter 1 - 'To' Combo Box | The 'To' combo box should be the first parameter required by the user that appears on the Process Parameter window. | Appendix WW |
| 9.1F | | Parameter 1 - Values | The 'To' combo box should include the following values: Vendor Company Vendor Contact Vendor Company and Vendor Contact | Appendix WW |
| 9.1G | | Parameter 2 - 'Subject' field | The 'Subject' field should be the second parameter required by the user that appears on the Process Parameter window. | Appendix WW |
| 9.1H | | Parameter 2 - Details | The 'Subject' field should allow the user to enter a subject for all of the emails that will be sent for the current workflow. | Appendix WW |
| 9.1I | | Parameter 3 - 'Message' field | The 'Message' field should be the third parameter required by the user that appears on the Process Parameter window. | Appendix WW |
| 9.1J | | Parameter 3 - Details 1 | The 'Message' field should allow the user to enter a message for all of the emails that will be sent for the current workflow. | Appendix WW |
| 9.1K | | Parameter 3 - Details 2 | The 'Message' field should also include the following data points for all messages that are sent via a workflow: File Number Loan Number Order Number Property Street Address Property City Property State Property Zip Code Property APN Property Legal Description Borrower Name Order Due Date | Appendix WW |
| 9.2A | | Create Cancel Order Business Process | Create a business process to change the status to Cancelled for all orders for the current workflow. | Appendix XX |
| 9.2B | | Cancel Order Business Process - Action | When the user selects the 'Cancel Order' from the WorkFlow Setup2 screen, a Process Parameter window should appear. | Appendix XX |
| 9.2C | | Process Parameter Window | The Process Parameter window should appear requiring the user to complete all fields for the business process. | Appendix XX |
| 9.2D | | Parameter 1 - 'Reason' field | The 'Reason' field should be the only parameter required by the user that appears on the Process Parameter window. | Appendix XX |
| 9.2E | | Parameter 1 - Values | The data entered in the 'Reason' field should populate the Cancellation Form. | Appendix XX |
| 9.2F | | Cancel Order - Action 1 | When the order is cancelled via the workflow, the cancellation form should appear under submitted items. | Appendix XX |
| 9.2G | | Cancel Order - Action 2 | When the order is cancelled via the workflow, the status should change to cancelled. | Appendix XX |
| 9.3A | | Create Place Order Business Process | Create a business process to place an order using AVS. | Appendix YY |
| 9.3B | | Parameter 1 - 'Product Category' Combo Box | The 'Product Category' combo box should be the first parameter required by the user. | Appendix YY |

TABLE 1-continued

| UNIQUE REQ ID | FUNCTION | REQUIREMENT NAME | REQUIREMENT/FUNCTION DESCRIPTION | FIG. |
|---|---|---|---|---|
| 9.3C | | Parameter 1 - Values | The 'Product Category' combo box should include only product categories that the requestor has selected as products to be ordered. | Appendix YY |
| 9.3D | | Parameter 2 - 'Product to Order' Combo Box | The 'Product to Order' combo box should be the second parameter required by the user. | Appendix YY |
| 9.3E | | Parameter 2 - Values | The 'Product to Order' combo box should include only products that the requestor has selected as products to be ordered. | Appendix YY |
| 9.3F | | Place Order - Action | When the order is placed via workflow, the order should be placed with the best vendor that is selected using AVS rules. | Appendix YY |
| 9.4A | | Create Cancel and Reorder Business Process | Create a business process to cancel an order and re-assign the order with a new vendor using AVS. | Appendix ZZ |
| 9.4B | | Parameter 1 - 'Reason' field | The 'Reason' field should be the first parameter required by the user that appears on the Process Parameter window. | Appendix ZZ |
| 9.4C | | Parameter 1 - Values | The data entered in the 'Reason' field should populate the Cancellation Form. | Appendix ZZ |
| 9.4D | | Parameter 2 - 'Due Date' Combo Box | The 'Due Date' combo box should be the second parameter required by the user that appears on the Process Parameter window. | Appendix ZZ |
| 9.4E | | Parameter 2 - Values | The 'Due Date' combo box should include the following values:<br>Same as previous order<br>Calculate new due date | Appendix ZZ |
| 9.4F | | Due Date - Rule 1 | If 'Same as previous order' is selected from the 'Due Date' combo box and the due date for the previous order is not in the past, the new order that is created should contain the same due date as the previous order. | Appendix ZZ |
| 9.4G | | Due Date - Rule 2 | If 'Same as previous order' is selected from the 'Due Date' combo box and the due date for the previous order is in the past, the new order that is created should contain the due date based on a standard order time for the product. | Appendix ZZ |
| 9.4G | | Due Date - Rule 3 | If 'Calculate new due date' is selected from the 'Due Date' combo box, the new order that is created should contain the due date based on a standard order time for the product. | Appendix ZZ |
| 9.4H | | Cancel Order - Action 1 | When the order is cancelled via the workflow, the cancellation form should appear under submitted items. | Appendix ZZ |
| 9.4I | | Cancel Order - Action 2 | When the order is cancelled via the workflow, the status should change to cancelled. | Appendix ZZ |
| 9.4J | | Place Order - Action | When the order is placed via workflow, the order should be placed with the best vendor that is selected using AVS rules. | Appendix ZZ |
| 11.0 | Create Vendor Payment Process | | | |
| 11.1 | | Create Infinium export file creation | Create file with all needed data for vendor payment in Infinium. | |
| 11.2 | | Create Infinium import file mapping | Create Infinium mapping process from file created in Section (11.1) | |
| 12.0 | Create Delegate Process | | This process will allow other members or REAL Trans to place orders for the true requestor through their account. This will be used solely with the portfolio management upload process. | |
| 12.1 | | Add Delegate menu item under the Admin/more menu item | Add Delegate menu item under the Admin/More menu item. This will open the Delegate Creation Screen | Appendix PP |
| 12.2 | Create Approved Delegate Screen | | This will allow members to approve other members as delegates. | |
| 12.2A | Create Approved Delegates Table | | Create Delegate Creation Screen. | Appendix LL |
| 12.2A1 | | Add Company to Approved Delegate Screen | This should show all members who have been approved as delegates. | |
| 12.2A2 | | Add Active Date to Approved Delegates Screen | This should show the date the delegate was approved. | |

TABLE 1-continued

| UNIQUE REQ ID | FUNCTION | REQUIREMENT NAME | REQUIREMENT/FUNCTION DESCRIPTION | FIG. |
|---|---|---|---|---|
| 12.2B | | Add "Add" Button to Approved Delegates Screen | This button will open Approve Delegate Screen. | |
| 12.2C | | Add "Delete" Button to Approved Delegates Screen | Add a button to delete the selected Delegate from the Approved Delegate list. | |
| 12.2C1 | | Approved Delegates Screen - Delete Button Rule 1 | If a delegate has not been highlighted when the Delete button is clicked, the Selection Warning Pop up Box should appear (This is created in 12.2D3-12.2D5) | |
| 12.2C2 | | Approved Delegates Screen - Delete Button Rule 2 | If a delegate has been highlighted the Delete Warning Pop up Box should appear (This is created in 12.2D6-12.2D8) | |
| 12.2C3 | | Approved Delegates Screen - Missing Selection Warning Message | Provide a warning message that appears if the 'Delete' button is clicked but there is no Delegate highlighted. The warning should read "Please highlight the Delegate that you would like to delete from the list above?" | |
| 12.2C4 | | Approved Delegates Screen - Missing Selection Warning Message button - OK | Provide an 'OK' button on the warning message. If the 'OK' button is clicked the Approved Delegates screen will appear. | |
| 12.2C5 | | Approved Delegates Screen - Delete Warning Message | Provide a warning message that appears if the 'Delete' button is clicked and there is a Delegate highlighted. The warning should read "Are you sure you want to Delete the Delegate?" | |
| 12.2C6 | | Approved Delegates Screen - Delete Warning Message button - OK | Provide an 'OK' button on the warning message. If the 'OK' button is clicked all changes will be lost and the Approved Delegates screen will appear. | |
| 12.2C7 | | Approved Delegates Screen - Delete Warning Message button - Cancel | Provide a 'Cancel' button on the warning message. If the 'Cancel' button is clicked the warning message will close and the Approved Delegates screen will appear. | |
| 12.2C8 | | Approved Delegates Screen - Delete Button - Action | When the Delete button is clicked the highlighted Delegate should be removed from the list of Delegates. | |
| 12.3 | Create Approve Delegate Screen | | This will allow members to add members as delegates. | Appendix MM |
| 12.3A | | Create Approve Delegates Screen | Create Approve Delegates Screen. | |
| 12.3B | | Add Delegate Combo Box to Approve Delegates Screen | This should be a list box showing all members who have been approved as delegates. | |
| 12.3B1 | | Delegate Combo Box - Values | The Delegate Combo box should contain all approved vendors. | |
| 12.3C | | Add "Add" button to the Approve Delegates Screen | This button will Add the Delegate selected in the Approve Delegates Screen. | |
| 12.3D | | Add "Add" Button to Delegate Creation Screen | This button will open Approve Delegates Screen. | |
| 12.3D1 | | Approve Delegates Screen - Missing Selection Warning Message | Provide a warning message that appears if the 'Add button is clicked but there is not a Delegate selected from the Delegate Combo Box. The warning should read "Please select a Delegate that you would like to add from the list?" | |
| 12.3D2 | | Approve Delegates Screen - Missing Selection Warning Message button - OK | Provide an 'OK' button on the warning message. If the 'OK' button is clicked the Approve Delegates screen will appear. | |
| 12.3D3 | | Approve Delegates Screen - Add button - Action 1 | When the Add button is clicked the selected vendor should be added as a delegate. | |
| 12.3D4 | | Approve Delegates Screen - Add button - Action 2 | When the Add button is clicked the Delegate Creation Screen should appear. | |
| 12.4 | Enhance Portfolio Management Screen | | Enhance the current Portfolio Management screen to allow a vendor to select the owner of a portfolio who has approved them as a delegate. | Appendix NN |
| 12.4A | | Add Owner Combo Box to Portfolio Management Screen | Add the Owner Combo Box to the Portfolio Management screen. | |

TABLE 1-continued

| UNIQUE REQ ID | FUNCTION | REQUIREMENT NAME | REQUIREMENT/FUNCTION DESCRIPTION | FIG. |
|---|---|---|---|---|
| 12.4B | | Owner Combo Box - Values | The Owner Combo Box should contain all requestors that have selected them as an approved Delegate. | |
| 13.0A | Create Today Function | | Create a function to allow the user to enter a keyword "Today" to retrieve the system date. | |
| 13.1A | | Create Today Function | When the keyword Today is entered, the system should use the current date for calculating time lapses. Example: Current System Date - 6/5/03 Today Function Results Today - 3 = 6/2/03 | |
| 14.0A | Create View Only Fulfillment Form with Thumbnails | | Create View Only fulfillment form that displays the completed order fulfillment with thumbnails for all of the attached documents in a separate frame. | Appendix UU |
| 14.1A | | Create frame for fulfillment form | The View Only Fulfillment form should open in a separate frame. | |
| 14.2A | | Create Thumbnails for all attached documents | Create thumbnails for all documents that have been attached. | |
| 14.3A | | Add Thumbnails to Frame for Fulfillment Form | Display thumbnails for all attached documents in frame with View Only Fulfillment form. | |
| 14.4A | | Frame for Fulfillment Form | The Frame and thumbnails should be created for all of the products listed below: Ocwen CMA Ocwen BPO | |
| 15.0A | Modify Attach Document Screen | | Modify the Attach document screen to require the vendor to select the document type from a combo box instead of using free form text fields. | Appendix VV |
| 15.1A1 | | Add Document Type Combo Box | Add a combo box to allow the vendor to select the type of document being attached from a standardized list of documents. | |
| 15.1A2 | | Document Type Combo Box - Values | The Document Type Combo box should contain the following values: Subject Photo Sales Comp 1 Photo Sales Comp 2 Photo Sales Comp 3 Photo Listing Comp 1 Photo Listing Comp 2 Photo Listing Comp 3 Photo Other | |
| 15.1A3 | | Document Type Combo Box - Rule 1 | The user must select a value from the Document Type Combo box before attaching any document. | |
| 15.0B | Modify Submitted Documents Screen | | Modify the Submitted Documents screen to display the Document type. | Appendix XX |
| 15.0B1 | | Add Document Type to Submitted Documents Screen | Add the Document Type to the Submitted Documents screen. | |

What is claimed is:

1. A method for providing online services between a vendor and a service recipient, the method comprising:
   receiving, by at least one processor, a transaction request;
   identifying, by the at least one processor, a sub-transaction associated with the transaction request;
   identifying, by the at least one processor, a vendor capable of addressing the sub-transaction, the vendor having a calculated vendor score, and the vendor being identified based at least in part on the calculated vendor score;
   providing, by the at least one processor, a request for the sub-transaction to a vendor; and
   if the vendor agrees to address the sub-transaction, receiving, by at least one processor, a transaction response, wherein the transaction response comprises at least one item of information relating to addressing the sub-transaction.

2. The method of claim 1, wherein the transaction request is a request for a loan for a real estate purchase.

3. The method of claim 1, wherein identifying, by the at least one processor, the sub-transaction associated with the transaction request comprises:
   identifying, by the at least one processor, the sub-transaction from a group of sub-transactions consisting of determination of flood classification status, an inspection, an appraisal, an automated valuation model, and a mortgage insurance policy.

4. The method of claim 1, further comprising:
   if the vendor agrees to address the sub-transaction, receiving, by the at least one processor, a confirmation of services provided.

5. The method of claim 4, wherein the confirmation of services comprises:
   an indication that one or more services addressing the sub-transaction have been provided.

6. The method of claim 5, wherein the indication comprises one selected from the group consisting of flood classification status information, inspection status information, appraisal information, automated valuation model information, and mortgage insurance policy information.

7. The method of claim 4, wherein confirmation of services provided for the sub-transaction generates a second sub-transaction.

8. The method of claim 7, further comprising:
generating, by the at least one processor, the second sub-transaction in response to receiving the confirmation of services provided.

9. The method of claim 1, wherein the vendor is automatically selected.

10. The method of claim 1, wherein identifying the vendor comprises:
receiving an input from a user, the input specifying the vendor.

11. The method of claim 1, wherein identifying the vendor comprises:
electronically selecting a vendor.

12. The method of claim 1, wherein the calculated vendor score is calculated based on one or more of a vendor quality score or a vendor service score.

13. The method of claim 12, wherein the calculated vendor score is calculated based on both of the vendor quality score and the vendor service score.

14. A non-transitory computer-readable medium having computer-readable program code embodied therein for providing online services between a vendor and a service recipient, the computer-readable program code comprising:
computer-readable instructions for receiving a transaction request;
computer-readable instructions for identifying a sib-transaction associated with the transaction request;
computer-readable instructions for identifying a vendor capable of addressing the sub-transaction, the vendor being identified based at least in part on a quality score of the vendor;
computer-readable instructions for providing a request for the sub-transaction to a vendor; and
computer-readable instructions for receiving a transaction response comprising at least one item of information relating to addressing the sub-transaction in response to a determination that the vendor agreed to address the sub-transaction.

15. The non-transitory computer-readable medium of claim 14, wherein the quality score is based at least in part on a measure of customer satisfaction associated with the vendor and a price associated with the vendor.

16. The non-transitory computer-readable medium of claim 15, wherein the vendor is identified based at least in part on a service score of the vendor.

17. A system for providing online services between a vendor and a service recipient, the system comprising:
at least one processor comprising:
a transaction receiving module for receiving a transaction request;
a sub-transaction identifying module for identifying a sub-transaction associated with the transaction request;
a vendor identification module for identifying a vendor capable of addressing the sub-transaction, the vendor being identified based at least in part on a service score of the vendor;
a vendor request providing module for providing a request for the sub-transaction to a vendor; and
a transaction request reception module for receiving a transaction response if the vendor agrees to address the sub-transaction, the transaction response comprising at least one item of information relating to addressing the sub-transaction.

18. The system of claim 17, wherein the service score is based at least in part on a measure of turnaround time associated with the vendor and a measure of order timeliness associated with the vendor.

19. The system of claim 18, wherein the vendor is identified based at least in part on a quality score of the vendor.

* * * * *